(12) United States Patent
Kato et al.

(10) Patent No.: US 6,526,098 B1
(45) Date of Patent: *Feb. 25, 2003

(54) HIGH EFFICIENCY CODING DEVICE AND HIGH EFFICIENCY CODING METHOD FOR IMAGE DATA

(75) Inventors: Shiro Kato, Hirakata (JP); Masakazu Nishino, Kashiwara (JP); Tatsuro Juri, Osaka (JP); Yuji Fujiwara, Nishinomiya (JP); Seiichi Takeuchi, Neyagawa (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,297

(22) Filed: Oct. 8, 1997

Related U.S. Application Data

(62) Division of application No. 08/490,326, filed on Jun. 14, 1995, now Pat. No. 5,677,981.

(30) Foreign Application Priority Data

Jun. 14, 1994 (JP) ............................................. 6-131940
Jul. 12, 1994 (JP) ............................................. 6-183966
Nov. 1, 1994 (JP) ............................................. 6-268639
Dec. 20, 1994 (JP) ............................................. 6-316607

(51) Int. Cl.$^7$ ................................................. H04N 7/12
(52) U.S. Cl. ................................................. 375/240.24
(58) Field of Search ................................. 348/388, 446, 348/441, 384, 448; 375/240.24; H04N 7/12

(56) References Cited

U.S. PATENT DOCUMENTS 4,720,744 A    1/1988   Washi et al.
4,905,084 A    2/1990   Zucker (List continued on next page.)

FOREIGN PATENT DOCUMENTS

DE    3910953       10/1990
EP     577310        1/1994
JP    6046369        2/1994
WO   WO92/04804      3/1992

OTHER PUBLICATIONS

European Search Report dated Sep. 11, 2000 for EP 00 10 5979.

European Search Report dated Apr. 22, 1996.

A. Ide et al., "1–1 Compression of Video Signals", *Compression and Digital Signal Modulation*, pp. 137–150, 1993.

European Search Report dated Jul. 25, 1996.

RGB Spectrum 1992 "RGB 1600", 1500, Videolink.

*Primary Examiner*—Young Lee
(74) *Attorney, Agent, or Firm*—RatnerPrestia

(57) ABSTRACT

A video signal recording apparatus including a switching device for receiving a digital progressive scan TV signal having a frame cycle which is ½ of the frame cycle of an interlaced scan TV signal and switching the progressive scan TV signal frame by frame alternately; a coding device for performing high-rate coding of data corresponding to one frame of the progressive scan TV signal to the same code amount as obtained by high-rate coding of data corresponding to one frame including two successive fields of an interlaced scan standard-definition TV signal; and a recording device for recording the data processed with the high-rate coding in the same number of tracks as the data corresponding to one frame of the interlaced scan standard-definition TV signal.

21 Claims, 44 Drawing Sheets

U.S. PATENT DOCUMENTS

| | | |
|---|---|---|
| 4,974,064 A | 11/1990 | Tsinberg |
| 5,185,663 A | 2/1993 | Hackett |
| 5,204,745 A | 4/1993 | Kawai et al. |
| 5,212,742 A | 5/1993 | Normile et al. |
| 5,231,491 A | 7/1993 | Holoch |
| 5,267,021 A | 11/1993 | Ramchandran et al. |
| 5,280,397 A | 1/1994 | Rhodes |
| 5,317,413 A | 5/1994 | Yanaghara et al. |
| 5,335,013 A | 8/1994 | Faber |
| 5,387,940 A | 2/1995 | Kwok et al. |
| 5,418,620 A | 5/1995 | Nishino et al. |
| 5,457,498 A | 10/1995 | Hori et al. |
| 5,485,280 A | 1/1996 | Fujinami et al. |
| 5,497,199 A | 3/1996 | Asada et al. |
| 5,530,484 A | 6/1996 | Bhatt et al. |
| 5,539,465 A | 7/1996 | Xu et al. |
| 5,555,097 A | 9/1996 | Joung et al. |
| 5,563,661 A | 10/1996 | Takahashi et al. |
| 5,594,552 A | 1/1997 | Fujinami et al. |
| 5,610,661 A | 3/1997 | Bhatt |
| 5,650,860 A | 7/1997 | Uz |
| 5,673,086 A | 9/1997 | Fukuoka et al. |

⟨ED signal⟩

Frame P(n)

```
Y  ooooooo
Y' □□□□□□□
Y  ooooooo
Y' □□□□□□□
Y  ooooooo
Y' □□□□□□□
Y  ooooooo
Y' □□□□□□□

C  o  o  o  o
C' 1  3  5  7
C  o  o  o  o
C'
C  o  o  o  o
C'
C  o  o  o  o
C'
```

Frame P(n+1)

```
Y' ■■■■■■■
Y  •••••••
Y' ■■■■■■■
Y  •••••••
Y' ■■■■■■■
Y  •••••••
Y' ■■■■■■■
Y  •••••••

C' 1  3  5  7
C  •  •  •  •
C'
C  •  •  •  •
C'
C  •  •  •  •
C'
C  •  •  •  •
```

⇒

| ⟨SD1⟩ | ⟨SD2⟩ |
|---|---|
| Odd-number field | Odd-number field |
| Y ooooooo | Y ■■■■■■■ |
| Y ooooooo | Y ■■■■■■■ |
| Y ooooooo | Y ■■■■■■■ |
| Y ooooooo | Y ■■■■■■■ |

(X: dummy data or interpolation value)

```
C  o  X  o  X        C  •  X  •  X
   1     5              3     7
C  o  X  o  X        C  •  X  •  X

C  o  X  o  X        C  •  X  •  X

C  o  X  o  X        C  •  X  •  X
```

| Even-number field | Even-number field |
|---|---|
| Y ••••••• | Y □□□□□□□ |
| Y ••••••• | Y □□□□□□□ |
| Y ••••••• | Y □□□□□□□ |
| Y ••••••• | Y □□□□□□□ |

```
C  •  X  •  X        C  o  X  o  X
                        3     7
C  •  X  •  X        C  o  X  o  X
   1     5
C  •  X  •  X        C  o  X  o  X

C  •  X  •  X        C  o  X  o  X
```

Frame J(n)   Frame J(n+1)

HIGH EFFICIENCY CODING DEVICE AND HIGH EFFICIENCY CODING METHOD FOR IMAGE DATA

This application is a division of application Ser. No. 08/490,326, filed Jun. 14, 1995, U.S. Pat. No. 5,677,981.

BACKGROUND OF THE INVENTION

1. Field of the Invention

The present invention relates to a high-rate coding device for performing high-rate coding of an input signal, a video signal recording and reproduction apparatus for recording and reproducing data obtained by the high-rate coding and to a video signal transmitting apparatus for transmitting data obtained by the high-rate coding. (In this specification, high efficiency coding and high efficiency decoding are expressed as "high-rate coding" and "high-rate decoding".)

2. Description of the Related Art

Video signal recording apparatuses for digitally recording a video signal are generally classified into two types: One type of apparatuses compress a standard-definition (SD) TV signal to 25 Mbps by performing intra-frame coding for recording. The other type of apparatuses compress a high vision signal to 50 Mpbs for recording. In these types of apparatuses, the type of video signals usable for input and output and the quality of the signals obtained are limited. It is extremely difficult to record and reproduce a video signal which is of a different type from the signal which are input to or output from devices in the video signal recording apparatus without significantly changing the recording and reproducing processing.

For example, in a video signal recording apparatus which receives a digital TV signal obtained by interlaced scanning (hereinafter, referred to as an "interlaced scan TV signal") and compresses such a signal for recording, two successive fields of the interlaced scan TV signal are combined and converted into one frame of a progressive scan TV signal (a TV signal obtained by progressive scanning) before performing compression and recording. In the case when a progressive scan TV signal is used as an input signal, the input signal is already framed, and the frame cycle is ½ of the cycle of an interlaced scan TV signal. Such a progressive scan TV signal cannot be recorded by a conventional video signal recording apparatus.

In a video signal recording apparatus which receives a progressive scan TV signal and compresses such a signal for recording, the progressive scan TV signal is switched frame by frame to be sent to two channels. By such switching, data corresponding to one frame of the progressive scan TV signal is processed with high-rate coding to have the same quantity of codes as obtained by high-rate coding of data corresponding to one frame of an interlaced scan standard-definition TV signal including two successive fields. The data obtained by the high-rate coding is recorded in the same number of tracks as used for recording data corresponding to one frame of an interlaced scan TV signal.

In such a method, however, the data processing is performed frame by frame. Accordingly, recording of a still image cannot utilize the correlation between data corresponding to different frames, thus preventing improvement in the coding efficiency. Further, since the data is divided into two channels, time delay occurs between images which are output from different channels. Due to such time delay, data corresponding to different frames are arranged by turns, resulting in deterioration in the quality of an image obtained in a search picture mode.

Moreover, in order to perform high-rate coding of a signal including a standard-definition TV signal defined by 4:2:2 (hereinafter, referred to as a "4:2:2 signal") conforming to the studio standards described in CCIR Recommendation 601-1 and an auxiliary signal of a luminance signal required for progressive scanning, the conventional dividing method is not suitable for the following reason: By the division performed by the conventional dividing method, the number of effective pixels of the data corresponding to a color difference signal of the resultant signal is decreased, and thus ICs in the conventional video signal recording apparatus cannot be used for high-rate coding.

In conventional high-rate coding devices for performing high-rate coding and conventional video signal transmitting apparatuses for transmitting a video signal coded by the conventional high-rate coding devices, the type of the image signal usable for input and output and the quality of the resultant signal are limited. Accordingly, it is extremely difficult to change the specifications of such apparatuses and the characteristics of the resultant signals without significantly changing the high-rate coding processing, data recording processing, and the like.

Shuffling is one method used for performing high-rate coding in the conventional video signal recording apparatus for compressing a TV signal to be recorded in a magnetic tape. By shuffling, an image plane is divided into a plurality of areas. A prescribed number of blocks are obtained from prescribed positions of each area to form a coding unit for high-rate coding. For a high-definition (HD) TV signal, there are three systems regarding the number of the scanning lines and the field frequency: 1125 scanning lines/60 Hz, 1050 scanning lines/60 Hz, and 1250 scanning lines/50 Hz. In this specification, the system corresponding 1125 scanning lines and 60 Hz, for example, will be referred to as the "1125/60 system". In the case when a signal of the 1125/60 system is used, shuffling is very complicated and thus requires a large circuit for shuffling.

SUMMARY OF THE INVENTION

In one aspect of the present invention, a video signal recording apparatus includes switching means for receiving a digital progressive scan TV signal having a frame cycle which is ½ of the frame cycle of an interlaced scan TV signal and switching the progressive scan TV signal frame by frame alternately; coding means for performing high-rate coding of data corresponding to one frame of the progressive scan TV signal to the same code amount as obtained by high-rate coding of data corresponding to one frame including two successive fields of an interlaced scan standard-definition TV signal, and recording means for recording the data processed with the high-rate coding in the same number of tracks as the data corresponding to one frame of the interlaced scan standard-definition TV signal.

In another aspect of the present invention, a video signal recording apparatus includes rearranging means for receiving a digital progressive scan TV signal and rearranging data corresponding to one frame of the progressive scan TV signal into data corresponding to one field of an interlaced scan high-definition TV signal; dividing means for dividing the rearranged data into a plurality of coding units; coding means for performing high-rate coding of the plurality of coding units; and recording means for recording the coding units obtained by high-rate coding. The dividing means, the coding means and the recording means are the same as dividing means, coding means and recording means used for processing an interlaced scan high-definition TV signal.

In one embodiment of the invention, data corresponding to two successive frames of the progressive scan TV signal is processed as one unit in an operation performed after being divided by the dividing means.

In another aspect of the present invention, a video signal recording apparatus includes dividing means for receiving a digital progressive scan TV signal and dividing the signal into the same number of coding units as data corresponding to one frame of an interlaced scan standard-definition TV signal; coding means for performing high-rate coding of the coding units; and recording means for recording the coding units processed with by high-rate coding. The coding means and the recording means are the same as coding means and recording means used for processing an interlaced scan high-definition TV signal.

In one embodiment of the invention, data corresponding to two successive frames of the progressive scan TV signal is processed in an operation performed after being divided by the dividing means.

In one aspect of the present invention, a video signal recording apparatus includes switching means for receiving, a digital TV signal, deciding whether the TV signal is a progressive scan. TV signal or an interlaced scan TV signal, and selecting a method for dividing the TV signal into a plurality of coding units in a suitable manner to the type of the TV signal; dividing means for dividing the TV signal into the plurality of coding units in accordance with the type of the TV signal; coding means for performing high-rate coding of the coding units; and recording means for recording the coding units processed with high-rate coding. The dividing means, the coding means and the recording means are the same as dividing means, coding means and recording means used for processing an interlaced scan high-definition TV signal.

In one embodiment of the invention, the data corresponding to two successive frames of the progressive scan TV signal is processed as one unit in an operation performed after being divided by the dividing means, and the data corresponding to two fields of the interlaced scan TV signal is processed as one unit in an operation performed after being divided by the dividing means.

In another aspect of the present invention, a video signal recording apparatus includes rate conversion means for converting a progressive scan high-definition TV signal in an analog state into a digital signal at one of a sampling frequencies of 40.5 MHz for 59.94 Hz and 40.5×1.001 Mhz for 60 Hz for a luminance signal and at a sampling frequency of 13.5×1.001 Mhz for a color difference signal to generate a video signal including 720×720 effective pixels in horizontal and vertical directions for the luminance signal and 240×720 effective pixels in horizontal and vertical directions for the color difference signal; dividing means for dividing data corresponding to one frame of the resultant signal into the same number of coding units as obtained from data corresponding to one frame of an interlaced scan standard-definition TV signal; coding means for performing high-rate coding of the plurality of coding units; and recording means for recording the coding units processed with high-rate coding.

In one embodiment of the invention, high-rate coding performed by the coding means is commonly used with high-rate coding for processing an interlaced scan high-definition TV signal.

In one embodiment of the invention, the data corresponding to two successive frames of the progressive scan TV signal is processed as one unit in an operation performed after being divided by the dividing means.

In another aspect of the present invention, a video signal recording apparatus includes dividing means for dividing the data corresponding to one frame of a digital progressive scan TV signal into 30×45 compression blocks in horizontal and vertical directions; coding means for performing high-rate coding of five compression blocks which are away from one another on an image plane as one compression unit; rearranging means for rearranging the compression unit to a prescribed position in ten recording blocks each including 3×45 compression blocks in the horizontal and vertical directions; and recording means for respectively recording the recording blocks in tracks on a magnetic tape.

In one embodiment of the invention, the rearranging means rearranges the compression unit to a prescribed position in five recording blocks each including 30×9 compression blocks in the horizontal and vertical directions, and the recording means records each of the recording blocks to two tracks on the magnetic tape.

In another aspect of the present invention, a video signal recording apparatus includes conversion means for receiving a digital progressive scan high-definition TV signal and converting a color difference signal of the TV signal to ⅓ in a vertical direction by a filter; dividing means for dividing the converted signal into the same number of coding units as obtained from data corresponding to one frame of an interlaced scan standard-definition TV signal; coding means for performing high-rate coding of coding units; and recording means for recording the coding units processed with high-rate coding.

In one embodiment of the invention, the high-rate coding performed by the coding means is the same as high-rate coding for processing an interlaced scan high-definition TV signal.

In one embodiment of the invention, the data corresponding to two successive frames of the progressive scan TV signal is processed as one unit in an operation performed after being divided by the dividing means.

In another aspect of the present invention, a video signal recording apparatus includes color difference conversion means for receiving two successive frames of a digital progressive scan high-definition TV signal and converting a color difference signal of each of the frames to ½ in a vertical direction by a filter; interlace conversion means for converting the signals obtained by the color difference conversion means so that the converted signals appear to be obtained by interlaced scanning; dividing means for dividing each of the resultant signals into the same number of coding units as obtained from data corresponding to one frame of an interlaced scan standard-definition TV signal; coding means for performing high-rate coding of coding units; and recording means for recording the coding units processed with high-rate coding.

In one embodiment of the invention, the high-rate coding of the progressive scan TV signal is performed in the same manner as high-rate coding of an interlaced scan high-definition TV signal.

In one aspect of the present invention, a video signal recording apparatus includes combining means for receiving a digital progressive scan TV signal having a frame cycle which is ½ of the frame cycle of an interlaced scan TV signal and combining data corresponding to two successive frames of the progressive scan TV signal to generate combination data; coding means for performing high-rate coding of the combination data; and recording means for recording the combination data processed with the high-rate coding.

In one embodiment of the invention, the combining means combines data corresponding to two successive frames of the progressive scan TV signal line by line.

In one embodiment of the invention, the coding means performs high-rate coding of the combination data to the same code amount as obtained by high-rate coding of data corresponding to one frame of an interlaced scan high-definition TV signal.

In one embodiment of the invention, the combining means, the coding means and the recording means are the same as combining means, coding means and recording means for processing an interlaced scan high-definition TV signal.

In another aspect of the present invention, a video signal recording apparatus includes switching means for receiving a digital progressive scan TV signal having a frame cycle which is ½ of the frame cycle of an interlaced scan TV signal and switching the progressive scan TV signal at 1/n of the frame cycle to be sent to a plurality of channels where n is a positive integer; a plurality of combining means for combining data corresponding to two successive frames of the progressive scan TV signal sent to each of the channels to generate combination data; coding means for performing high-rate coding of the combination data; and recording means for recording the combination data processed with the high-rate coding.

In one embodiment of the invention, the combining means combines data corresponding to two frames of the progressive scan TV signal line by line.

In one embodiment of the invention, the coding means performs high-rate coding of the combination data to the same code amount as obtained by high-rate coding of data corresponding to one frame of an interlaced scan high-definition TV signal is performed.

In one embodiment of the invention, the combining means, the coding means and the recording means are the same as combining means, coding means and recording means for processing an interlaced scan high-definition TV signal.

In another aspect of the present invention, a video signal recording apparatus includes switching means for receiving a digital progressive scan TV signal having a frame cycle which is ½ of the frame cycle of an interlaced scan TV signal and switching the progressive scan TV signal frame.by frame to be sent as image data to first and second channels; first and second dividing means for expanding data corresponding to one frame of the progressive scan TV signal to twice as large in terms of time and dividing the data to the same number of coding units as obtained from data corresponding to one frame of an interlaced scan standard-definition TV signal in the first and second channels, respectively; first and second high-rate coding means for performing high-rate coding of the coding units obtained by the first and second dividing means so as to obtain the same code amount and the same operating speed as obtained by performing high-rate coding of data corresponding to one frame of an interlaced scan standard-definition TV signal; recording means for recording each of the coding units processed with the high-rate coding to an equal number of tracks as data corresponding to one frame of the interlaced scan standard-definition TV signal; a first memory provided after the first dividing means for temporarily storing image data of a first half of a "K"th frame; and a second memory provided after the second dividing means for temporarily storing image data of a first half of a "K+1"th frame. The first dividing means and the first high-rate coding means are included in a first channel; the second dividing means and the second high-rate coding means are included in a second channel; and when image data of a second half of a frame is output to one of the first channel and the second channel, the image data of the first half of the same frame stored in one of the first memory and the second memory is output to the other channel.

In another aspect of the present invention, a video signal recording apparatus includes color difference signal generation means for receiving an input signal including a standard-definition TV signal defined as a 4:2:2 signal conforming to the studio standards and an auxiliary signal of a luminance signal required for progressive scanning, and generating a color difference signal which corresponds to an auxiliary signal of a luminance signal of the input signal in order to convert the input signal into a progressive scan TV signal having a frame frequency twice the frame frequency of the standard-definition TV signal defined as a 4:2:2 signal conforming to the studio standards; dividing means for dividing the progressive scan TV signal including the color difference signal output from the color difference signal generation means into two channels to generate two sets of division data; first and second high-rate coding means respectively for performing high-rate coding of the two sets of division data to the code amount as obtained by high-rate coding of data corresponding to one frame of an interlaced scan high-definition TV signal; and recording means for recording each of the two sets of division data processed with the high-rate coding to the same number of tracks as data corresponding to one frame of the interlaced scan high-definition TV signal.

In another aspect of the present invention, a video signal recording apparatus includes color difference signal generation means for receiving an input signal including a standard-definition TV signal defined as a 4:2:2 signal conforming to the studio standards and an auxiliary signal of a luminance signal required for progressive scanning, and generating a color difference signal which corresponds to an auxiliary signal of a luminance signal of the input signal in order to convert the input signal into a progressive scan TV signal having a frame frequency twice the frame frequency of the standard-definition TV signal defined as a 4:2:2 signal conforming to the studio standards; dividing means for dividing the progressive scan TV signal including the color difference signal output from the color difference signal generation means into two channels to generate two sets of division data; first and second high-rate coding means respectively for performing high-rate coding of the two sets of division data to the same code amount as obtained by high-rate coding of data corresponding to one frame of an interlaced scan high-definition TV signal; recording means for recording each of the two sets of division data processed with the high-rate coding to the same number of tracks as data corresponding to one frame of the interlaced scan high-definition TV signal; a first memory provided after the first dividing means for temporarily storing image data of a first half of a "K"th frame; and a second memory provided after the second dividing means for temporarily storing image data of a first half of a "K+1"th frame. The first dividing means and the first high-rate coding means are included in a first channel; the second dividing means and the second high-rate coding means are included in a second channel; and when image data of a second half of a frame is output to one of the first channel and the second channel, the image data of the first half of the same frame stored in one of the first memory and the second memory is output to the other channel.

In another aspect of the present invention, a video signal recording and reproduction apparatus includes first signal conversion means for receiving a first video signal in which at least a luminance signal is a non-interlaced scan signal and converting the non-interlaced scan signal into an interlaced scan signal to generate a second video signal; recording means for recording the second video signal to a recording medium; reproduction means for reproducing the second video signal from the recording medium; and second signal conversion means for performing conversion of the second video signal in an inverse manner to the conversion performed by the first signal conversion means to generate the first video signal. The first signal conversion means converts each of a plurality of image planes of the non-interlaced scan signal into one frame of an interlaced scan signal so that an odd-number line of an image plane of the non-interlaced scan signal correspond to a line in an odd-number field of the interlaced scan signal and that an even-number line of an image plane of the non-interlaced scan signal correspond to a line in an even-number field of the interlaced scan signal.

In another aspect of the present invention, a video signal recording and reproduction apparatus includes first signal conversion means for receiving a first video signal in which at least a luminance signal is a non-interlaced scan signal and converting the non-interlaced scan signal into an interlaced scan signal to generate a second video signal; recording means for recording the second video signal to a recording medium; reproduction means for reproducing the second video signal from the recording medium; and second signal conversion means for performing conversion of the second video signal in an inverse manner to the conversion performed by the first signal conversion means to generate the first video signal. The first signal conversion means converts every two adjacent image planes of the non-interlaced scan signal into two frames of an interlaced scan signal so that an odd-number line and an even-number line of a first image plane of the non-interlaced scan signal correspond to a line in an odd-number field of a first frame and a line in an odd-number field of a second frame of the interlaced scan signal and that an odd-number line and an even-number line of a second image plane of the non-interlaced scan signal correspond to a line in an even-number field of the first frame and a line in an even-number field of the second frame of the interlaced scan signal.

In another aspect of the present invention, a video signal recording and reproduction apparatus includes first signal conversion means for receiving a first video signal in which at least a luminance signal is a non-interlaced scan signal and converting the non-interlaced scan signal into an interlaced scan signal to generate a second video signal; recording means for recording the second video signal to a recording medium; reproduction means for reproducing the second video signal from the recording medium; and second signal conversion means for performing conversion of the second video signal in an inverse manner to the conversion performed by the first signal conversion means to generate the first video signal. The first signal conversion means converts every two adjacent image planes of the non-interlaced scan signal into two frames of an interlaced scan signal so that an odd-number line and an even-number line of the first image plane of the non-interlaced scan signal correspond to a line in an odd-number field of an "n"th frame and a line in an even-number field of an "n−1"th frame of the interlaced scan signal and that an odd-number line and an even-number line of a second image plane of the non-interlaced scan signal correspond to a line in an odd-number field of an "n+1"th frame and a line in an even-number field of the "n"th frame of the interlaced scan signal.

In another aspect of the present invention, a video signal recording and reproduction apparatus includes first signal conversion means for receiving a first video signal in which at least a luminance signal is a non-interlaced scan signal and converting the non-interlaced scan signal into an interlaced scan signal to generate a second video signal; recording means for recording the second video signal to a recording medium; reproduction means for reproducing the second video signal from the recording medium; and second signal conversion means for performing conversion of the second video signal in an inverse manner to the conversion performed by the first signal conversion means to generate the first video signal. The first signal conversion means converts every two adjacent image planes of the non-interlaced scan signal into two frames of an interlaced scan signal so that an odd-number line and an even-number line of an "n"th image plane correspond to a line in an odd-number field of an "n"th frame and a line in an even-number field of the "n+1"th frame and that an odd-number line and an even-number line of the "n+1"th image plane correspond to a line in an even-number field of the "n+1"th frame and a line in an even-number field of the "n"th frame where n is an integer.

In one embodiment of the invention, the first conversion means divides each of a plurality of frames of the second video signal which is an interlaced scan signal into two interlaced scan signals, and the recording means performs pre-processing of the two interlaced scan signals in two channels in parallel.

In another aspect of the present invention, a video signal recording and reproduction apparatus includes first signal conversion means for receiving a first video signal in which a luminance signal is a non-interlaced scan signal and a color difference signal is an interlaced scan signal, and converting the non-interlaced scan signal into an interlaced scan signal to generate a second video signal; recording means for recording the second video signal to a recording medium; and reproduction means for reproducing the second video signal from the recording medium; second signal conversion means for performing conversion of the second video signal in an inverse manner to the conversion performed by the first signal conversion means to generate the first video signal. The recording means includes additional information recording means for recording additional information for identifying a field of the color difference signal in a frame of the first video signal. The first signal conversion means divides the color difference signal which is an interlaced scan signal into odd-number pixels and even-number pixels to generate a color difference signal corresponding to two fields of the second video signal.

In another aspect of the present invention, a video signal coding device performs quantization and coding of one of input image data and data which is obtained by converting the input image data in a prescribed manner while performing control so that a plurality of prescribed image areas each obtain a prescribed code amount to generate coded data. Processing is performed which is equivalent to high-rate coding of image data provided in the number of N each having the same size as image data in the prescribed image area in which the code amount is controlled and also having a substantially equal amount of information of the image data to be transmitted to generate N sets of coded data, and the N sets of coded data are output as coded data obtained from the input image data, where N is a constant.

In another aspect of the present invention, a video signal coding device performs quantization and coding of one of input image data and data which is obtained by converting the input image data in a prescribed manner while performing control so that a plurality of prescribed image areas each obtain a prescribed code amount to generate coded data. Processing is performed which is equivalent to high-rate coding of image data in the number of N each having the same size as image data in the prescribed image area in which the code amount is controlled and also having a substantially equal amount of information of the image data to be transmitted in a partially overlapped state to generate N sets of coded data, and the N sets obtained from coded data are output as coded data of the input image data, where N is a constant.

In another aspect of the present invention, in a video signal transmission apparatus, a plurality of prescribed image areas of image data having a prescribed size are each divided into image data provided in the number of N each having a substantially equal amount of information in a partially overlapped state, processing which is equivalent to code amount control and high-rate coding is performed for each prescribed image area to generate coded data, the coded data is decoded for each prescribed image area to generate N sets of image data, the N sets of image data are processed with high-rate decoding to generate the image data in the number of N, and the image data in the number of N are synthesized to generate image data to reproduce the input image data. Information corresponding to coded data which is lost by an error caused during transmission is reproduced using different information having at least a part of the coded data, where N is a constant.

In another aspect of the present invention, in a video signal transmission apparatus, a plurality of prescribed image areas of image data having a prescribed size are each divided into image data provided in the number of N each having a substantially equal amount of information in one of a partially overlapped state and a state without overlapping, processing which is equivalent to code amount control and high-rate coding is performed for each prescribed image area to generate coded data, the coded data is decoded for each prescribed image area to generate N sets of image data, the N sets of image data are processed with high-rate decoding to generate the image data in the number of N, and the image data in the number of N are synthesized to generate image data to reproduce the input image data, where N is a constant.

In another aspect of the present invention, a video signal coding device controls a code amount of an input image A having a prescribed size to perform high-rate coding of an image B having a size approximately N times the prescribed size. Information corresponding to a prescribed number of coding units of the input image B is substantially divided equally substantially into images A in the number of N, processing which is equivalent to high-rate coding of each of images in the number of N is performed to generate N sets of coded data, and the coded data is output as coded data for the image data B, where N is a constant.

In another aspect of the present invention, a video signal transmission apparatus performs high-rate coding of an image B having pixels approximately N times larger than an image A having a prescribed size to obtain coded data and transmitting the coded data, information of the image B to be transmitted is substantially divided equally into a prescribed number of coding units. Processing which is equivalent to high-rate coding of each of the images in the number of N is performed to generate N sets of coded data, and the N sets of coded data are transmitted by an substantially equal format as for coded data of the images in the number of N having the same size as the image A, where N is a constant.

In another aspect of the present invention, a video signal recording apparatus for recording an HD signal in a magnetic tape in the state where the data of the HD signal is compressed, the video signal recording apparatus includes deciding means for deciding the type of the HD signal among a first signal corresponding to 1080 frame effective lines, 1125 total frame lines, and a field frequency of 60 Hz, a second signal corresponding to 1035 frame effective lines, 1125 total frame lines, and a field frequency of 60 Hz, a third signal corresponding to 960 frame effective lines, 1050 total frame lines, and a field frequency of 60 Hz, and a fourth signal corresponding to 1152 frame effective lines, 1250 total frame lines, and a field frequency of 50 Hz; sampling means for sampling the input signal regardless of the type of the input signal; line conversion means for, when the input signal is decided to be the first signal, converting the number of lines only in a top area and a bottom area among frame effective lines of the input signal to an equal number with the number of frame transmission lines of the second signal; shuffling means for regarding the frame transmission lines of the first signal obtained as a result of the line conversion to be the same as a frame transmission area of the second signal, and rearranging pixels in frame transmission areas of the second, third and fourth signals block by block; compression means for compressing the output from the shuffling means so that data of a certain number blocks is a constant data amount; and recording means for recording the output from the shuffling means by adjusting a cylinder rotation speed and a magnetic tape transportation speed to be equal with respect to the four types of HD signals.

In another aspect of the present invention, a video signal recording apparatus for recording an HD signal in a magnetic tape in the state where the data of the HD signal is compressed includes deciding means for deciding the type of the HD signal among a first signal corresponding to 1080 frame effective lines, 1125 total frame lines, and a field frequency of 60 Hz, a second signal corresponding to 1035 frame effective lines, 1125 total frame lines, and a field frequency of 60 Hz, a third signal corresponding to 960 frame effective lines, 1050 total frame lines, and a field frequency of 60 Hz, and a fourth signal corresponding to 1152 frame effective lines, 1250 total frame lines, and a field frequency of 50 Hz; sampling means for sampling the input signal regardless of the type of the input signal; signal conversion means for, when the input signal is decided to be the first signal, adding an ineffective pixel to a frame transmission area of the first signal so as to provide the first signal with pixels of the same number as in the frame transmission area of the fourth signal; shuffling means for regarding the frame transmission lines of the first signal obtained as a result of the line conversion to be the same as a frame transmission area of the second signal, and rearranging pixels in frame transmission areas of the second, third and fourth signals block by block; compression means for compressing the output from the shuffling means so that data of a certain number blocks is a constant data amount; and recording means for recording the output from the shuffling means by adjusting a cylinder rotation speed and a magnetic tape transportation speed of the first signal to 6/5 of those for the second, third and fourth signals.

In another aspect of the present invention, a video signal recording apparatus for recording an HD signal in a magnetic tape in the state where the data of the HD signal is compressed includes deciding means for deciding the type of the HD signal among a first signal corresponding to 1080 frame effective lines, 1125 total frame lines, and a field frequency of 60 Hz, a second signal corresponding to 1035 frame effective lines, 1125 total frame lines, and a field frequency of 60 Hz, a third signal corresponding to 960 frame effective lines, 1050 total frame lines, and a field frequency of 60 Hz, and a fourth signal corresponding to 1152 frame effective lines, 1250 total frame lines, and a field frequency of 50 Hz; sampling means for sampling the input signal a constant frequency when the input signal is one of the second, third and fourth signals and for sampling the first signal to equalize the number of pixel in a frame transmission area with that of the third signal; shuffling means for rearranging the pixels in frame transmission areas of the first, second, third and fourth signals block by block in accordance with the decision information; compression means for compressing the output from the shuffling means so that data of a certain number blocks is a constant data amount; and recording means for recording the output from the shuffling means by adjusting a cylinder rotation speed and a magnetic tape transportation speed to be equal with respect to the four types of HD signals.

In one embodiment of the invention, the sampling means samples the input signal at a constant frequency of 40.5 Mhz for a luminance signal and converts the number of pixels in the horizontal direction of the first signal to be equal to the frame transmission lines of the third signal.

In one embodiment of the invention, the sampling means samples the second, third and fourth signals at a constant frequency of 40.5 MHz for a luminance signal and samples the first signal at a frequency of 37.125 MHz for a luminance signal.

Thus, the invention described herein makes possible the advantages of (1) providing a video signal recording apparatus for recording a progressive scan signal in the state of being processed with high-rate coding to be highly compatible with a conventional apparatus produced for recording an interlaced scan standard-definition TV signal, (2) providing a video signal recording apparatus for recording a progressive scan signal in the state of being processed with high-rate coding, utilizing a conventional apparatus produced for recording an interlaced scan high-definition TV signal, (3) providing a video signal recording apparatus, for recording a progressive scan signal in the state of being processed with high-rate coding to be highly compatible with a conventional apparatus produced for recording an interlaced scan high-definition TV signal, (4) providing a video signal recording apparatus for recording both a progressive scan signal and an interlaced scan signal in the state of being processed with high-rate coding, (5) providing a video signal recording apparatus for performing rate conversion accompanying A/D conversion of a progressive scan signal which is performed at the sampling frequency as the sampling frequency of an interlaced scan high-definition TV signal, (6) providing a video signal recording apparatus for improving image quality for the search picture mode by rearranging coded block obtained from a progressive scan TV signal, (7) providing a video signal recording apparatus for vertically compressing a color difference signal of a progressive scan signal to ⅓ so as to have the same number of pixels as a color difference signal of a 4:2:2 signal and so as to provide arrangement of coding units in a track with respect to the image plane corresponding to the progressive scan signal with high compatibility with an interlaced scan TV signal, (8) providing a video signal recording apparatus for rearranging two successive frames of a progressive scan signal so as to appear to be obtained by interlaced scanning, thus to enable intra-frame correction, (9) providing a video signal recording apparatus for performing coding of two successive frames of a progressive scan signal in combination to improve image quality, (10) providing a video signal recording apparatus for realizing coding of two successive frames of a progressive scan signal in combination using a plurality of channels, (11) providing a video signal recording apparatus for adding a memory to improve image quality for the search picture mode, (12) providing a video signal recording apparatus for increasing the number of effective pixels of a color difference signal to record data at a high rate using a conventional IC, (13) providing a video signal recording apparatus for adding a memory to improve the quality of an image obtained in the search picture mode from an image recorded at a high rate, (14) providing a video signal recording and reproduction apparatus for converting one frame of a non-interlaced scan signal into an interlaced scan signal to record and reproduce a non-interlaced scan signal in addition to an interlaced scan signal, (15) providing a video signal recording apparatus for converting two frames of a non-interlaced scan signal to record and reproduce a non-interlaced scan signal in addition to an interlaced scan signal, (16) providing a video signal recording and reproduction apparatus for converting a non-interlaced scan signal into a different type of interlaced scan signal to record and reproduce a non-interlaced scan signal in addition to an interlaced scan signal, (17) providing a video signal recording and reproduction apparatus for converting a non-interlaced scan signal into a still different type of interlaced scan signal to record and reproduce a non-interlaced scan signal in addition to an interlaced scan signal, (18) providing a video signal recording apparatus for converting a signal having an interlaced scan luminance signal and interlaced scan color difference signals into an interlaced scan signal to record and reproduce a non-interlaced scan signal in addition to an interlaced scan signal, (19) providing a video signal coding device for substantially dividing an input image equally into a plurality of image data, (20) providing a video signal coding device for substantially dividing an input image equally into a plurality of image data and locating image information in the plurality of image data in a partially overlapped state, (21) providing a video signal coding device for preventing data drop caused by an error during transmission using the overlapped part of the image data, (22) providing a video signal transmission apparatus having different specifications by utilizing a conventional high-rate coding device and a conventional data transmission device without any significant alteration, (23) providing a high-rate coding device for performing high-rate coding of an input image having different specifications from an image for which the high-rate coding device is intended by dividing information in the input image substantially equally into a plurality of image data to convert the input image so that the input image has the specifications suitable for the high-rate coding device, (24) providing a high-rate coding device for performing high-rate coding of an input image having different specifications from an image for which the high-rate coding device is intended by substantially dividing information in the input image equally into a plurality of image data to convert the input image so that the input image has the specifications suitable for the high-rate coding device and transmitting such image data, (25) providing a video signal recording and reproduction apparatus for performing data compression and recording in the state where the resolution in an area which is least influenced in terms of visual characteristic and an over-scan area on a TV monitor in accordance with the type of the input signal which is determined by the deciding device is reduced, (26) providing a video signal recording apparatus for adding an effective pixel to perform signal conversion for data compression and recording the data in a magnetic tape while the recording speed is increased to 6/5, so as to record data corresponding to all the pixels in an effective area of an HD signal on the magnetic tape, and (27) providing a video signal recording apparatus for reducing data amount by changing the sampling frequency to perform compression and recording.

These and other advantages of the present invention will become apparent to those skilled in the art upon reading and understanding the following detailed description with reference to the accompanying figures.

BRIEF DESCRIPTION OF THE DRAWINGS

FIG. 21 is a view illustrating a method for converting a video signal in the fourteenth example;

FIG. 23 is a view illustrating a method for converting a video signal in the fifteenth example;

FIG. 24 is a view illustrating a method for converting a video signal in the sixteenth example;

FIG. 25 is a view illustrating a method for converting a video signal in a seventeenth example according to the present invention;

DESCRIPTION OF THE PREFERRED EMBODIMENTS

Hereinafter, the present invention will be described by way of illustrative examples with reference to the accompanying drawings.

EXAMPLE 1

Figure 1:
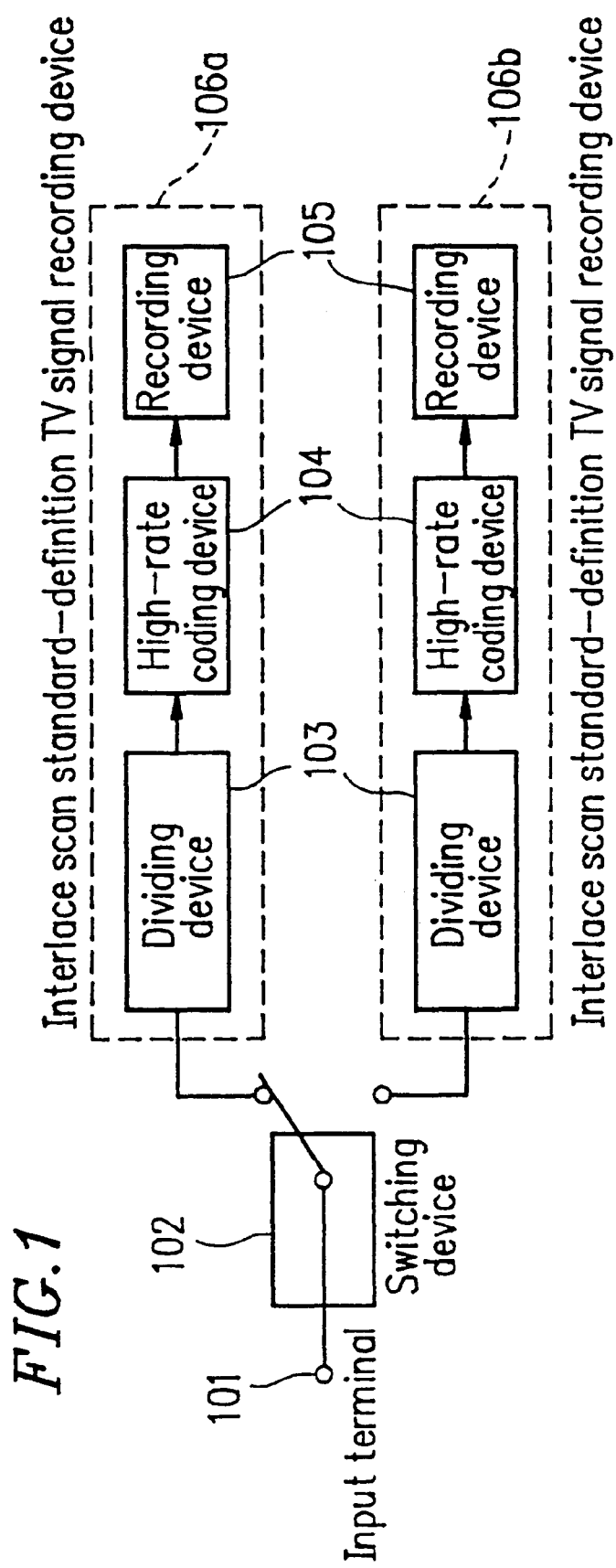
FIG. 1 is a block diagram of a video signal recording apparatus in a first example according to the present invention.

A first example according to the present invention will be described with reference to FIG. 1. FIG. 1 is a block diagram of a video signal recording apparatus 100 in the first example.

The video signal recording apparatus 100 includes an input terminal 101 to which a progressive scan TV signal is input, a switching device 102 for switching the input signal, frame by frame, and two interlaced scan standard-definition TV signal recording devices 106a and 106b. The two interlaced scan standard-definition TV signal recording devices 106a and 106b each include a dividing device 103 for dividing the input signal into a plurality of coding units, a high-rate coding device 104 for performing high-rate coding of each coding unit, and a recording device 105 for recording the data obtained by the high-rate coding.

The video signal recording apparatus 100 having the above-described configuration operates in the following manner.

A digital progressive scan TV signal is input to the input terminal 101, and is switched frame by frame to be sent to the interlaced scan standard-definition TV signal recording devices 106a and 106b alternately by the switching device 102. The interlaced scan standard-definition TV signal recording devices 106a and 106b each operate as follows:

Each frame of the digital progressive scan TV signal is divided into a plurality of coding units by the dividing device 103, and high-rate coding of each coding unit is performed by the high-rate coding device 104. Then, the resultant data is recorded in a track formed on a magnetic tape by the recording device 105. The interlaced scan standard-definition TV signal recording devices 106a and 106b record the data corresponding to one frame of the progressive scan TV signal in the same manner as the conventional video signal recording apparatus records data corresponding to one frame of an interlaced scan standard-definition TV signal.

In the first example according to the present invention, the switching device 102 is provided for sending frames of the input signal to the two interlaced scan standard-definition TV signal recording devices 106a and 106b alternately. Due to such switching, data corresponding to one frame of a progressive scan TV signal can be coded and recorded as the same quantity of data corresponding to one frame of an interlaced scan TV signal.

Although the progressive scan TV signal is divided into a plurality of coding units by the same method as an interlaced scan standard-definition TV signal is divided in the first example, a method used for dividing an interlaced scan high-definition TV signal is also usable.

One exemplary progressive scan TV signal which is input to the video signal recording apparatus 100 is obtained by performing rate conversion of a high-definition TV signal conforming to the studio standards by 9/16 for a luminance signal and by 3/8 for a color difference signal. As a result of such rate conversion, the data corresponding to the luminance signal includes 720 (horizontal)×720 (vertical) pixels, and the data corresponding to the color difference signal includes 240 (horizontal)×720 (vertical) pixels. Another exemplary progressive scan TV signal is obtained by progressively scanning a standard-definition TV signal defined as a 4:2:2 signal. Other progressive scan TV signals are also usable.

In the case where a DCT (discrete cosine transform) coding is used for the high-rate coding in the first example, intra-frame coding is preferably performed, instead of utilizing inter-field correlation which is used for coding an interlaced scan TV signal. By performing intra-frame coding, the image quality is improved.

EXAMPLE 2

Figure 2:
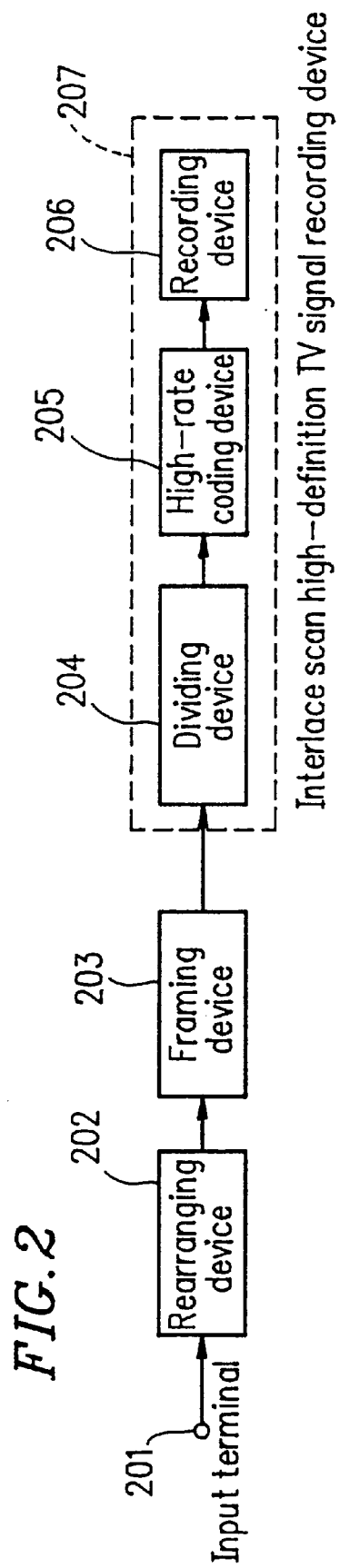
FIG. 2 is a block diagram of a video signal recording apparatus in a second example according to the present invention.
Figure 3A:
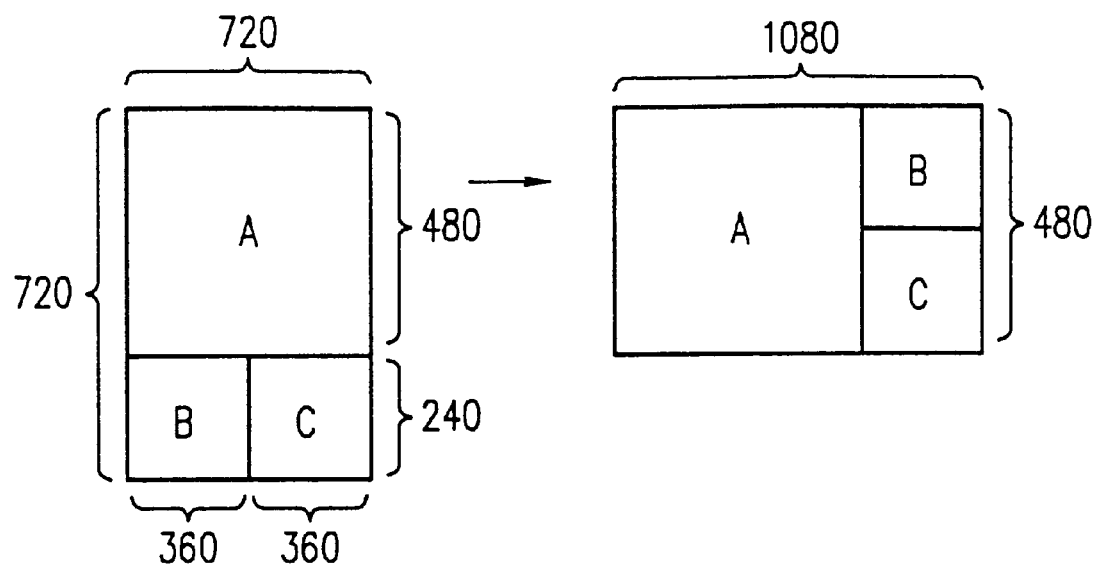
FIG. 3A is a view illustrating a conversion method for a luminance signal in the second example.

A second example according to the present invention will be described with reference to FIGS. 2, 3A and 3B. FIG. 2 is a block diagram of a video signal recording apparatus 200 in the second example.

The video signal recording apparatus 200 includes an input terminal 201 to which a progressive scan TV signal is input, a rearranging device 202 for rearranging pixels corresponding to the input signal, a framing device 203 for framing data corresponding to two fields input thereto, and an interlaced scan high-definition TV signal recording device 207. The interlaced scan high-definition TV signal recording device 207 includes a dividing device 204 for dividing the framed data into a plurality of coding units, a high-rate coding device 205 for performing high-rate coding of each coding unit, and a recording device 206 for recording the data obtained by the high-rate coding.

The video signal recording apparatus 200 having the above-described configuration operates in the following manner.

A digital progressive scan TV signal is input to the input terminal 201. Pixels corresponding each of a plurality of frames of the input signal are rearranged by the rearranging device 202, for example, as is illustrated in FIGS. 3A and 3B. FIG. 3A shows a pixel arrangement of data corresponding to a luminance signal of the progressive scan TV signal described in the first example and how the pixels are rearranged, and FIG. 3B shows a pixel arrangement of data corresponding to a color difference signal of the progressive scan TV signal described in the first example and how the pixels are rearranged. As is shown in FIG. 3A, 720 (horizontal)×720 (vertical) pixels are divided into three areas A, B and C. Area A includes 720 (horizontal)×480 (vertical) pixels, and areas B and C each include 360 (horizontal)×240 (vertical) pixels. The pixels in the three areas A, B and C are rearranged to be 1080 (horizontal)×480 (vertical) pixels without changing the arrangement in each area.

Figure 3B:
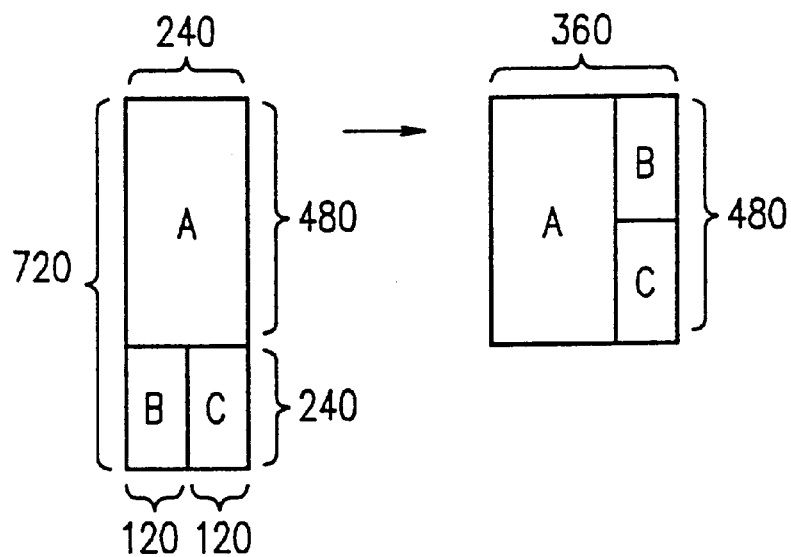
FIG. 3B is a view illustrating a conversion method for a color difference signal in the second example.

Regarding the color difference signal, as is shown in FIG. 3B, 240 (horizontal)×720 (vertical) pixels are divided into three areas A, B and C. Area A includes 240 (horizontal)× 480 (vertical) pixels, and areas B and C each include 120 (horizontal)×240 (vertical) pixels. The pixels in the three areas A, B and C are rearranged to be 360 (horizontal)×480 (vertical) pixels without changing the arrangement in each area.

The pixel arrangement obtained by such conversion is the same as the pixel arrangement of one field of an interlaced scan high-definition TV signal of the 1125/60 system which is to be divided into a plurality of coding units.

Figure 15A:
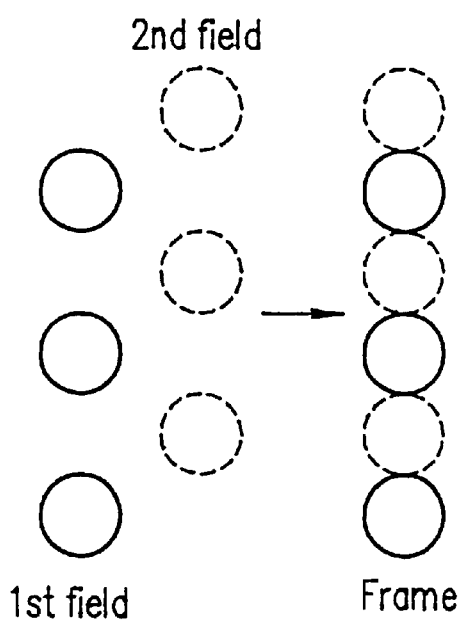
FIG. 15A is a view illustrating a conventional method for combining data.

The resultant data corresponding to two frames of the progressive scan TV signal is converted to have 1080 (horizontal)×960 (vertical) pixels by the framing device 203 in the same manner as forming data corresponding to one frame from data corresponding to two fields of an interlaced scan TV signal (shown in FIG. 15A, infra). The resultant data is sent to the interlaced scan high-definition TV signal recording device 207 and is processed in the same manner as an interlaced scan high-definition TV signal. In detail, the signal interlaced scan high-definition TV signal recording device 207 operates as follows: The signal sent from the framing device 203 is divided into a plurality of coding units by the dividing device 204, and high-rate coding of each coding unit is performed by the high-rate coding device 205. Then, the resultant data is recorded in a track formed on a magnetic tape by the recording device 206.

In the second example according to the present invention, the rearranging device 202 is provided for rearranging data of a progressive scan TV signal into one field of an interlaced scan high-definition TV signal. Thus, a progressive scan TV signal can be recorded by the interlaced scan high-definition TV signal recording device 207.

The manner of pixel rearrangement performed by the rearranging device 202 is arbitrary. In the case when the number of pixels corresponding to the input signal is insufficient, provision of dummy data or other types of treatment is usable.

In the case where the interlaced scan high-definition TV signal recording device 207 is produced for signals of the 1125/60 system and the dividing device 204 also converts the data corresponding to an input signal including 1008 (horizontal)×512 (vertical) pixels into data corresponding 1080 (horizontal)×480 (vertical) pixels, the rearrangement by the rearranging device 202 needs to be performed in consideration of such conversion performed by the dividing device 204.

In the second example, the progressive scan TV signal which is input to the video signal recording apparatus 200 is obtained by rate conversion of a signal conforming to the studio standards described in the first example, but other types of progressive scan TV signals are also usable.

EXAMPLE 3

Figure 4:
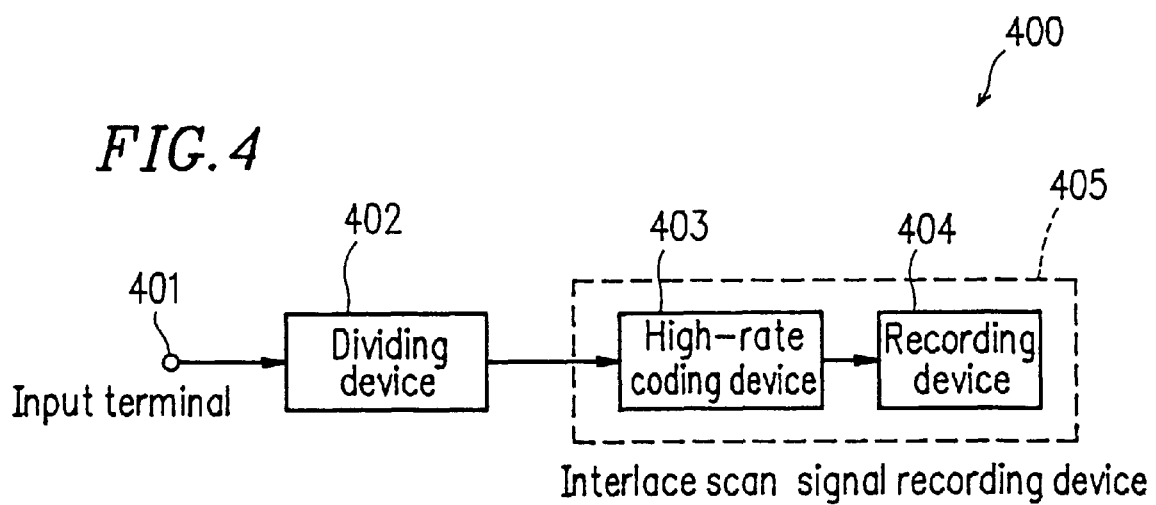
FIG. 4 is a block diagram of a video signal recording apparatus in a third example according to the present invention.

A third example according to the present invention will be described with reference to FIG. 4. FIG. 4 is a block diagram of a video signal recording apparatus 400 in the third example.

The video signal recording apparatus 400 includes an input terminal 401 to which a progressive scan TV signal is input, a dividing device 402 for dividing the input signal into a plurality of coding units, and an interlaced scan TV signal recording device 405, which is a part of an interlaced scan high-definition TV signal recording device. The interlaced scan TV signal recording device 405 includes a high-rate coding device 403 for performing high-rate coding of each coding unit, and a recording device 404 for recording the data obtained by the high-rate coding.

The video signal recording apparatus 400 having the above-described configuration operates in the following manner.

A digital progressive scan TV signal is input to the input terminal 401 and divided into a plurality of coding units by the dividing device 402. The dividing device 402 processes, for example, the signal described in the first example as follows: The progressive scan TV signal is vertically filtered by a color difference ½ filter (not shown) and then divided into a plurality of DCT blocks, each including 8 (horizontal)×8 (vertical) pixels. In detail, the data corresponding to the luminance signal having 720 (horizontal)× 720 (vertical) pixels is divided into 90 (horizontal)×90 (vertical) DCT blocks. The data corresponding to the color difference signal having 240 (horizontal)×720 (vertical) pixels is first filtered to have 240 (horizontal)×360 (vertical) pixels and then divided into 30 (horizontal)×45 (vertical) DCT blocks.

Next, a macroblock is formed of eight DCT blocks: six DCT blocks (3 (horizontal)×2 (vertical)) of the luminance signal and two DCT blocks of the color difference signal. The six DCT blocks of the luminance signal are located successively on the image plane. The two DCT blocks of the color difference signal are located at the same position on the image plane. Then, one coding unit is formed of five macroblocks which are away from one another in the image plane. In this manner, the data corresponding to one frame of the progressive scan TV signal is divided into 1350 coding units. Thus, the data corresponding to two frames includes 2700 coding units, which is the same as the number of coding units obtained by high-rate coding of the data corresponding to one frame of an interlaced scan high-definition TV signal of the 1125/60 system. The data corresponding to two frames of the progressive scan TV signal to be divided into coding units include the same number of pixels as in the conventional video signal recording apparatus produced for an interlaced scan high-definition TV signal. Accordingly, the memory capacity required for the division of a progressive scan TV signal is the same as required for dividing an interlaced scan high-definition TV signal. Thus, the division of the progressive scan TV signal can be performed easily by simply altering address control of a conventional dividing device of the conventional video signal recording apparatus. The coding units obtained from data corresponding to two frames by such division are output to the interlaced scan TV signal recording device 405.

The interlaced scan TV signal recording device 405 processes the coding units in the same manner as data corresponding to one frame of an interlaced scan high-definition TV signal. In detail, high-rate coding of each coding unit is performed by the high-rate coding device 403, and then the resultant data is recorded in a track formed on a magnetic tape by the recording device 404.

In the third example according to the present invention, the dividing device 402 is provided for dividing the input signal in a slightly different manner from the conventional dividing method performed by the conventional video signal recording apparatus produced for an interlaced scan high-definition TV signal. Thus, a progressive scan TV signal can be recorded by the interlaced scan TV signal recording device 405, and the video signal recording apparatus 400 has a higher compatibility with the conventional recording apparatus produced for an interlaced scan high-definition TV signal.

Although the interlaced scan TV signal recording device 405 in the third example is a part of an interlaced scan high-definition TV signal recording device, an interlaced scan standard-definition TV signal recording device is also usable as in the first example. In such a case, the data obtained by the dividing device 402 is processed using a part of two interlaced scan standard-definition TV signal recording devices.

It is also possible to process data corresponding to one frame as one unit. In the case where a part of an interlaced scan standard-definition TV signal recording devices is used, only a single such recording device is needed. In the case where a part of an interlaced scan high-definition TV signal recording device is used, such processing is performed by slightly changing the interlaced scan high-definition TV signal recording device, for example, by doubling the cycle of an internal operational clock. In such a case, the memory capacity to be used can be halved.

In the third example, the progressive scan TV signal which is input to the video signal recording apparatus 400 is obtained by rate conversion of a signal conforming to the studio standards described in the first example, but other progressive scan TV signals are also usable.

The image quality is improved by performing intra-frame coding using DCT for high-rate coding.

EXAMPLE 4

Figure 5:
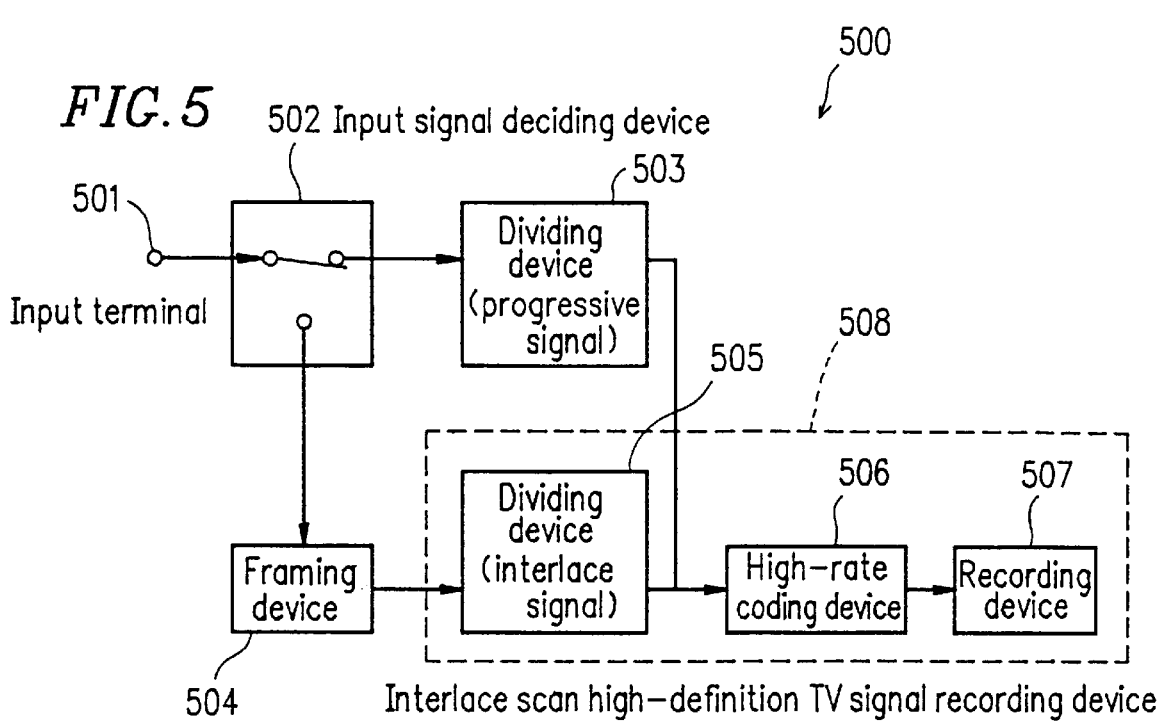
FIG. 5 is a block diagram of a video signal recording apparatus in a fourth example according to the present invention.

A fourth example according to the present invention will be described with reference to FIG. 5. FIG. 5 is a block diagram of a video signal recording apparatus 500 in the fourth example.

The video signal recording apparatus 500 includes an input terminal 501 to which a TV signal is input, an input deciding device 502 for deciding whether the input TV signal is a progressive scan TV signal or an interlaced scan TV signal, a dividing device 503 for dividing the progressive scan TV signal into a plurality of coding units, a framing device 504 for forming data corresponding to one frame from the data corresponding to two fields input thereto, and an interlaced scan high-definition TV signal recording device 508. The interlaced scan high-definition TV signal recording device 508 includes another dividing device 505 for dividing the interlaced scan TV signal into a plurality of coding units, a high-rate coding device 506 for performing high-rate coding of each coding unit, and a recording device 507 for recording the data obtained by the high-rate coding.

The video signal recording apparatus 500 having the above-described configuration operates in the following manner.

A TV signal is input to the input terminal 501. The input signal deciding device 502 decides whether the input TV signal is a progressive scan TV signal or an interlaced scan TV signal. If decided to be a progressive scan TV signal, the TV signal is sent to the dividing device 503. If decided to be an interlaced scan TV signal, the TV signal is sent to the framing device 504. The signal which is sent to the dividing device 503 is divided into a plurality of coding units in the same manner as in the third example, and the coding units corresponding to two frames are output to the high-rate coding device 506. The signal which is sent to the framing device 504 is framed by the framing device 504 as is described in the Description of the Related Art, and then divided into a plurality of coding units by the dividing device 505. The coding units are sent to the high-rate coding device 506. The same number of coding units are obtained from the progressive scan TV signal and from the interlaced scan TV signal. The coding units from the progressive scan TV signal and the coding units from the interlaced scan TV signal are both processed by the interlaced scan high-definition TV signal recording device 508. In detail, the coding units are processed with high-rate coding by the high-rate coding device 506 and then recorded in a magnetic tape by the recording device 507.

In the fourth example according to the present invention, the input signal deciding device 502 for deciding whether the input signal is a progressive scan TV signal or an interlaced scan TV signal and the dividing device 503 used for a progressive scan TV signal are added to the conventional recording apparatus produced for an interlaced scan high-definition TV signal. Due to such a configuration, both of an interlaced scan TV signal and a progressive scan TV signal can be recorded by one video signal recording apparatus 500.

In the fourth example, a progressive scan TV signal and an interlaced scan TV signal are separately divided into coding units. The two different types of signals can be performed by simply altering address control while using the same memory. The video signal recording apparatus can have other configurations. An arbitrary type of the progressive scan TV signal can be input to the video signal recording apparatus 500.

EXAMPLE 5

Figure 6:
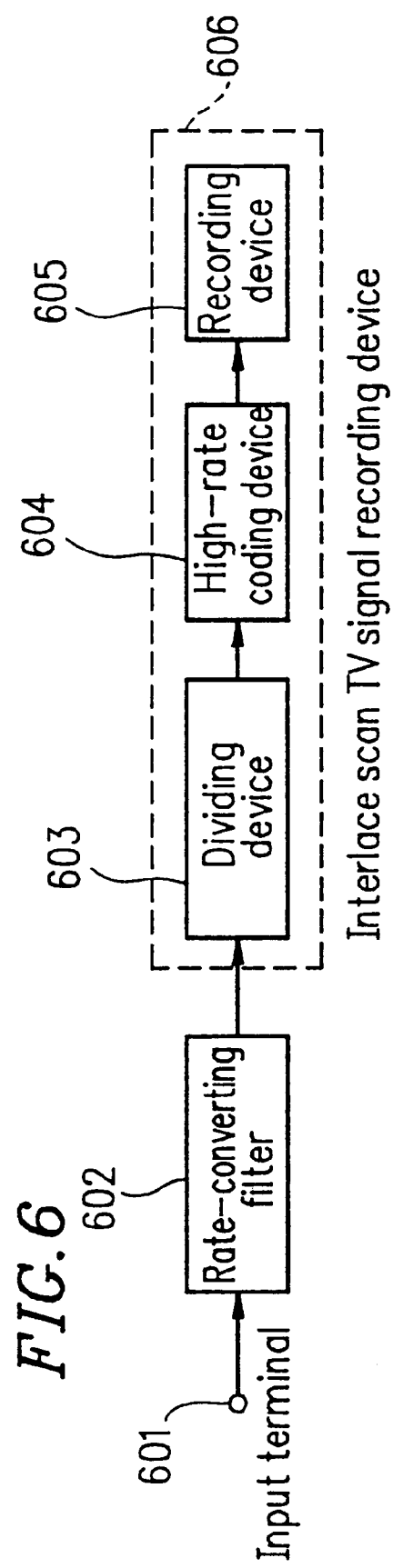
FIG. 6 is a block diagram of a video signal recording apparatus in a fifth example according to the present invention.
Figure 7:
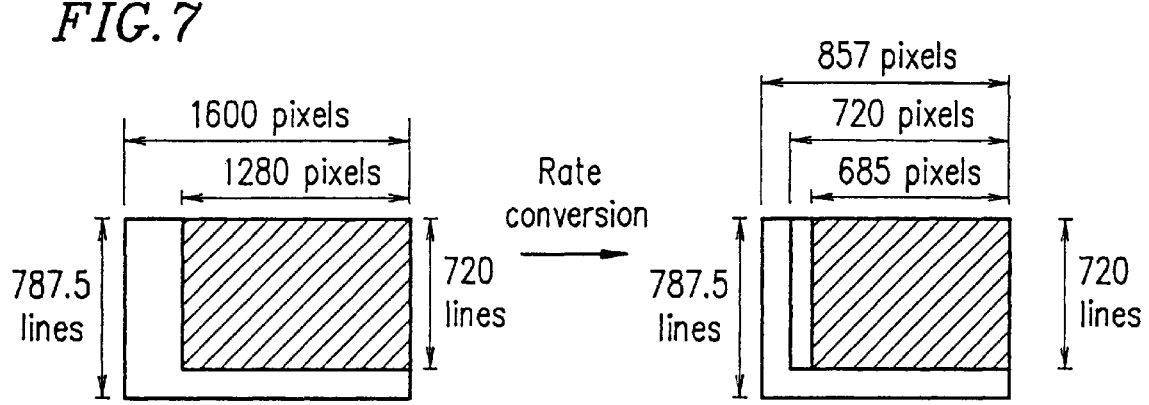
FIG. 7 is a view illustrating a rate conversion method in the fifth example.

A fifth example according to the present invention will be described with reference to FIGS. 6 and 7. FIG. 6 is a block diagram of a video signal recording apparatus 600 in the fifth example.

The video signal recording apparatus 600 includes an input terminal 601 to which a progressive scan TV signal is input, a rate-converting filter 602 for performing rate conversion of the input signal, and an interlaced scan TV signal recording device 606 which is a part of an interlaced scan high-definition TV signal recording device. The interlaced scan TV signal recording device 606 includes a dividing device 603 for dividing the input signal into a plurality of coding units, a high-rate coding device 604 for performing high-rate coding of each coding unit, and a recording device 605 for recording the data obtained by the high-rate coding.

The video signal recording apparatus 600 having the above-described configuration operates in the following manner.

An analog progressive scan TV signal which is input to the input terminal 601 is converted into a digital signal by the rate-converting filter 602 and output to the dividing device 603. FIG. 7 illustrates how the rate conversion of a luminance signal is performed by the rate-converting filter 602. The data corresponding to the luminance signal of the input signal shown on the left of FIG. 7 is obtained by sampling at a frequency of 75.6 MHz. Such data includes 1,600 pixels (horizontal)×787.5 lines (vertical). This input signal is a signal for ATV (advanced TV), and the specifications are defined in *Grand Alliance HDTV System Specification*. The effective pixel area includes 1,280 pixels (horizontal)×720 lines (vertical). Such a signal is processed with rate conversion at a sampling frequency of 40.5×1,001 MHz, and as a result, a signal corresponding to an effective pixel area which includes 685 pixels (horizontal)×720 lines (vertical) is obtained. In the case of the NTSC system using 59.94 Hz as a vertical synchronization signal, the sampling frequency used for the rate conversion is 40.5 MHz, which is used for other high-definition TV signals. In the case of the studio standards using 60.00 Hz, the sampling frequency for rate conversion is 40.5 MHz×60.00/59.94=40.5 MHz× 1.001. The resultant effective pixel area is changed to have 720 pixels (horizontal), for example, by addition of dummy data. In this manner, a signal corresponding to the same number of pixels as the signal used as the input signal in the third example is obtained. The signal obtained by the rate conversion is processed in the same manner as in the third example.

In the fifth example according to the present invention, the rate-converting filter 602 is provided for performing rate conversion accompanying conversion of an analog signal into a digital signal. Since the effective pixel area is changed by the rate conversion, such rate conversion can be performed at the same sampling frequency as an interlaced scan high-definition TV signal.

Although the sampling frequency of the input signal is 75.6 MHz in the fifth example, other frequencies are also usable.

In the fifth example, the effective pixel area obtained by the rate conversion is changed to have 720 pixels in the horizontal direction from having 685 pixels. The number of pixels of 720 in the horizontal direction can also be obtained by other methods, for example, by adding data to the 685 pixels in the horizontal direction.

In the fifth example, a part of an interlaced scan high-definition TV signal recording device is used as in the third example. Instead, a part of an interlaced scan standard-definition TV signal recording device can be used as in the first example. In such a case, the data obtained by the dividing device 603 is processed using a part of two interlaced scan standard-definition TV signal recording devices.

EXAMPLE 6

Figure 8:
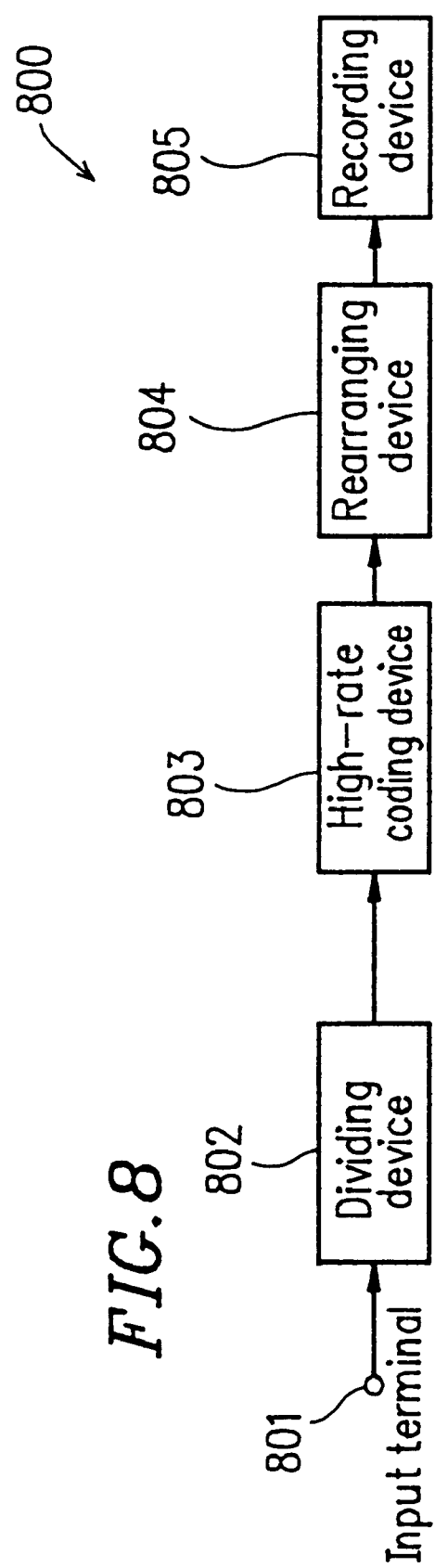
FIG. 8 is a block diagram of a video signal recording apparatus in a sixth example according to the present invention.
Figure 9:
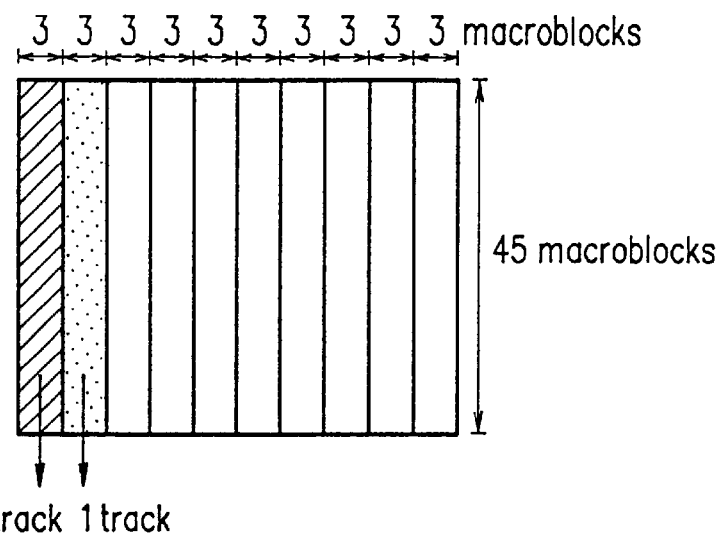
FIG. 9 is a view illustrating a recording pattern on a track.

A sixth example according to the present invention will be described with reference to FIGS. 8 through 10. FIG. 8 is a block diagram of a video signal recording apparatus 800 in the sixth example.

The video signal recording apparatus 800 includes an input terminal 801 to which a progressive scan TV signal is input, a dividing device 802 for dividing the input signal into a plurality of coding units, a high-rate coding device 803 for performing high-rate coding of each coding unit, a rearranging device 804 for rearranging coding units output from the high-rate coding device 803, and a recording device 805 for recording the rearranged data.

The video signal recording apparatus 800 having the above-described configuration operates in the following manner.

A progressive scan TV signal which is input to the input terminal 801 is divided into a plurality of coding units by the dividing device 802, and is processed with high-rate coding by the high-rate coding device 803 in the same manner as in the third example. The coding units output from the high-rate coding device 803 is input to the rearranging device 804.

For comparison, the processing in the third example will be described again briefly. In the third example, data corresponding to one frame of the progressive scan TV signal is divided into 30 (horizontal)×45 (vertical) macroblocks. The coding units which are input to the high-rate coding device 403 each include five macroblocks which are away from one another on the image plane. In the sixth example, the rearranging device 804 rearranges the coding units to prescribed positions within ten recording blocks, each of which includes 3 (horizontal)×45 (vertical) macroblocks as is shown in FIG. 9. The data in such recording blocks are recorded sequentially in respective tracks formed on a magnetic tape by the recording device 805.

In the sixth example according to the present invention, the provision of the rearranging device 804 allows the data to be recorded in the magnetic tape in correspondence with the positions thereof on the image plane. Thus, the image quality for a search picture mode can be improved.

Figure 10:
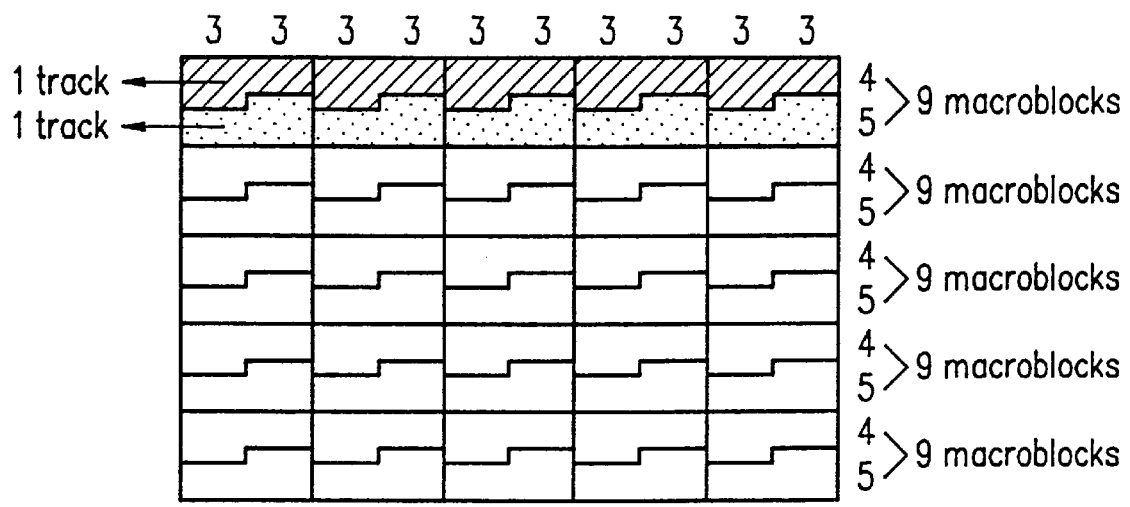
FIG. 10 is a view illustrating another recording pattern on a track.

The macroblocks can be divided horizontally as is shown in FIG. 10. In this manner, the same type of search picture mode as is performed by the conventional recording apparatus produced for an interlaced scan TV signal can be performed. The rearrangement can be performed in other manners. An arbitrary progressive scan TV signal can be input to the video signal recording apparatus 800.

EXAMPLE 7

Figure 11:
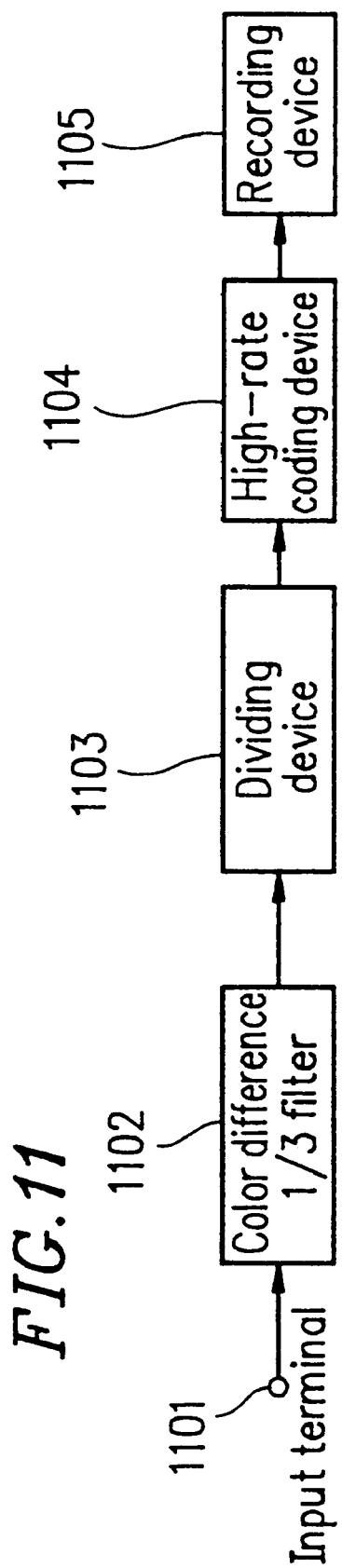
FIG. 11 is a block diagram of a video signal recording apparatus in a seventh example according to the present invention.

A seventh example according to the present invention will be described with reference to FIG. 11. FIG. 11 is a block diagram of a video signal recording apparatus 1100 in the seventh example.

The video signal recording apparatus 1100 includes an input terminal 1101 to which a progressive scan TV signal is input, a color difference ⅓ filter 1102 for vertically filtering a color difference signal of the input signal, a dividing device 1103 for dividing the resultant signal into a plurality of coding units, a high-rate coding device 1104 for performing high-rate coding of each coding unit, and a recording device 1105 for recording the data obtained by the high-rate coding.

The video signal recording apparatus 1100 having the above-described configuration operates in the following manner.

As an exemplary progressive scan TV signal which is input to the input terminal 1101, a high-definition signal conforming to the studio standards obtained by rate conversion performed by 9/16 both for a luminance signal and a color difference signal is used in the seventh example. As a result of such rate conversion, the data corresponding to the luminance signal includes 720 (horizontal)×720 (vertical) pixels, and the data corresponding to the color difference signal includes 360 (horizontal)×720 (vertical) pixels. Such a progressive scan TV signal is vertically filtered by the color difference ⅓ filter 1102. Namely, the data corresponding to the resultant color difference signal includes 360 (horizontal)×240 (vertical) pixels. The same number of pixels are included in the data corresponding to a signal obtained by vertically filtering a color difference signal of an interlaced scan standard-definition TV signal defined as a 4:2:2 signal to be ½ to be recorded by the conventional system.

Next, the resultant signal is divided into a plurality of coding units by the dividing device 1103. The dividing device 1103 operates as follows: The input signal is first divided into a plurality of DCT blocks each including 8 (horizontal)×8 (vertical) pixels. As a result, the data corresponding to the luminance signal includes 90 (horizontal)×90 (vertical) DCT blocks, and the data corresponding to the color difference signal includes 45 (horizontal)×30 (vertical) DCT blocks. Next, one macroblock is formed of eight DCT blocks: six DCT blocks (2 (horizontal)×3 (vertical)) of the luminance signal and two DCT blocks of the color difference signal. The six DCT blocks of the luminance signal are located successively on the image plane. The two DCT blocks of the color difference signal are located at the same position on the image plane. Then, one coding unit is formed of five macroblocks which are away from one another on the image plane. In this manner, data corresponding to one frame of the progressive scan TV signal is divided into 1350 coding units as in the third example. The same number of coding units are obtained by dividing data corresponding to one frame of an interlaced scan TV signal of the 1125/60 system. The resultant coding units are processed in the same manner as in the third example.

In the seventh example according to the present invention, due to the color difference ⅓ filter 1102, data corresponding to the color difference signal is vertically filtered to be ⅓ to have the same number of pixels as a color difference signal of an interlaced scan standard-definition TV signal defined as a 4:2:2 signal conforming to the studio standards. Accordingly, rate conversion of a color difference signal is not needed in order to perform rate conversion of a high-definition TV signal into a standard-definition TV signal. Further, since the data corresponding to the filtered color difference signal is divided by the dividing device 1103 to have 45 (horizontal)×30 (vertical) macroblocks, the distribution of the macroblocks on the image plane becomes closer to the distribution of the macroblocks of an interlaced scan TV signal. Thus, the progressive scan TV signal becomes highly compatible with an interlaced scan TV signal.

An arbitrary progressive scan TV signal can be input to the video signal recording apparatus 1100.

As is appreciated from the above description, in the seventh example, the video signal recording apparatus 1100 uses a part of an interlaced scan high-definition TV signal recording device as in the third example. Instead, an interlaced scan standard-definition TV signal recording device can be used as in the first example. Processing of data corresponding to one frame as one unit is realized by slightly altering the configuration, for example, by doubling the cycle of an internal operational clock. The image quality is improved by performing intra-frame coding using DCT for high-rate coding.

EXAMPLE 8

Figure 12:
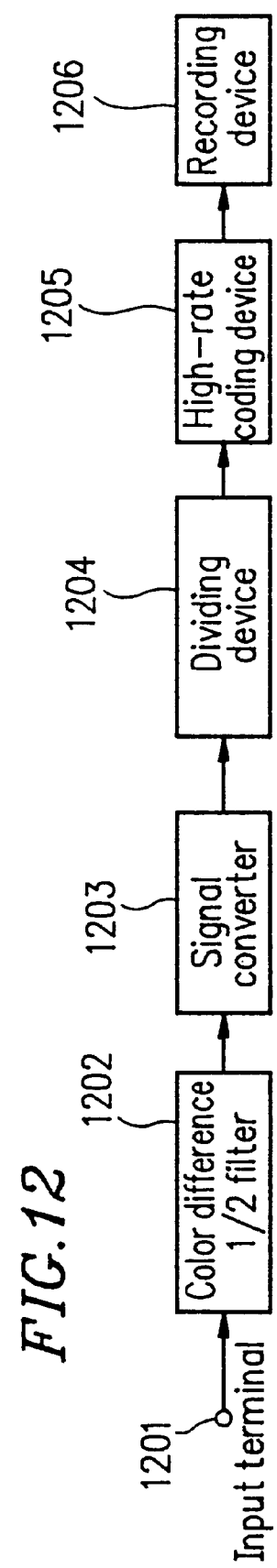
FIG. 12 is a block diagram of a video signal recording apparatus in an eighth example according to the present invention.
Figure 13:
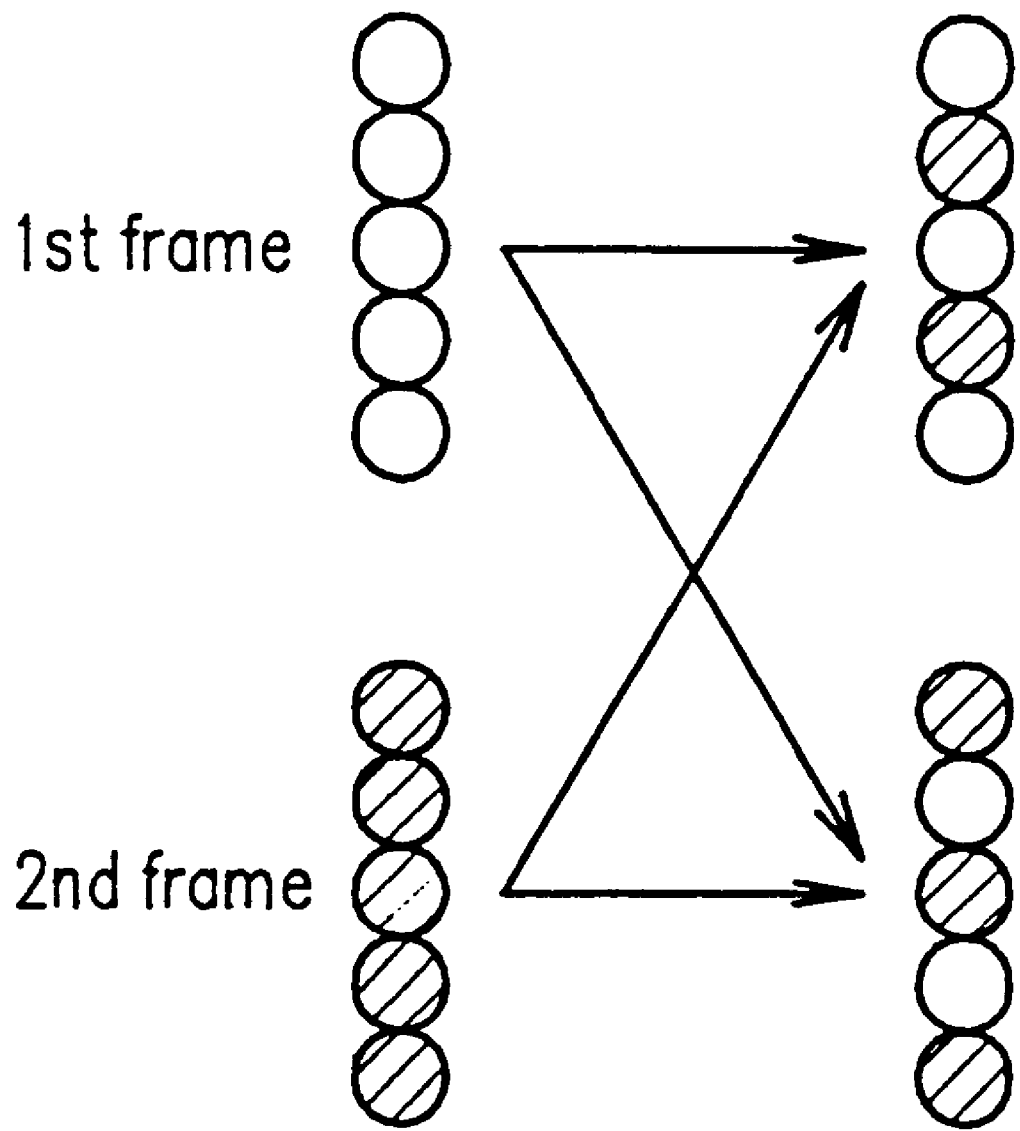
FIG. 13 is a view illustrating conversion to of a progressive scan signal into a signal which appears to be obtained by interlaced scanning in the eighth example.

An eighth example according to the present invention will be described with reference to FIGS. 12 and 13. FIG. 12 is a block diagram of a video signal recording apparatus 1200 in the eighth example.

The video signal recording apparatus 1200 includes an input terminal 1201 to which a progressive scan TV signal is input, a color difference ½ filter 1202 for vertically filtering a color difference signal of the input signal, a signal converter 1203 for converting two successive frames of the input signal into two frames which appear to be obtained by interlaced scanning, a dividing device 1204 for dividing the resultant signal into a plurality of coding units, a high-rate coding device 1205 for performing high-rate coding of each coding unit, and a recording device 1206 for recording the data obtained by the high-rate coding.

The video signal recording apparatus 1200 having the above-described configuration operates in the following manner.

A progressive scan TV signal is input to the input terminal 1201. A color difference signal of the input signal is vertically filtered to be ½ by the color difference ½ filter 1202. The resultant signal is sent to the signal converter 1203. FIG. 13. illustrates the conversion performed by the signal converter 1203. As is shown in FIG. 13, the data corresponding to the two frames of the progressive scan TV signal is scanned and rearranged so as to locate the data from the first frame and the second frame alternately. The resultant signal is processed in the same manner as in the third example. In detail, the signal is divided into a plurality of coding units by the dividing device 1204, high-rate coding of each unit is performed by the high-rate coding device 1205, and the data obtained by the high-rate coding is recorded in a magnetic tape by the recording device 1206.

In the eighth example according to the present invention, the signal converter 1203 converts two successive frames of the progressive scan TV signal into two frames which appear to be obtained by interlaced scanning. Due to the signal converter 1203, even if one of two channels of a video head is damaged, signals from the two frames can be reproduced while performing correction within the frame. Accordingly, continuity of a reproduced image in terms of time can be guaranteed.

In the eighth example according to the present invention, a progressive high-definition TV signal recording device is used, but a progressive standard-definition TV signal recording device is also usable.

An arbitrary progressive scan TV signal can be input to the video signal recording apparatus 1200.

In the conventional video signal recording apparatus, the data is framed and divided into coding units separately. Instead, framing and division can be performed simultaneously. In such a case, the configuration of the video signal recording apparatus needs to be altered so as to prevent framing while the data is divided into coding units when one frame of a progressive scan TV signal is input.

By providing the recording device 1206 with a function of rearranging the blocks as in the sixth example, the image quality for the search picture mode is improved.

In the first through eight examples, other configurations are also usable, and the method for high-rate coding is arbitrary.

EXAMPLE 9

Figure 14:
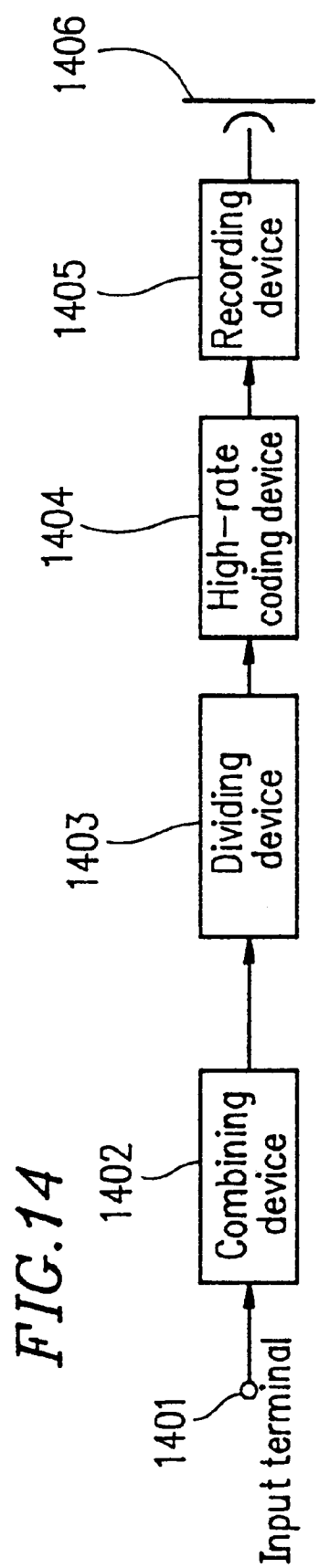
FIG. 14 is a block diagram of a video signal recording apparatus in a ninth example according to the present invention.
Figure 15B:
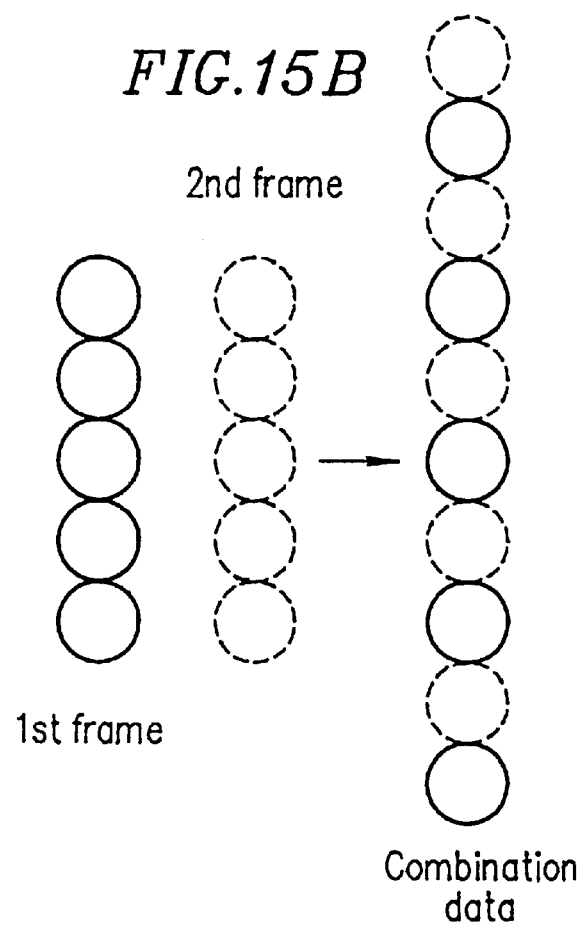
FIG. 15B is a view illustrating a method for combining data in the ninth example.

A ninth example according to the present invention will be described with reference to FIGS. 14, 15A and 15B. FIG. 14 is a block diagram of a video signal recording apparatus 1400 in the ninth example.

The video signal recording apparatus 1400 includes an input terminal 1401 to which a progressive scan TV signal is input, a combining device 1402 for combining data corresponding to two frames of the input signal thus to form combination data, a dividing device 1403 for dividing the combination data into a plurality of coding units, a high-rate coding device 1404 for performing high-rate coding of each coding unit, and a recording device 1405 for recording the data obtained by the high-rate coding in a magnetic tape 1406.

The video signal recording apparatus 1400 having the above-described configuration operates in the following manner.

A digital progressive scan TV signal is input to the input terminal 1401, and the data corresponding to two frames thereof are combined to form combination data.

FIG. 15A shows how the data corresponding to two fields of an interlaced scan signal are combined to form data corresponding to one frame. FIG. 15B shows how the data corresponding to two frames are combined to form combination data. The manner shown in FIG. 15B is the same as the manner shown in FIG. 15A. The data corresponding to two frames are combined to form combination data as is shown in FIG. 15B. The combination data is divided into a prescribed number of coding units by the dividing device 1403, and each coding unit is processed with high-rate coding by the high-rate coding device 1404 to the same quantity of codes as obtained by high-rate coding of one frame of an interlaced scan high-definition TV signals. Then, the resultant data is recorded by the recording device 1405 in the same number of tracks on the magnetic tape 1406 as one frame of an interlaced scan high-definition TV signal.

In the ninth example according to the present invention, the provision of the combining device 1402 reduces an area of a DCT block in one frame on the image plane. In the case where the images in two successive frames are different only slightly, the correlation between pixels in each DCT block is stronger than in a conventional DCT block. Thus, coding efficiency is raised. In the case where the images in two successive frames are different significantly, the coding efficiency is lower than in the conventional DCT block. However, the human eye recognizes deterioration in the quality of still images more easily than of moving images. Accordingly, slight quality deterioration in moving images does not generate any serious problem.

The dividing device 1403, the high-rate coding device 1404 and the recording device 1405 can be devices which are usually used for an interlaced scan high-definition TV signal.

As the combining device 1402, a device for framing an interlaced scan high-definition TV signal can be used for a standard-definition TV signal. Such a device can be easily used by simply altering the method for data input to and data output from the memory.

As the progressive scan TV signal to be input to the video signal recording apparatus 1400, a signal including a standard-definition TV signal defined as a 4:2:2 signal conforming to the studio standards and an auxiliary signal of a luminance signal required for progressive scanning is also usable.

EXAMPLE 10

Figure 16:
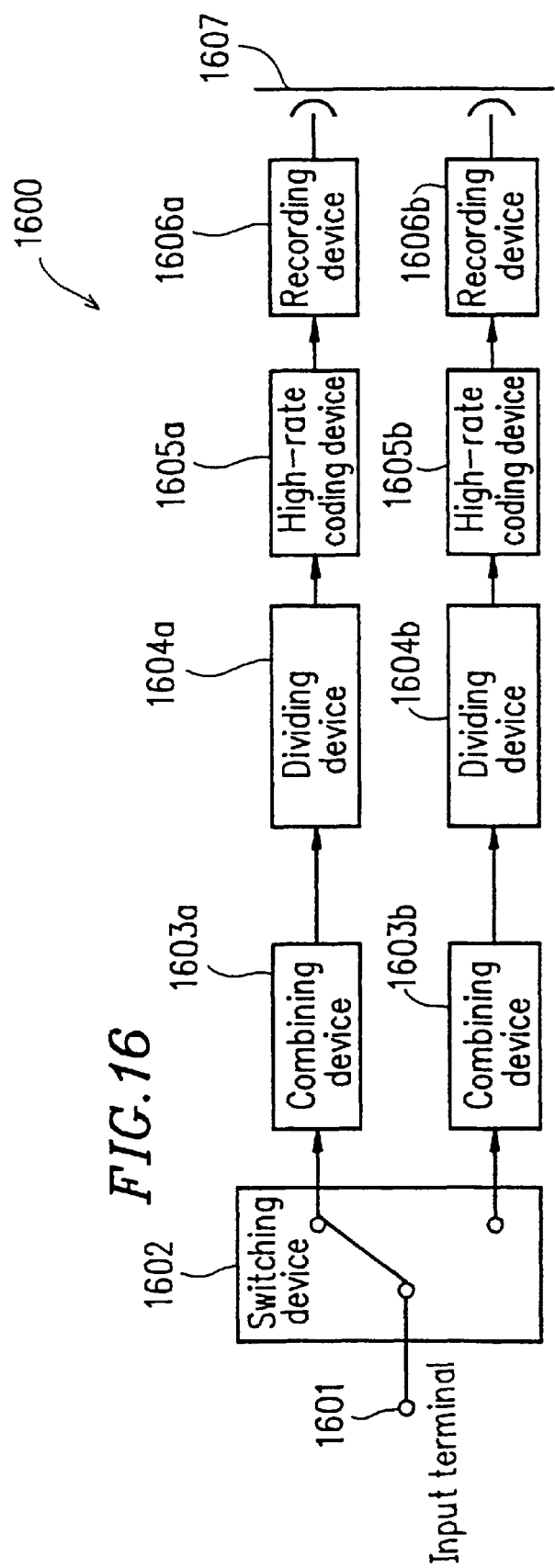
FIG. 16 is a block diagram of a video signal recording apparatus in a tenth example according to the present invention.

A tenth example according to the present invention will be described with reference to FIG. 16. FIG. 16 is a block diagram of a video signal recording apparatus 1600 in the tenth example.

The video signal recording apparatus 1600 includes an input terminal 1601 to which a progressive scan TV signal is input, a switching device 1602 for switching halves of the input signal alternately at ½ of the frame cycle to be sent to two channels, two combining devices 1603a and 1603b for combining data corresponding to two progressive frames which are located at the same position on the image plane, thus to form combination data, two dividing devices 1604a and 1604b for dividing the combination data into a plurality of coding units, two high-rate coding devices 1605a and 1605b for performing high-rate coding of each coding unit, and two recording devices 1606a and 1606b for recording the data obtained by the high-rate coding in a magnetic tape 1607.

The video signal recording apparatus 1600 having the above-described configuration operates in the following manner.

A digital progressive scan TV signal is input to the input terminal 1601. The data corresponding to one frame of the input signal is switched half by half to be sent to the combining devices 1603a and 1603b alternately by the switching device 1602 at, for example, ½ of the frame cycle. Thus, when the data corresponding to two frames of the input signal is sent to the switching device 1602, the combining devices 1603a and 1603b each receive data corresponding to a half of the first frame and a half of the second frame, namely, data corresponding to one frame. The data from the first frame and the data from the second frame are combined to form combination data by the combining devices 1603a and 1603b. The combination data is divided into a prescribed number of coding units by the dividing devices 1604a and 1604b. Each coding unit is processed with high-rate coding by the high-rate coding devices 1605a and 1605b to the same quantity of codes as obtained by high-rate coding of one frame of an interlaced scan standard-definition TV signal. Then, the resultant data is recorded by the recording devices 1606a and 1606b in a track of the magnetic tape 1607.

In the tenth example according to the present invention, the same effects as in the ninth example can be achieved using two channels due to the switching device 1602 and the combining devices 1603a and 1603b.

The dividing devices 1604a and 1604b, the high-rate coding devices 1605a and 1605b, and the recording devices 1606a and 1606b can be devices which are usually used for an interlaced scan standard-definition TV signal.

As the combining devices 1603a and 1603b, devices for framing an interlaced scan standard-definition TV signal can be used.

The switching can be performed at other cycles than ½ of the frame cycle. In such a case, the shuffling degree on the image plane is raised to improve the image quality.

The number of channels can be increased in proportion to the number at which the input signal is divided.

As the progressive scan TV signal to be input to the video signal recording apparatus 1600, a signal including a standard-definition TV signal defined as a 4:2:2 signal conforming to the studio standards and an auxiliary signal of a luminance signal required for progressive scanning is also usable.

EXAMPLE 11

Figure 17:
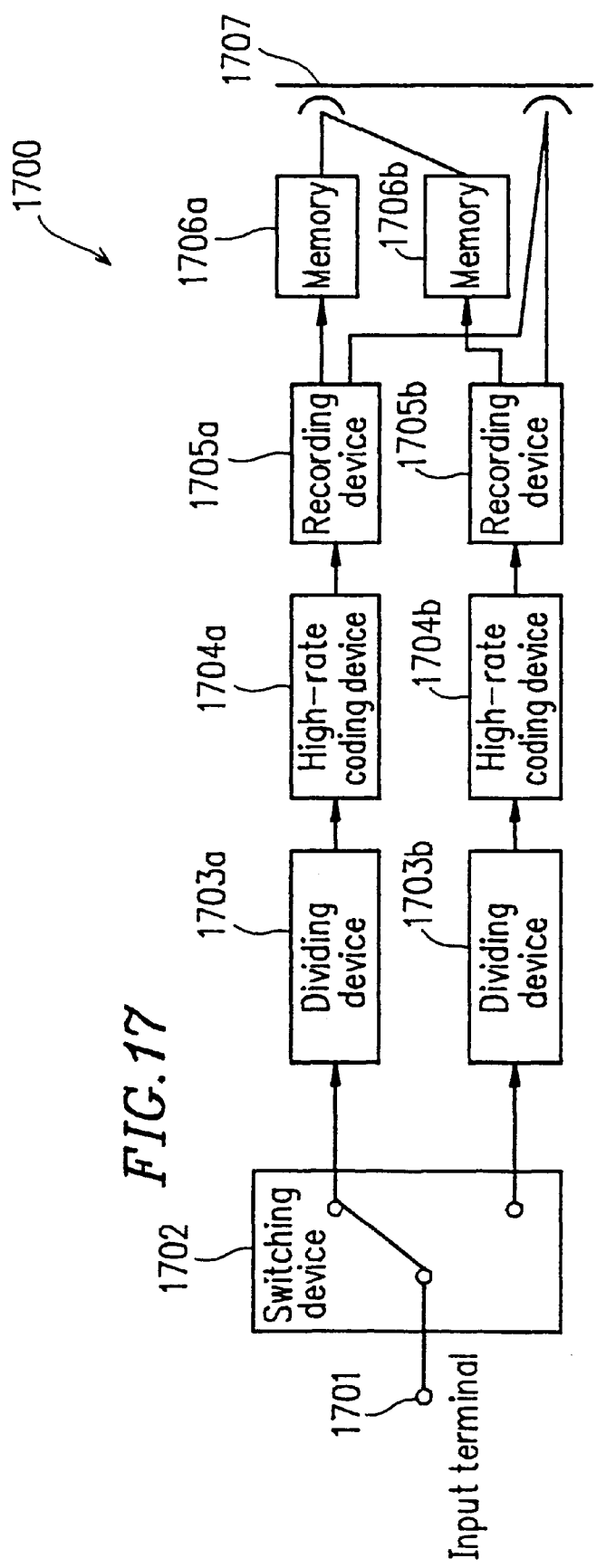
FIG. 17 is a block diagram of a video signal recording apparatus in an eleventh example according to the present invention.

An eleventh example according to the present invention will be described with reference to FIGS. 17, 18A and 18B. FIG. 17 is a block diagram of a video signal recording apparatus 1700 in the eleventh example.

The video signal recording apparatus 1700 includes an input terminal 1701 to which a progressive scan TV signal is input, a switching device 1702 for switching the input signal frame by frame to be sent to two channels, two dividing devices 1703a and 1703b for dividing the input signal into a plurality of coding units, two high-rate coding devices 1704a and 1704b for performing high-rate coding of each coding unit, two recording devices 1705a and 1705b for recording the data obtained by the high-rate coding in a magnetic tape 1707, and two memories 1706a and 1706b for delaying the signal by ½ frame cycle.

The video signal recording apparatus 1700 having the above-described configuration operates in the following manner.

A digital progressive scan TV signal is input to the input terminal 1701 and is switched frame by frame by the switching device 1702 to be sent to the two dividing devices 1703a and 1703b alternately. Thus, the dividing devices 1703a and 1703b each receive data corresponding to one frame every other frame cycle. The dividing devices 1703a and 1703b each expand the data corresponding to one frame to be twice as long in terms of time and then divide the data into a prescribed number of coding units. Each coding unit is processed with high-rate coding by the high-rate coding devices 1704a and 1704b to the same quantity of codes as obtained by high-rate coding of one frame of an interlaced scan standard-definition TV signal. The recording devices 1705a and 1705b rearrange and output the resultant data to the memories 1706a and 1706b. The recording devices 1705a and 1705b each output the first half of the frame to memories 1706a and 1706b respectively, thereby delaying the first half of the frame by ½ frame cycle so as to synchronize the first of the frame and the second half of the frame for simultaneous output to be recorded in the magnetic tape 1707. Accordingly, the data from the same frame is recorded in the magnetic tape 1707.

Figure 18A:
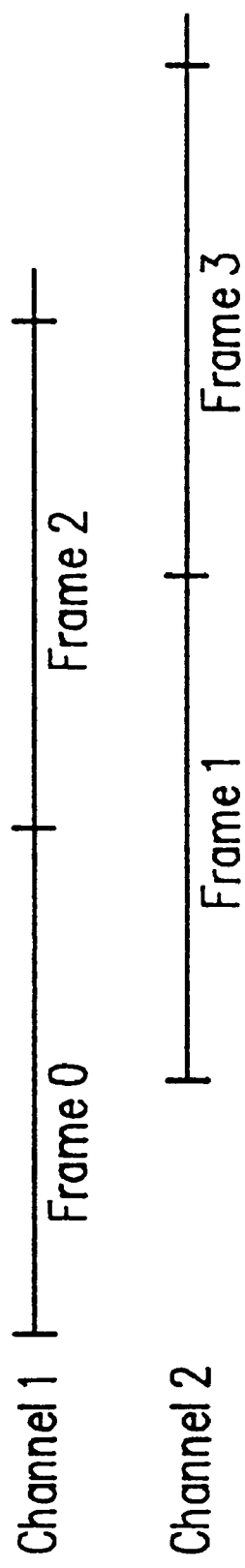
FIG. 18A is a view illustrating data recorded on a track in a conventional video signal recording and reproduction apparatus.
Figure 18B:
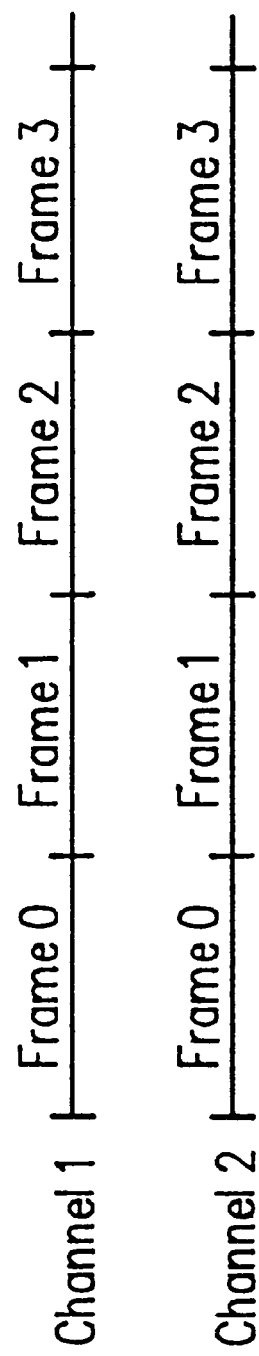
FIG. 18B is a view illustrating data recorded on a track in the eleventh example.

FIG. 18A shows the recording state performed by the conventional video signal recording apparatus, and FIG. 18B shows the recording state performed by the video signal recording apparatus 1700. In the conventional video signal recording apparatus, the data corresponding to the same frame is recorded by the same channel, and thus data from different frames are recorded simultaneously in the magnetic tape. In the video signal recording apparatus 1700, the data corresponding to the same frame is recorded simultaneously by the two channels.

In the eleventh example according to the present invention, due to the memories 1706a and 1706b, the data from the same frame can be recorded simultaneously in the magnetic tape 1707. Thus, the quality the image obtained in search picture mode is improved.

The memories 1706a and 1706b are provided after the recording devices 1705a and 1705b in the above example. The memories can be provided at any arbitrary position, for example, after the high-rate coding devices or in the recording devices as long as the memories are inserted at corresponding positions in the respective channels.

As the progressive scan TV signal to be input to the video signal recording apparatus 1700, a signal including a standard-definition TV signal defined as a 4:2:2 signal conforming to the studio standards and an auxiliary signal of a luminance signal required for progressive scanning is also usable.

EXAMPLE 12

Figure 19:
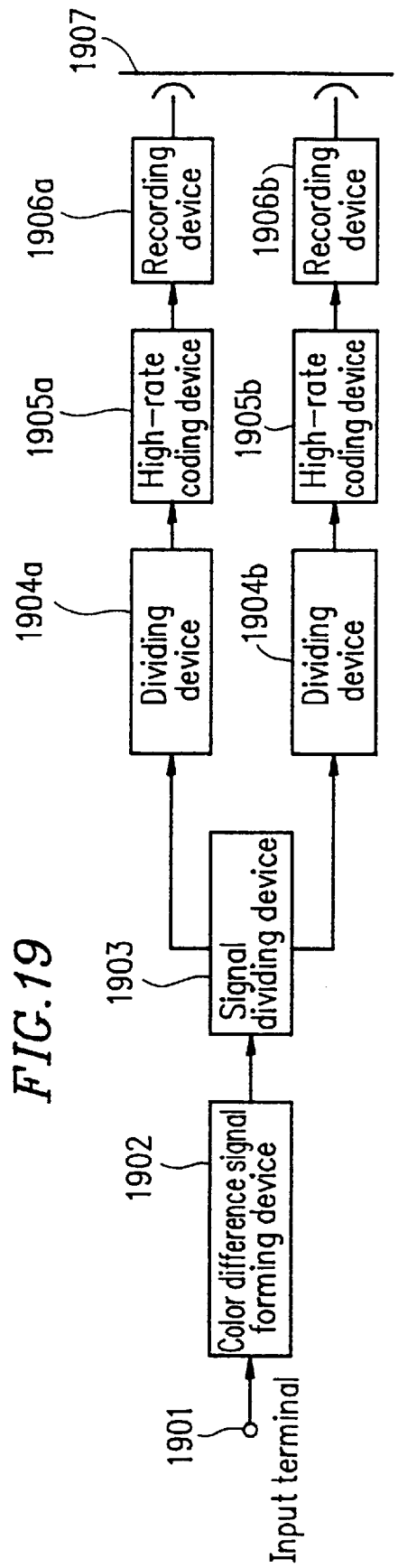
FIG. 19 is a block diagram of a video signal recording apparatus in a twelfth example according to the present invention.

A twelfth example according to the present invention will be described with reference to FIG. 19. FIG. 19 is a block diagram of a video signal recording apparatus 1900 in the twelfth example.

The video signal recording apparatus 1900 includes an input terminal 1901 to which a progressive scan TV signal is input, a color difference signal forming device 1902 for forming an auxiliary signal of a color difference signal, a signal dividing device 1903 for dividing the color difference signal formed, two dividing. devices 1904a and 1904b for dividing the resultant signal into a plurality of coding units, two high-rate coding devices 1905a and 1905b for performing high-rate coding of each coding unit, and two recording devices 1906a and 1906b for recording the data obtained by the high-rate coding in a magnetic tape 1907.

The video signal recording apparatus 1900 having the above-described configuration operates in the following manner.

A signal including a standard-definition TV signal defined as a 4:2:2 signal conforming to the studio standards and an auxiliary signal of a luminance signal required for progressive scanning is input to the input terminal 1901. Hereinafter, the signal including these two types of signals will be referred to as a "4:2:2:4 signal". A color difference signal of the auxiliary signal is formed by, for example, copying the color difference signal of the 4:2:2 signal by the color difference signal forming device 1902.

Thus, the input signal can be converted to a signal including two 4:2:2 signals. Such a signal is divided into, for example, two 4:2:2 signals by the signal dividing device 1903, and two such signals are output to the dividing devices 1904a and 1904b respectively. The dividing devices 1904a and 1904b each divide such a signal into a prescribed number of coding units.

Each coding unit is processed with high-rate coding by the high-rate coding devices 1905a and 1905b to the same quantity of codes as obtained by high-rate coding of one frame of an interlaced scan standard-definition TV signal. The recording devices 1906a and 1906b each record the data obtained by the high-rate coding in the same number of tracks in the magnetic tape 1907 as one frame of an interlaced scan high-definition TV signal.

In the twelfth example according to the present invention, an auxiliary signal is formed by the color difference signal forming device 1902 and the resultant signal is divided by the signal dividing device 1903. Due to the devices 1902 and 1903, the 4:2:2:4 signal can be recorded at a high rate by the conventional video signal recording apparatus produced for an interlaced scan TV signal.

The method for forming a color difference signal by the color difference signal forming device 1902 is arbitrary. The method for dividing the signal by the signal dividing device 1903 is also arbitrary.

In the case where a progressive scan TV signal is input to the video signal recording apparatus 1900, the color difference signal forming device 1902 can be eliminated.

EXAMPLE 13

Figure 20:
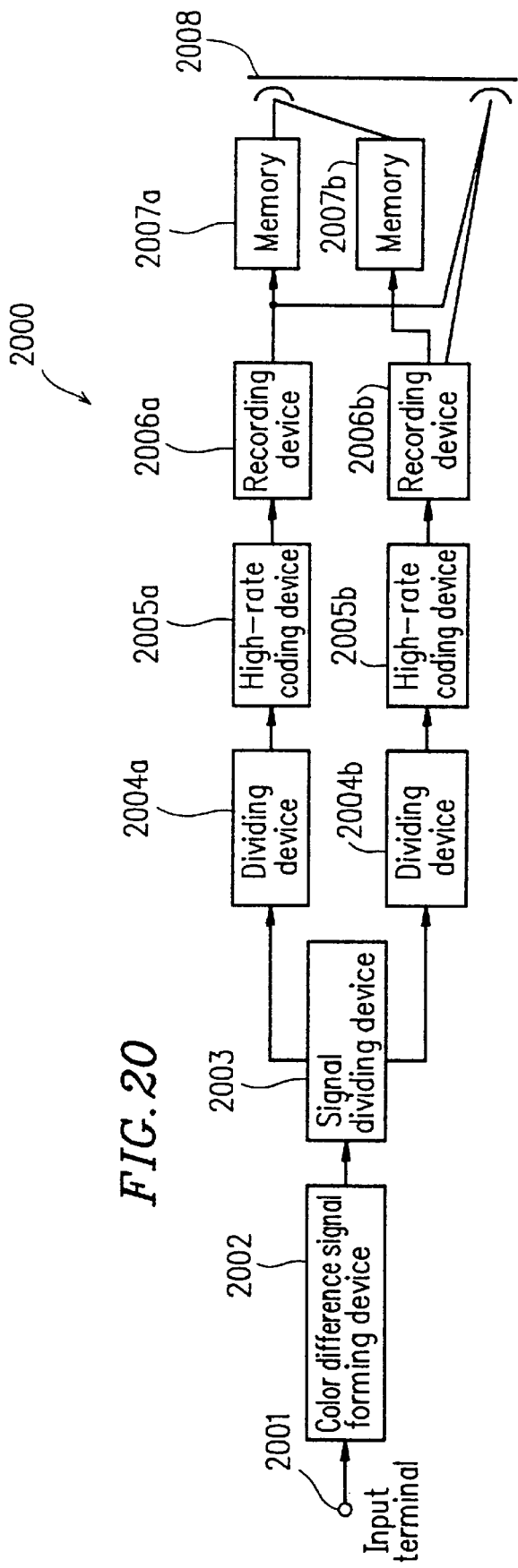
FIG. 20 is a block diagram of a video signal recording apparatus in a thirteenth example according to the present invention.

A thirteenth example, according to the present invention will be described with reference to FIG. 20. FIG. 20 is a block diagram of a video signal recording apparatus 2000 in the thirteenth example.

The video signal recording apparatus 2000 includes an input terminal 2001 to which a progressive scan TV signal is input, a color difference signal forming device 2002 for interpolating color difference signals, a signal dividing device 2003 for dividing the input signal, two dividing devices 2004a and 2004b for dividing the resultant signal into a plurality of coding units, two high-rate coding devices 2005a and 2005b for performing high-rate coding of each coding unit, and two recording devices 2006a and 2006b for recording the data obtained by the high-rate coding in a magnetic tape 2008, and memories 2007a and 2007b for delaying a signal by ½ frame cycle.

The video signal recording apparatus 2000 having the above-described configuration operates in the following manner.

A signal including a standard-definition TV signal defined as a 4:2:2 signal conforming to the studio standards and an auxiliary signal of a luminance signal required for progressive scanning is input to the input terminal 2001. Hereinafter, the signal including these two types of signals will be referred to as a "4:2:2:4 signal". Such a signal is processed by the color difference signal forming device 2002, the signal dividing device 2003, the dividing devices 2004a and 2004b, and the high-rate coding devices 2005a and 2005b, and then is input to the recording devices 2006a and 2006b in the same manner as in the twelfth example. The data corresponding to the first half of each frame which is input to the recording devices 2006a and 2006b is sent to the memories 2007a and 2007b. Then, the data corresponding to the second half of each frame which is input to the recording devices 2006a and 2006b is recorded in the magnetic tape 2008. Simultaneously, the data corresponding to the first half of the frame is also recorded in the magnetic tape 2008 from the memories 2007a and 2007b after being delayed by ½ frame cycle. Accordingly, the data from the same frame is recorded in the magnetic tape 2008 simultaneously.

In the thirteenth example according to the present invention, high-rate recording which is realized in the twelfth example can be realized for search picture mode.

The method for forming an interpolation signal for the color difference signals by the color difference signal forming device 2002 is arbitrary. The method for dividing the signal by the signal dividing device 2003 is also arbitrary.

In the case where a progressive scan TV signal is input to the video signal recording apparatus 2000, the color difference signal forming device 2002 can be eliminated.

The memories 2007a and 2007b are provided after the recording devices 2006a and 2006b in the above example. The memories can be provided at any arbitrary position, for example, after the high-rate coding devices or in the recording devices.

EXAMPLE 14

In the fourteenth through seventeenth examples, a 4:2:2:4 signal which is a component-type signal of a second-generation EDTV signal is used as a signal obtained by non-interlaced scanning (hereinafter, referred to as a "non-interlaced scan signal"). It is now under consideration in Japan whether the 4:2:2:4 signal should be standardized. Hereinafter, a 4:2:2:4 signal will also be referred to as an "ED signal".

Before the description of the fourteenth example, the ED signal will be explained briefly in relation with an SD signal (the standard-definition TV signal).

In an ED signal, a luminance signal is a non-interlaced scan signal (also referred to as a "progressive signal"), and color difference signals are each an interlaced signal. Namely, the color difference signal of the ED signal is the same as a color difference signal of a 4:2:2 signal which is a component-type signal of an SD signal. Originally, these numerical figures represent the ratio of the sampling frequencies for the luminance signal and two color difference signals, and "4" corresponds to 13.5 MHz.

A frame J of an interlaced scan signal includes an odd-number field and an even-number field. Where a top line in the effective plane area of frame J is a first line; third, fifth, seven, and other odd-number lines are included in the odd-number field, and second, fourth, sixth and other even-number lines are included in the even-number field.

Herein, one plane of a non-interlaced scan signal will be referred to as a "frame P". Since the two color difference signals of an ED signal are interlaced scan signals, there are two types of frames P. A frame P in the case where the color difference signal corresponds to an odd-number field will be referred to as an "odd-number frame P" or "frame P(n)", and a frame P in the case where the color difference signal corresponds to an even-number field will be referred to as an "even-number frame P" or "frame (n+1)". The lines of an odd-number field and the lines of an even-number field of an interlaced scan signal respectively correspond to odd-number lines of an odd-number field and even-number lines of an even-number field.

In order to transmit an ED signal digitally, two 4:2:2 signal interfaces (hereinafter, referred to as a "4:2:2 interface") for an SD signal are combined. Among all the lines of a non-interlaced scan signal, only the lines corresponding to an SD signal are transmitted by one 4:2:2 interface, and the remaining lines are transmitted by the other 4:2:2 interface. Although the two interfaces when combined are represented as 4:2:2:4:2:2, a portion of a color difference signal of the second 4:2:2 interface is not necessary. Accordingly, an ED signal is also referred to as a "4:2:2:4 signal".

A video signal recording and reproduction apparatus in the fourteenth example is obtained by adding a few circuits to a conventional video signal recording and reproduction apparatus (also referred to as "DVTR") described in the Description of the Related-Art in order to record an ED signal (4:2:2:4 signal). The conventional DVTR records an SD signal obtained as a result of sampling at a frequency ratio of 4:1:1 (the sampling frequency ratio for a color difference signal is half of 4:2:2) or a frequency ratio of 4:2:0 at 25 Mbps. (Hereinafter, a signal obtained as a result of sampling at a frequency ratio of, for example, 4:1:1 will also be referred to as "a signal of the 4:1:1 type".) The video signal recording and reproduction apparatus in this example utilizes the fact that data corresponding to an ED signal includes a number of pixels (information content) twice the number of pixels corresponding to an SD signal of the 4:1:1 type. By converting an ED signal into an SD signal and compressing the resultant signal in the same manner as in an SD-DVTR, the ED signal can be recorded at the same rate as in an HD-DVTR (50 Mbps).

Figure 22:
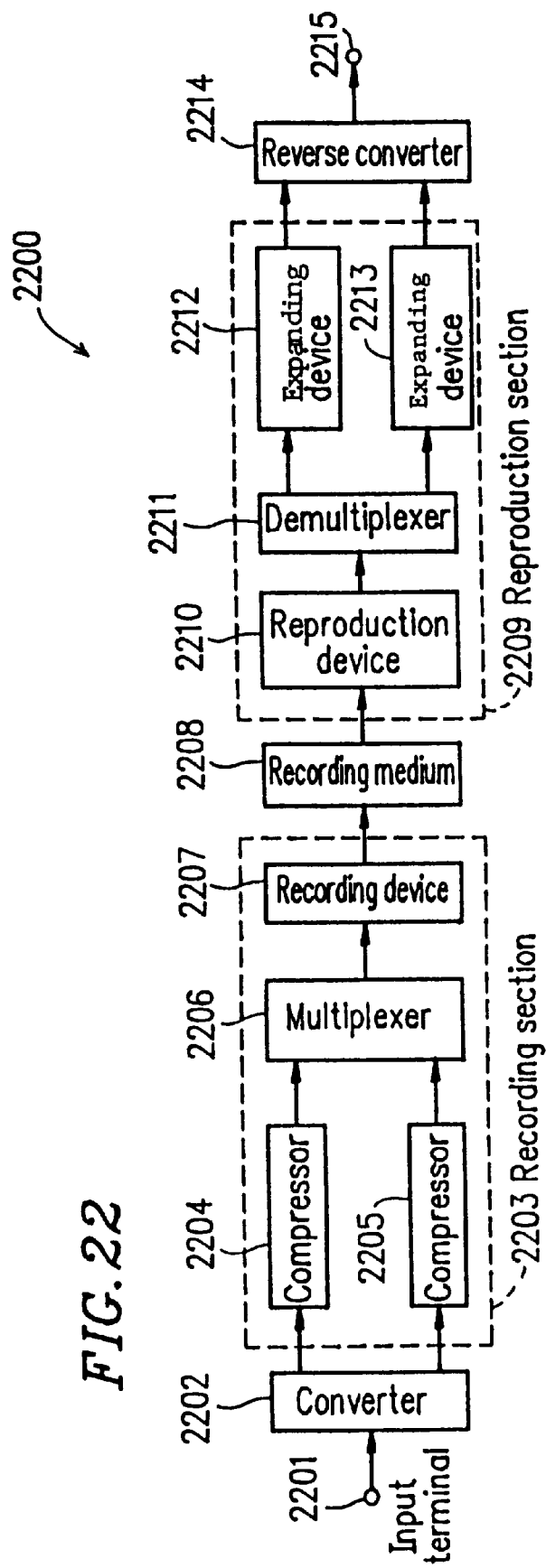
FIG. 22 is a block diagram of a video signal recording and reproduction apparatus in the fourteenth example according to the present invention.

With reference to FIG. 22, a video signal recording and reproduction apparatus 2200 in the fourteenth example will be described. FIG. 22 is a block diagram of a video signal recording and reproduction apparatus 2200.

The video signal recording and reproduction apparatus 2200 includes an input terminal 2201 to which an ED signal is input, a converter 2202 for converting the ED signal (a first video signal) into two SD signals SD1 and SD2 of the 4:1:1 type (second video signals), a recording section 2203 for recording the second video signals to a recording medium 2208, a reproduction section 2209 for reproducing the video signal, a reverse converter 2214 for converting the second video signals into the ED signal, and an output terminal 2215 from which the ED signal is sent out.

The recording section 2203 includes a compressor 2204 for compressing the SD signal SD1 by high-rate coding (intra-frame coding using DCT) to generate compression data 1, a compressor 2205 for compressing the SD signal SD2 by high-rate coding (intra-frame coding using DCT) to generate compression data 2, a multiplexer 2206 for multiplexing the compression data 1 and 2 data in terms of time to generate multiplex data, and a recording device 2207 for recording the multiplex data to the recording medium 2208 after performing error correction coding and modulation for a transmission path.

The reproducing section 2209 includes a reproduction device 2210 for reproducing the signal from the recording medium and performing demodulation and data correction of the signal to obtain the multiplex signal, a de-multiplexer 2211 for obtaining the compression data 1 and 2 from the multiplex signal and two expanding devices 2212 and 2213 respectively for decoding the compression data 1 and 2 to obtain the signal SD1 and SD2.

The video signal recording and reproduction apparatus 2000 having the above-described configuration operates in the following manner.

Figure 21:
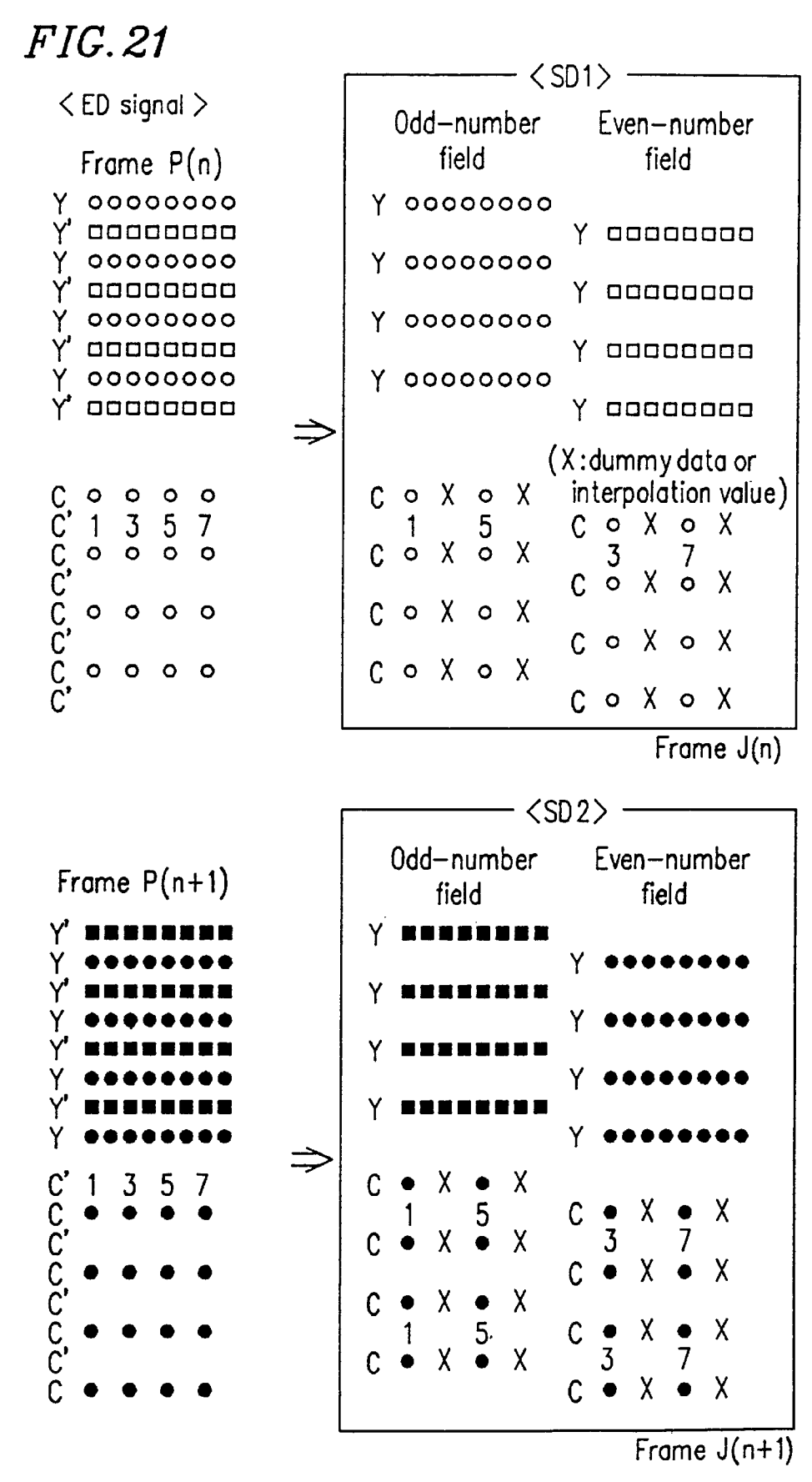

For recording, an ED signal which is input to the input terminal 2201 is converted into two signals SD1 and SD2 which appear to be obtained by interlaced scanning. The signals SD1 and SD2 are shown in FIG. 21.

The signals SD1 and SD2 are compressed by high-rate coding (intra-frame coding performed using DCT) in the same manner as performed in an SD-DVTR by the compressors 2204 and 2205 to be compression data 1 and 2, respectively. The compression data 1 and 2 are multiplexed by the multiplexer 2206 frame by frame in terms of time into a multiplex signal. The multiplex signal is processed with formatting, coding for error correction and coding for the transmission path in the same manner as in the HD-DVTR and then recorded to the recording medium 2208 by the recording device 2207.

For reproduction, the signal is reproduced from the recording medium 2208, and the signal is processed with decoding of the error correction code, decoding of the code for the transmission path, and modification to obtain the multiplex signal by the reproduction device 2210. The multiplex signal is de-multiplexed into compression data 1 and 2 by the de-multiplexer 2211. The compression data 1 and 2 are processed with decoding of the high-rate coding by the expanding devices 2212 and 2213, respectively to be the signals SD1 and SD2. The signals SD1 and SD2 are converted into the ED signal by the reverse converter 2214 and then output from the output terminal 2215.

In the fourteenth example according to the present invention, an ED signal is recorded in the form of an SD signal without spoiling the correlation of pixels corresponding to the ED signal. Accordingly, an ED signal can be recorded efficiently by simply adding a few circuits to the conventional SD-DVTR or HD-DVTR. The data compression can be performed efficiently by DCT using 8×8 DCT blocks within each frame.

Information for distinguishing an odd-number frame P from an even-number frame P is recorded and reproduced as subcode information together with video data and audio data. Thus, an ED signal which is recorded can be reproduced to the original ED signal completely.

EXAMPLE 15

A video signal recording and reproduction apparatus in a fifteenth example has the same configuration and operates in the same manner as the video signal recording and reproduction apparatus 2200 in the fourteenth example except for the converter 2202 and the reverse converter 2214. Accordingly, the detailed explanation thereof will be omitted, and the signal conversion will be described with reference to FIG. 23.

Figure 23:
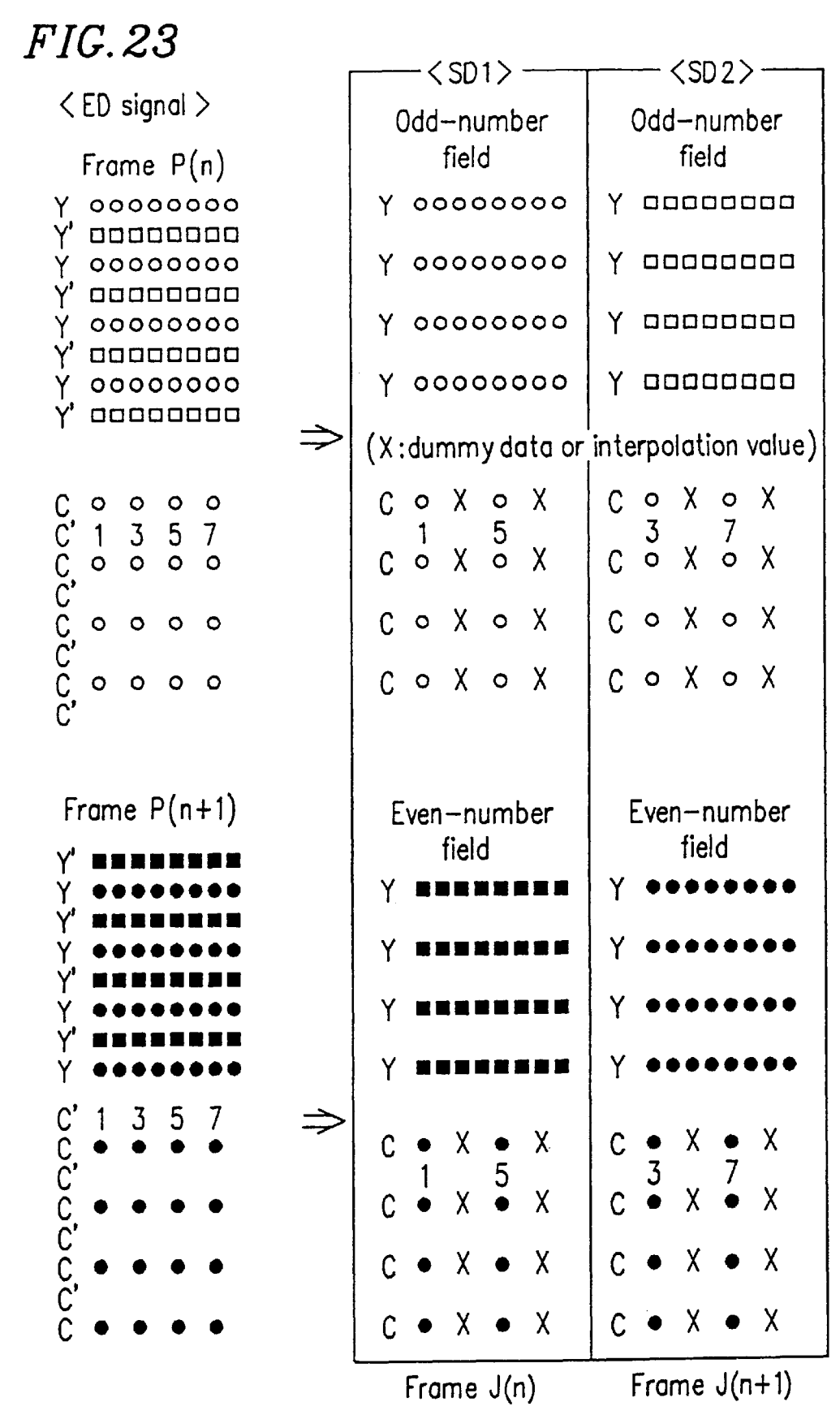

As is shown in FIG. 23, conversion of an ED signal into two signals SD1 and SD2 is performed by converting every two successive planes (frame P(n) and frame P(n+1; n is an odd number) of a non-interlaced scan signal into two frames (frames J(n) and J(n+1); n is an odd number) of an interlaced scan signal. An odd-number line and an even-number line of a frame P(n) correspond to a line in an odd-number field of a frame J(n) and a line in an odd-number field of a frame J(n+1), respectively. An odd-number line and an even-number line of a frame P(n+1) correspond to a line in an even-number field of the frame J(n) and a line in an even-number field of the frame J(n+1), respectively. In the video signal recording and reproduction apparatus in the fifteenth example, the correlation between the line in the odd-number field and the line in even-number field is maintained. Especially, data compression can be performed efficiently by DCT of an 8×4×2 mode. In this mode, 8 (horizontal)×4 (vertical) pixels are processed with DCT for two image planes.

The other effects in the fourteenth example can also be achieved.

EXAMPLE 16

A video signal recording and reproduction apparatus in a sixteenth example has the same configuration and operates in the same manner as the video signal recording and reproduction apparatus 2200 in the fourteenth example except for the converter 2202 and the reverse converter 2214. Accordingly, the detailed explanation thereof will be omitted, and the signal conversion will be described with reference to FIG. 24.

Figure 24:
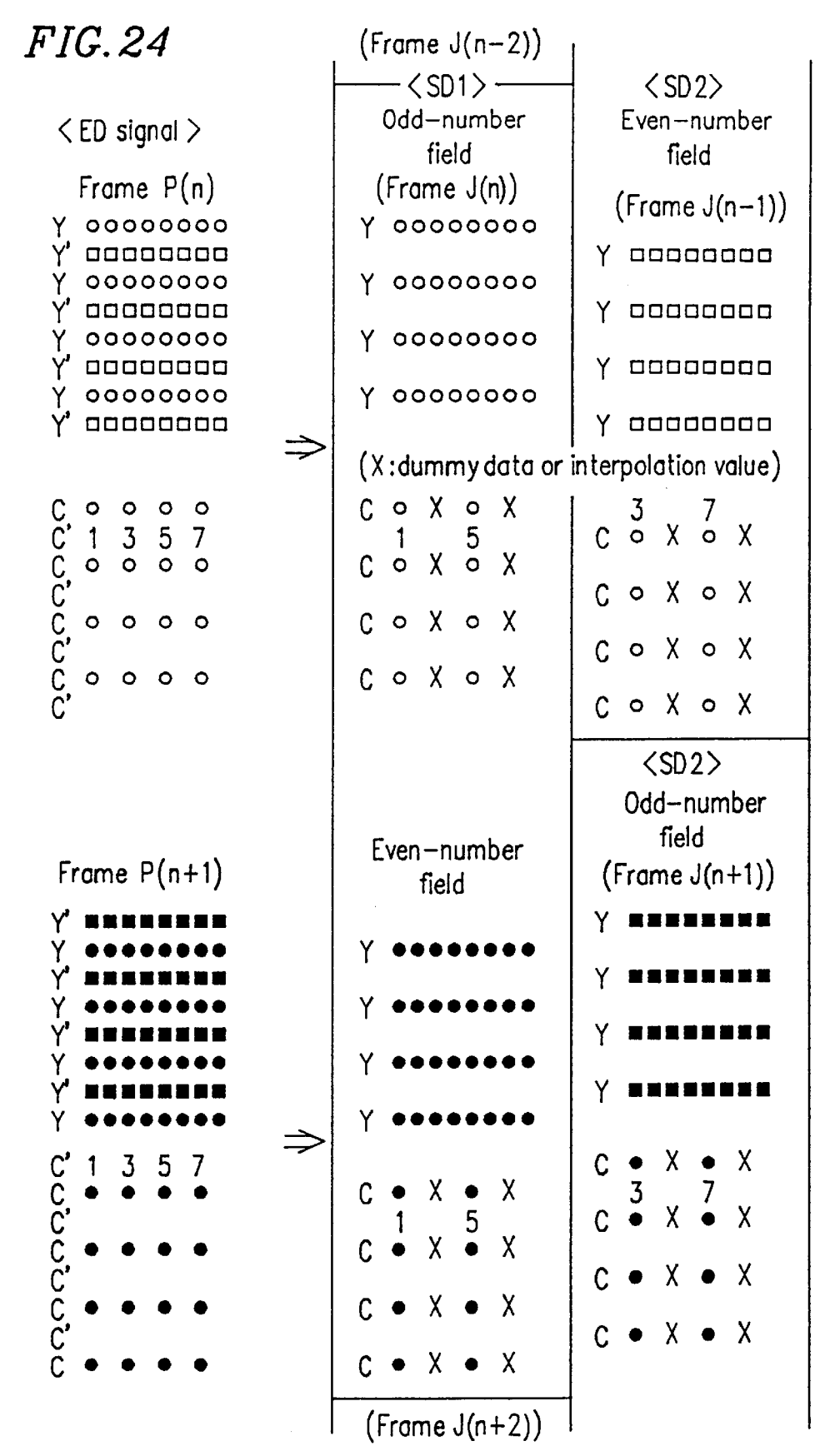

As is shown in FIG. 24, conversion of an ED signal into two signals SD1 and SD2 is performed by converting every two successive planes (frame P(n) and frame P(n+1); n is an odd number) of a non-interlaced scan signal into three frames (frames J(n−1) to J(n+1); n is an odd number) of an interlaced scan signal. An odd-number line and an even-number line of a frame P(n) correspond to a line in an odd-number field of a frame J(n) and a line in an even-number field of a frame J(n−1), respectively. An odd-number line and an even-number line of a frame P(n+1) correspond to a line in an odd-number field of the frame J(n+1) and a line included in an even-number field of the frame J(n), respectively.

The other effects in the fourteenth example can also be achieved.

EXAMPLE 17

A video signal recording and reproduction apparatus in a seventeenth example has the same configuration and operates in the same manner as the video signal recording and reproduction apparatus 2200 in the fourteenth example except for the converter 2202 and the reverse converter 2214. Accordingly, the detailed explanation thereof will be omitted, and the signal conversion will be described with reference to FIG. 25.

As is shown in FIG. 25, conversion of an ED signal into two signals SD1 and SD2 is performed by converting every two successive planes (frame P(n) and frame P(n+1); n is an odd number) of a non-interlaced scan signal into two frames (frames J(n) and J(n+1); n is an odd number) of an interlaced scan signal. An odd-number line and an even-number line of a frame P(n) correspond to a line in an odd-number field of a frame J(n) and a line included in an even-number field of the a frame J(n+1), respectively. An odd-number line and an even-number line of a frame P(n+1) correspond to a line in an odd-number field of the frame J(n+1) and a line in an odd-number field of the frame J(n), respectively.

The other effects in the fourteenth example can also be achieved.

EXAMPLE 18

Figure 26:
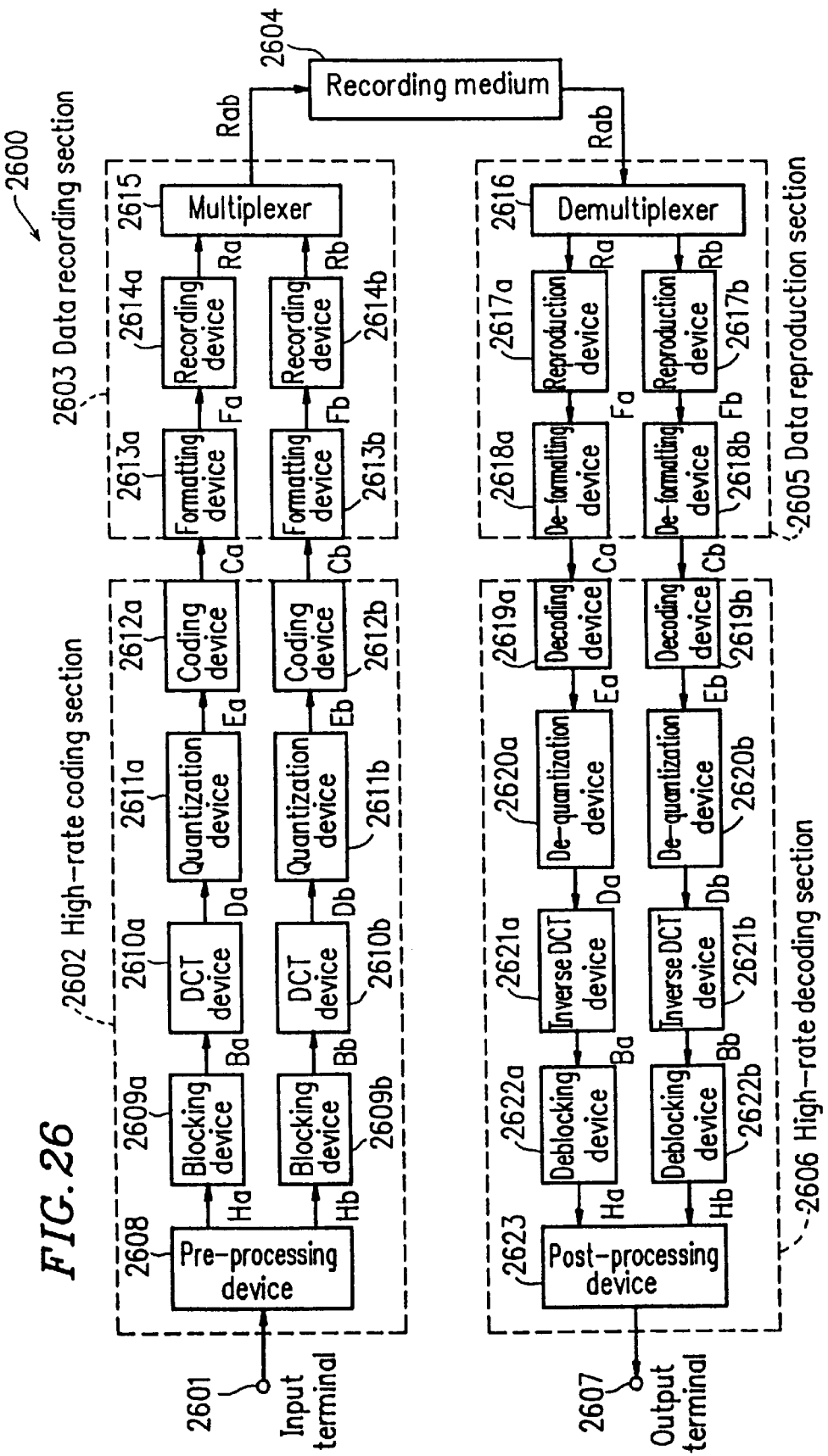
FIG. 26 is a block diagram of a video signal recording and reproduction apparatus in an eighteenth example according to the present invention.

An eighteenth example according to the present invention will be described with reference to FIGS. 26 through 30. FIG. 26 is a block diagram of a video signal recording and reproduction apparatus 2600 in the eighteenth example.

In the video signal recording and reproduction apparatus 2600, a main part of a video processing circuit of the conventional apparatus including a compressor for compressing data at a ratio of 1:C is utilized to a maximum possible extent except for the compression ratio. The compression ratio in the video signal recording and reproduction apparatus 2600 is 1:(C/N), namely, approximately 1/N (N=2) of that in the conventional apparatus. In other words, the bit rate is twice the bit rate in the conventional apparatus. In this manner, the quality of a reproduced image is improved.

The video signal recording and reproduction apparatus 2600 includes an input terminal 2601 to which image data I of a moving image is input, a high-rate coding section 2602 for performing high-rate coding of the data I into coded data, a data recording section 2603 for converting the coded data into a signal and recording the signal to a recording medium 2604, a data reproduction section 2605 for reproducing the coded data from the signal obtained from the recording medium 2604, a high-rate decoding section 2606 for decoding the coded data into the image data I, and an output terminal 2607 from which the reproduced image data I is sent out.

The high-rate coding section 2602 includes pre-processing device 2608 for generating two image data Ha and Hb from each of image planes of the image data I, the image data Ha and Hb each having approximately half of the information content of that of the image data I; a blocking device 2609a for dividing an image corresponding to the image data Ha into a plurality of blocks for rear-rangement of the image data Ha to generate image data Ba for each block, each block including a plurality of pixels; another blocking device 2609b for dividing an image corresponding to the image data Hb into a plurality of blocks for rearrangement of the image data Hb to generate image data Bb for each block, each block including a plurality of pixels; two DCT devices 2610a and 2610b respectively for performing DCT of the image data Ba and Bb to obtain DCT data Da and Db; two control and quantization devices 2611a and 2611b; and two coding devices 2612a and 2612b. The control and quantization devices 2611a and 2611b each have a function of determining quantization characteristics Ta and Tb which cause the total number of the bits (code quantity) of the coded data to be substantially constant in the respective image area (code quantity control function) and a function of quantizing the DCT data Da and Db using the quantization characteristics Ta and Tb to obtain quantized DCT data Ea and Eb (quantization function). The coding devices 2612a and 2612b are each provided for performing variable-length coding of the quantized DCT data Ea and Eb to obtain coded data Ca and Cb.

The data recording section 2603 includes two formatting devices 2613a and 2613b for arranging the coded data Ca and Cb in accordance with a recording format to obtain formatted data Fa and Fb, two recording devices 2614a and 2614b for performing addition of an error correction code, modulation and the like of the formatted data Fa and Fb to obtain recording signals Ra and Rb, and a multiplexer 2615 for multiplexing the recording signals Ra and Rb into a recording signal Rab and. recording the signal Rab to the recording medium 2604.

The data reproduction section 2605 includes a signal de-multiplexer 2616 for de-multiplexing the recording signal Rab obtained from the recording medium 1604 into the recording signals Ra and Rb, two reproduction devices 2617a and 2617b respectively for performing demodulation, decoding of the error correction code, and the like of the recording signals Ra and Rb to obtain the formatted data Fa and Fb, and two de-formatting devices 2618a and 2618b for de-formatting the formatted data Fa and Fb to obtain the coded data Ca and Cb.

The high-rate decoding section 2606 includes two decoding devices 2619a and 2619b for decoding the coded data Ca and Cb to obtain the quantized DCT data Ea and Eb, two de-quantization devices 2620a and 2620b for de-quantizing the quantized DCT data Ea and Eb to obtain the DCT data Da and Db, two inverse DCT devices 2621a and 2621b for performing inverse DCT of the DCT data Da and Db to obtain the image data Ba and Bb for each block, two de-blocking devices 2622a and 2622b for rearranging the image data Ba and Bb to obtain the image data Ha and Hb which have blocks arranged in the same manner as in the input image data I, and a post-processing device 2623 for synthesizing the image data Ha and Hb into the image data I.

Figure 27A:
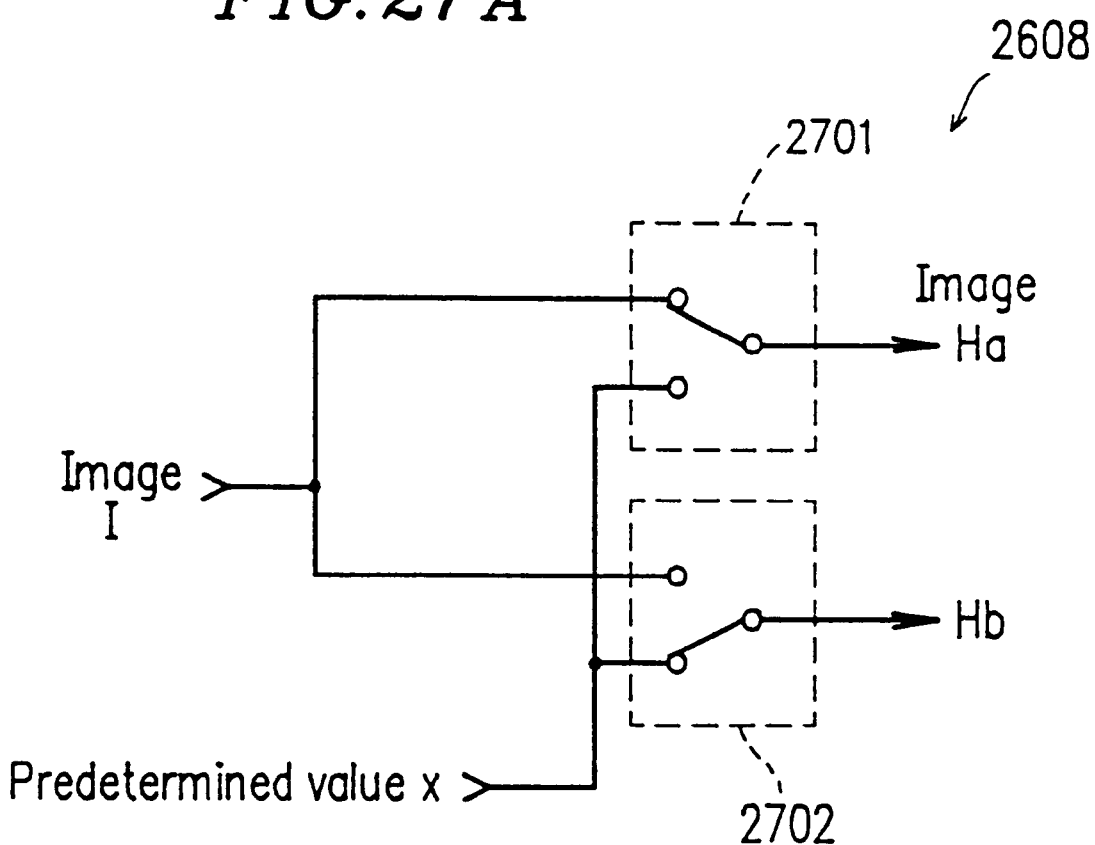
FIG. 27A is circuit diagram of a pre-processing device in the video signal recording and reproduction apparatus in an eighteenth example.

FIG. 27A is a circuit diagram of the pre-processing device 2608. The pre-processing device 2608 includes switches 2701 and 2702. The switches 2701 and 2702 each receive image data I and a predetermined value of x (for example, x=0) as dummy data and operate in association with each other to select one of the image data I and the dummy data alternately by a horizontal width of the pixel area in a prescribed cycle which is determined based on a prescribed number of blocks, thus to output the image data Ha and Hb. The prescribed cycle is a width of a macroblock in this example. For example, in color image data, in the case where the ratio of sampling frequencies for one luminance signal and two color difference signals is 4:1:1, one block of one color difference signal corresponds to four horizontal blocks of the luminance signal. Accordingly, the four blocks of the luminance signal located at the same position on the image plane and two blocks of the two color difference signals (total six blocks) form one macroblock.

Figure 27B:
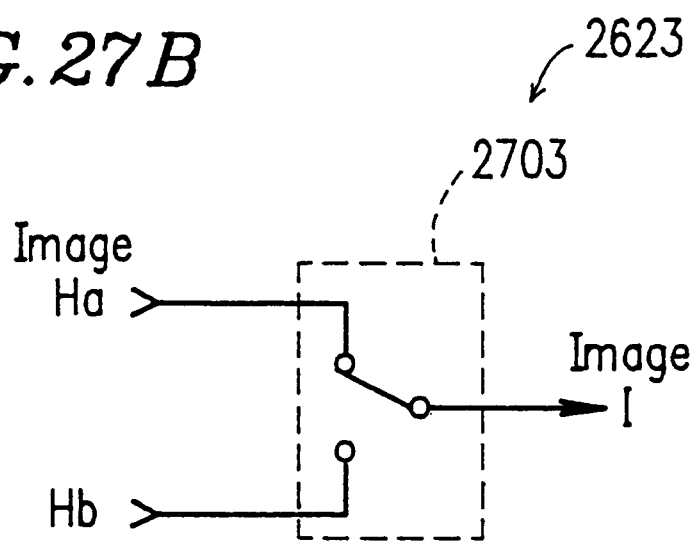
FIG. 27B is circuit diagram of a post-processing device in the video signal recording and reproduction apparatus in the eighteenth example.

FIG. 27B is a circuit diagram of the post-processing device 2623. The post-processing device 2623 includes a switch 2703. The switch 2703 receives the two image data Ha and Hb and selects the image data Ha or the image Hb. Thus, the predetermined value x as the dummy data is removed, and the data arranged separately in the image data Ha and Hb are synthesized to obtain the image data I.

Figure 28:
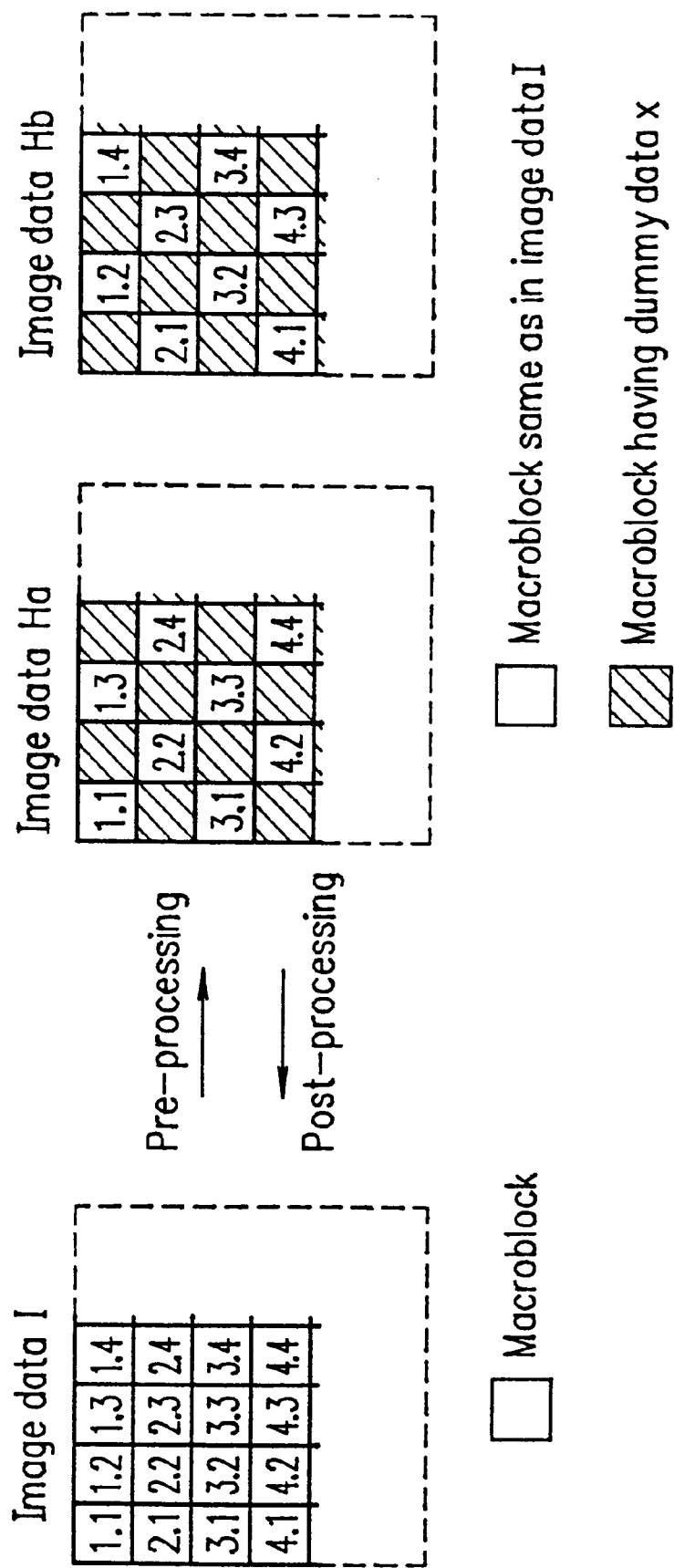
FIG. 28 is a view illustrating operation of the pre-processing device and the post-processing device in the eighteenth example.

FIG. 28 illustrates how the image data I corresponds to the image data Ha and Hb to described the pre-processing and the post-processing. In FIG. 28, one square represents one macroblock, and the numerical figures in each square indicates the position of the corresponding macroblock. In the image data Ha and Hb, the hatched macroblocks have dummy data x, and the white macroblocks have the image data at the corresponding position of the image data I.

With reference to FIGS. 26 and 28, the operation of the video signal recording and reproduction apparatus 2600 will be described.

For recording, the image data I is input to the input terminal 2601, and the information content is divided into approximately two halves by the pre-processing device 2608 to be the image data Ha and Hb having substantially the same information content with each other. In detail, the information content of the image data I is divided into two by a unit of a macroblock and located in the white squares. in the image data Ha and Hb. Dummy data x is located in the hatched squares.

The image data Ha is divided into blocks by the blocking device 2609a into image data Ba, and then processed with the DCT by the DCT device 2610a into DCT data Da. The DCT data Da is quantized by the control and quantization device 2611a using a quantization characteristic Ta into quantized DCT data Ea. Due to the quantization characteristic Ta, the DCT data Ea has a code quantity, which is the same as in the conventional apparatus. The DCT data Ea is then coded by the coding device 2612a into coded data Ca. The coded data Ca is formatted in accordance with a recording format by the formatting device 2613a into formatted data Fa, and then provided with an error correction code, and a code for the transmission path, and the like by the recording device 2614a into a recording signal Ra.

In the same manner, the image data Hb is divided into blocks by the blocking device 2609b into image data Bb, and then processed with the DCT by the DCT device 2610b into DCT data Db. The DCT data Db is quantized by the quantization device 2611b using a quantization characteristic Tb into quantized DCT data Eb. Due to the quantization characteristic Tb, the DCT data Eb has a code quantity, which is the same as in the conventional apparatus. The DCT data Ea is then coded by the coding device 2612b into coded data Cb. The coded data Cb is formatted in accordance with a recording format by the formatting device 2613b into formatted data Fb, and then provided with an error correction code, a code for the transmission path, and the like by the recording device 2614b into a recording signal Rb.

The recording signals Ra and Rb are multiplexed by compression in terms of time into a recording signal Rab. The images corresponding to the image data Ha and Hb are recorded to the recording medium 2604 alternately. Since the images corresponding to the image data Ha and Hb are recorded by the same recording format as in the conventional video signal recording and reproduction apparatus, the image data I corresponding to each of a plurality of image planes is recorded in the state of being converted to two images (Ha and Hb). Since the recording bit rate is twice the bit rate of the conventional apparatus, the transportation rate of the recording medium 2604 (for example, a magnetic tape) is also twice the rate in the conventional apparatus.

For reproduction, the recording signal Rab is reproduced from the recording medium 2604 and divided into the recording signals Ra and Rb by the de-multiplexer 2616.

The recording signal Ra is processed with decoding of the error correction code, the code for the transmission path, and the like by the reproduction device 2617a into the formatted data Fa. The formatted data Fa is de-formatted by the de-formatting device 2618a into the coded data Ca. The coded data Ca is decoded into the quantized DCT data Ea by the decoding device 2619a. The quantized DCT data Ea is de-quantized by the de-quantization device 2620a into the DCT data Da. The DCT data Da is decoded by the inverse DCT device 2621a to obtain the image data Ba for each block. The image data Ba for the plurality of blocks are rearranged by the de-blocking device 2622a into the image data Ha having the same arrangement as the image data I.

In same manner, the recording signal Rb is processed with decoding of the error correction code, the code for the transmission path, and the like by the reproduction device 2617b into the formatted data Fb. The formatted data Fb is de-formatted by the de-formatting device 2618b into the coded data Cb. The coded data Cb is decoded into the quantized DCT data Eb by the decoding device 2619b. The quantized DCT data Eb is dequantized by the de-quantization device 2620b into the DCT data Db. The DCT data Db is decoded by the inverse DCT device 2621b to obtain the image data Bb for each block. The image data Bb for the plurality of blocks are rearranged by the de-blocking device 2622b into the image data Hb having the same data arragement as the image data I.

By the post-processing device 2623, the dummy data x (hatched squares in FIG. 28) is removed from the image data Ha and Hb and the effective image data (white macroblocks in FIG. 28) are synthesized into the image data I, which is sent out from the output terminal 2607.

As is shown in FIG. 28, one of two adjacent macroblocks in the image data I is copied to the image data Ha, and the other macroblock is copied to the image data Hb. It is highly possible that two adjacent macroblocks are correlated strongly. In the case when two adjacent macroblocks are strongly correlated, such macroblocks have-approximately equal information content (code quantity). Further, the number of macroblocks copied to the image data Ha and Hb are equal, and the number of blocks of dummy data is also equal in the image data Ha and Hb. Accordingly, the information content is equal in the image data Ha and Hb. The dummy data is provided in order to equalize the size of the image with that of the input image data I so that the high-rate coding device and the data recording section in the conventional video signal recording and reproduction apparatus can be used with no alteration. The dummy data has the same value in all the macroblocks, and the DCT data obtained from the dummy data by DCT is only a DC component, which has a very small code quantity. Half of the macroblocks in each of the image data Ha and Hb have the dummy data, and the other half of the macroblocks include effective image data.

The input image data I is substantially divided equally into two into the image data Ha and Hb, each having the half of the information content of that of the image data I. The image data Ha and Hb are each coded after quantized with a quantization characteristic, which is determined so that the data obtained from each of the image data Ha and Hb includes the same code quantity as in the conventional apparatus. As a result, the input image data I is coded into the coded data (Ca and Cb) having a code quantity (total number of bits) which is approximately twice the code quantity in the conventional apparatus. Such a code quantity is equivalent to the code quantity which is obtained by compressing the data at half of a compression ratio (1:(C/2)) in the conventional high-rate coding device. Accordingly, the image obtained in this example has a higher quality than obtained by the conventional high-rate coding device.

In the high-rate coding section 2602 in the eighteenth example, the input image data I is substantially divided equally into two to obtain the image data Ha and Hb by the pre-processing device 2608. Thus, by simply performing high-rate coding of the image data Ha and Hb independently by two high-rate coding devices of the conventional video signal recording and reproduction apparatus (corresponding to the blocking devices 2609a to the coding device 2612a, and the blocking devices 2609b to the coding device 2612b), the coded data (Ca and Cb) which are substantially equivalent as obtained by high-rate coding performed at half of a compression ratio of the conventional device can be generated.

In the video signal recording and reproduction apparatus 2600 in the eighteenth example, the input image data I is substantially divided equally into two into the image data Ha and Hb by the pre-processing device 2608. The image data Ha and Hb are processed independently in the same manner as in the conventional video signal recording apparatus and recorded alternately by the effect of the multiplexer 2615. The input data can be recorded using the conventional apparatus almost with no alteration, but the obtained image has a higher quality since the compression ratio is half when compared with the conventional apparatus. Since the macroblocks in the image data I are copied into the image data Ha and Hb at the corresponding positions, the image corresponding to the image data I can be easily reproduced using the conventional reproduction apparatus.

The information content is substantially equal in the image data Ha and Hb. Accordingly, the image data Ha and Hb are quantized at almost the same quantization characteristics, and thus the reproduced image data I has no difference between the area corresponding to the image data Ha and the area corresponding to the image data Hb.

For the two channels for processing the image data I (the blocking device 2609a to the coding device 2612a, the formatting device 2613a, and the recording device 2614a; and the blocking device 2609b to the coding device 2612b, the formatting device 2613b, and the recording device 2614b), video processing circuits for the consumer use are used. Such video processing circuits are formed of mass-produced LSIs and thus can realize lower power consumption, smaller sizes and lower prices. The video signal recording and reproduction apparatus 2600 using such circuits also can enjoy such advantages. Video signal recording and reproduction apparatuses for professional use adopt a higher compression ratio (a higher bit rate) to realize higher image quality and are not mass-produced. Compared with a such professional-use apparatus, the video signal recording and reproduction apparatus 2600 in this example is superior in power consumption, size and price and still can obtain the same level of image quality.

The macroblocks in the image data I are copied to the image data Ha and Hb at the same positions as the original positions. Thus, the image data I can be reproduced easily by the conventional video signal reproduction apparatus. The configuration of the pre-processing device 2608 and the post-processing device 2623 can be significantly simplified.

The value of the dummy data (especially in each macroblock) is preferably set to be outside the dynamic range of normal image data, for example, at the minimum value 0 (in the case of the binary notation with no sign). In the case where a high-rate decoding device (corresponding to a high-rate decoding section 2606 in this example) or other signal receiving devices for determining that such a value is an error caused during transmission or the like and replacing such a value with the data in the previous image is provided, the equivalent processing as in the post-processing device 2623 is performed by such a high-rate decoding device. Accordingly, the number of circuits can be reduced. If the value of the dummy data is set to be 0, the switch 2703 can be realized with a simpler logic OR circuit.

EXAMPLE 19

A video signal recording and reproduction apparatus in a nineteenth example has the same configuration and operates in the same manner except for the pre-processing device 2608 and the post-processing device 2623, and thus detailed description thereof will be omitted.

The pre-processing device divides every image plane of the input image data I into two image data Ha and Hb each having approximately half of the information content of the image data I, and the post-processing device synthesizes the image data Ha and Hb into the image data I as in the eighteenth example. The manner of generating the image data Ha and Hb is different from the manner in the eighteenth example.

Figure 29A:
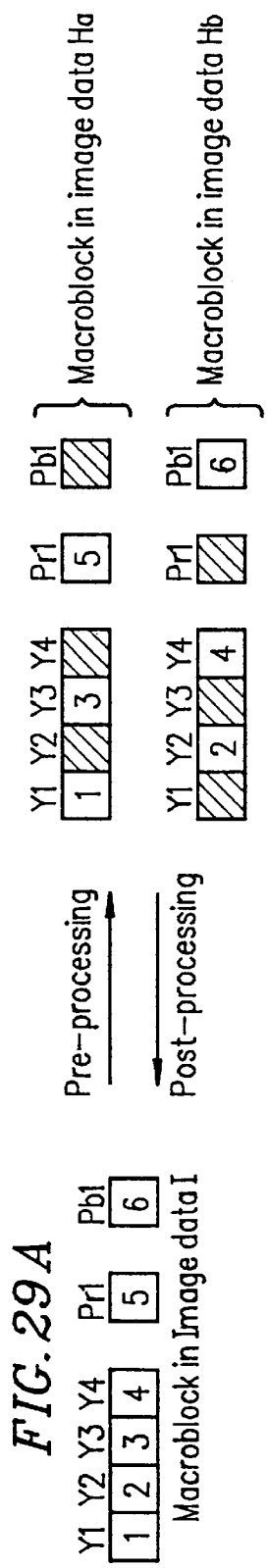
FIG. 29A is a view illustrating operation of an pre-processing device in a nineteenth example.

FIG. 29A illustrates how the image data Ha and Hb are generated in the nineteenth example. A component type signal including a luminance signal and two color difference signals sampled at a frequency ratio of 4:1:1 is input to the high-rate coding section. Four blocks of the luminance signal Y1, Y2, Y3 and Y4 adjacent serially in a horizontal direction and blocks for the color difference signals Pr1 and Pb1 (six blocks in total) correspond to an area on the image plane, and such blocks is generally referred to as a macroblock. In this example, each macroblock of the image data I is substantially divided equally into two to generate a macroblock of the image data Ha and a macroblock of the image data Hb.

As is illustrated in FIG. 29A, in each macroblock of the image data Ha, the data from the image data I is located in the blocks Y1, Y3 and Pr1. In other blocks (hatched blocks), a predetermined value x is located as dummy data. In each macroblock of the image data Hb, the data from the image data I is located in the blocks Y2, Y4 and Pb1. In other blocks (hatched blocks), a predetermined value x is located as dummy data. The blocks Y1 through Y4, which are adjacent serially, have strong correlation, and especially the blocks Y1 and Y2, and the blocks Y3 and Y4 are strongly correlated. Accordingly, the information content is almost equal in the image data Ha and Hb.

The dividing method in this example is especially effective in shuffling, which is used for controlling the code quantity when the code quantity is smaller than one image. (For example, the code quantity is controlled by a unit of five macroblocks.) In the area where the code quantity is controlled, the information contents in the blocks Pr1 and Pb1 are averaged by shuffling.

As the pre-processing device and the post-processing device, the devices shown in FIGS. 27A and 27B can be used by simply altering the timing and the cycle for the switching.

Due to such a configuration, each macroblock of the input image data I is substantially divided equally into two into image data Ha and Hb, each having half of the information content of that of the image data I. The image data Ha and Hb are each quantized so as to have the same code quantity as in the conventional video signal recording and reproduction apparatus before being coded. As a result, the input image data I is coded into coded data having a code quantity which is twice the code quantity obtained in the conventional apparatus.

In the nineteenth example according to the present invention, each macroblock of the input image data I is substantially divided equally into two into the image data Ha and Hb, which are each processed with high-rate coding in the same manner as in the conventional apparatus. Accordingly, the image data is compressed at half of a compression ratio in the conventional apparatus, resulting in improvement in the image quality. The other effects in the eighteenth example can also be achieved.

In the above-described dividing method, in the case where one macroblock includes only one block corresponding to each of the two color difference signals, such a block cannot be divided into two equally to generate the image data Ha and Hb. In order to avoid such an inconvenience, the following methods are available.

By one method, the blocks Pr1 and Pb1 of each macroblock are exchanged. Since the number of blocks of the color difference signal is averaged between the image data Ha and Hb, the above-mentioned inconvenience can be alleviated.

Figure 29B:
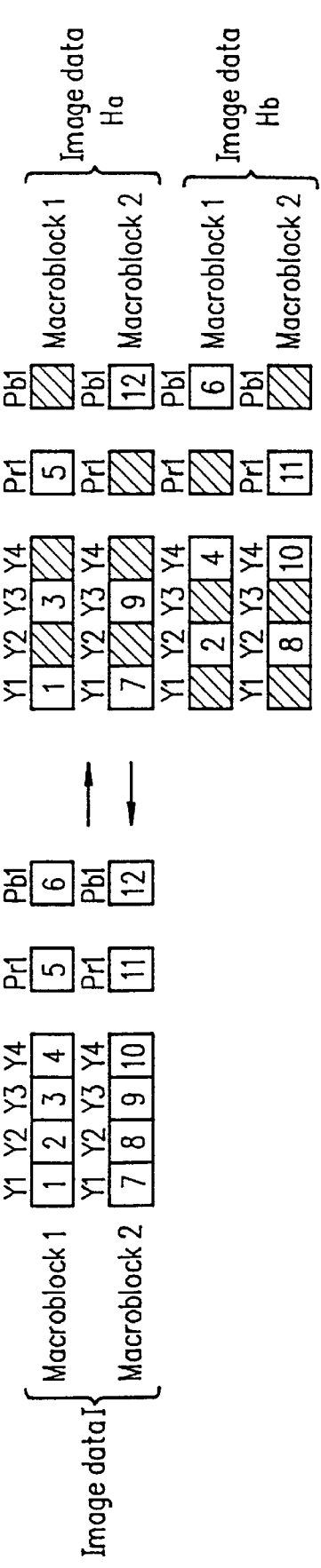
FIG. 29B is a view illustrating operation of an post-processing device in the nineteenth example.

By another method, data in two macroblocks (macroblock 1 and macroblock 2) of the input image data I is divided into two to generate the image data Ha and Hb. In this manner, the information content in the image data I can be divided more equally. FIG. 29B illustrates this method in detail. The luminance signal is processed in the above-described manner, and thus description thereof will be omitted. The color difference signals are processed in the following manner: The block Pr1 of the macroblock 1 of the image data I is located as the block Pr1 in the macroblock 1 of the image data Ha. The block Pb1 of the macroblock 1 is located as the block Pb1 in the macroblock 1 of the image data Hb. The block Pr1 of the macroblock 2 of the image data I is located as the block Pr1 in the macroblock 2 of the image data Hb. The block Pb1 of the macroblock 2 of the image data I is located as the block Pb1 in the macroblock 2 of the image data Ha. In this manner, the information contents in the image data Ha and Hb are more averaged.

EXAMPLE 20

In a video signal recording and reproduction apparatus in a twentieth example, the ability of correct ing a transmission error is improved than in the eighteenth and the nineteenth examples. The video signal recording and reproduction apparatus in the twentieth example has the same configuration and operates in the same manner as the video signal recording and reproduction apparatuses in the eighteenth and the nineteenth examples except for partial difference. The same elements as in the eighteenth example will bear the same reference numerals, and detailed description thereof will be omitted.

Figure 30A:
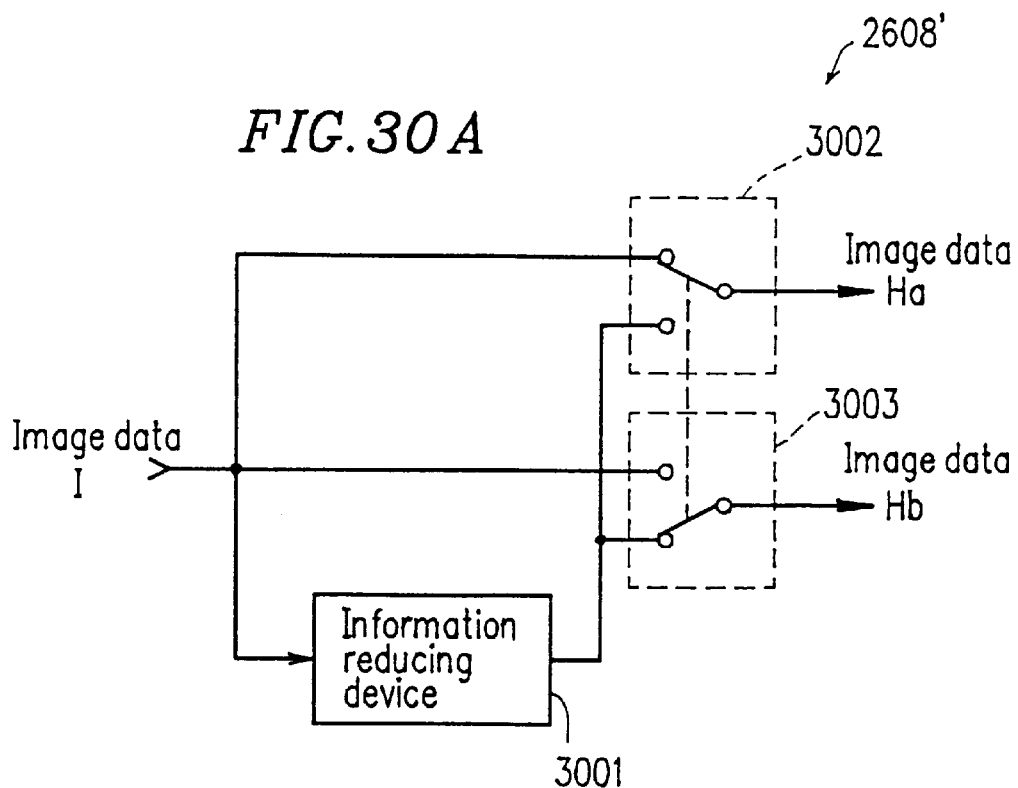
FIG. 30A is a circuit diagram of an pre-processing device in a twentieth example.

FIG. 30A is a circuit diagram of a pre-processing device 2608' in the video signal recording and reproduction apparatus in this example. The pre-processing device 2608' includes an information reducing device 3001 for reducing the information content in the blocks of the input image data I by a prescribed number of blocks (by every microblock in this example), a switch 3002 for receiving the input image data I and the output from the information reducing device 3001 and selecting one of the two inputs at a prescribed cycle to be output as the image data Ha, and a switch 3003 for receiving the input image data I and the output from the information reducing device 3001 and selecting one of the two inputs at an inverse phase to that of the switch 3002 to be output as the image data Hb. The information reducing device 3001 reduces the information content in each macroblock to reduce the number of bits of the coded data obtained from the macroblock (one type of data reduction, data compression, or high-rate coding of the data). In this example, the image data in each macroblock (8 bits) is reduced to 1/16. Since the image data in each macroblock is reduced, the code quantity of each macroblock becomes approximately half of the code quantity obtained without reduction.

Figure 30B:
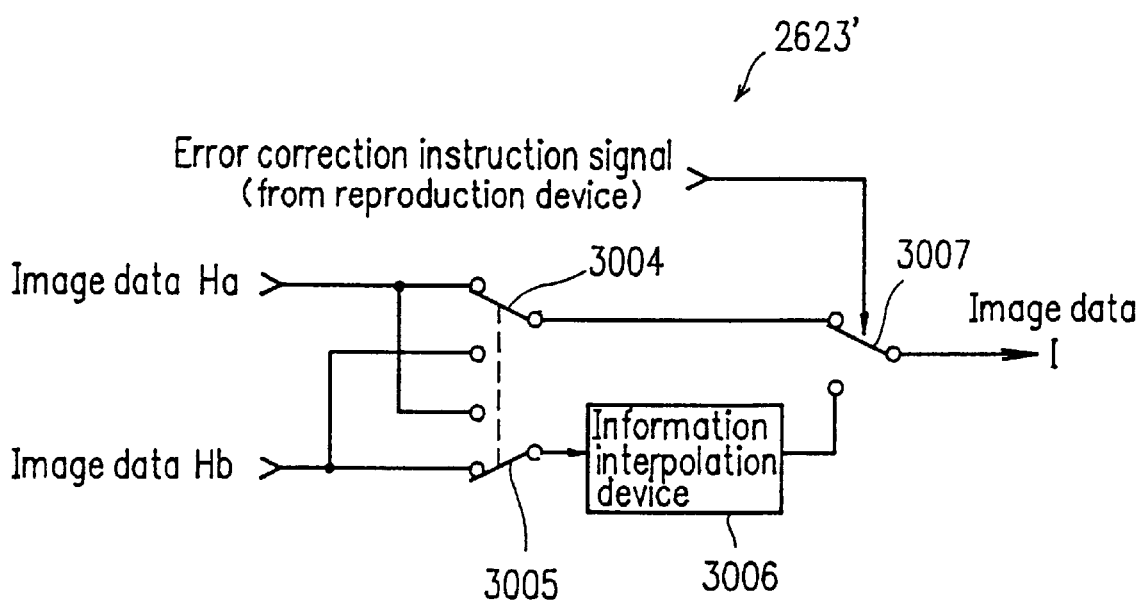
FIG. 30B is a circuit diagram of an post-processing device in the twentieth example.

FIG. 30B is a circuit diagram of a post-processing device 2623' in the video signal recording and reproduction apparatus in the twentieth example. The post-processing device 2623' includes a switch 3004 for receiving the image data Ha and Hb and selecting only one of the image data Ha and Hb which is the same as the image data I to reproduce the image data I, a switch 3005 for receiving the image data Ha and Hb and selecting only one of the image data Ha and Hb which is the same as the output from the information reducing device 3001, an information interpolation device 3006 for reproducing the image data in the form as close as possible to the original image data from the output sent by the information reducing device 3001, and a switch 3007 for selecting the data selected by the switch 3004 or the data from the information interpolation device 3006. The data selected by the switch 3005 at an inverse phase to that of the switch 3004 is equivalent to image data obtained by reducing the information content of the entire image data I, and such data will be referred to as "image data Id". If the information reducing 3001 is considered as a data compressor, the information interpolation device 3006 can be considered as a data expanding device. Since the information reducing device 3001 reduces the image data to 1/16, the information interpolation device 3006 expands the data 16 times to obtain the original image data.

The video signal recording and reproduction apparatus in the twentieth example having the above-described configuration operates in the following manner. FIG. 28 will be used to describe the operation by the pre-processing device 2608' and the post-processing device 2623'. FIG. 26 will also be referred to in addition to FIGS. 30A and 30B.

For recording, every image plane of the image data I which is input to the input terminal 2601 is processed by the pre-processing device 2608' (FIG. 30A) to two image data Ha and Hb. The white macroblocks in the image data Ha have the same image data as in the corresponding macroblock in the image data I. The hatched macroblocks in the image data Ha have outputs from the information reducing device 3001, namely, data obtained by reducing the data in the corresponding position in the image data to 1/16 in an amplitude direction. In the same manner, the white macroblocks in the image data Hb have the same image data as in the corresponding macroblock in the image data I. The hatched macroblocks in the image data Hb have outputs from the information reducing device 3001, namely, data obtained by reducing the data in the corresponding position in the image data to 1/16 in the amplitude direction. In other words, the image data I is converted to the image data Ha and Hb in the state of being partially overlapped. In the eighteenth example, by contrast, the hatched macroblocks have only dummy data, and thus the image data I is divided into two with no overlapping. The image data Ha and Hb are processed with high-rate coding as in the eighteenth example to be coded data Ca and Cb, and further multiplexed into a recording signal Rab to be recorded to the recording medium 2604.

For reproduction, the recording signal Rab is reproduced, divided into coded data Ca and Cb, and decoded into the image data Ha and Hb.

In normal operation, only the data in the white macroblocks in the image data Ha and Hb are selected by the switch 3004 and synthesized into the image data I to be output from the output terminal 2607 through a switch 3007. However, when a data error which is not correctable by the reproduction devices 2617a and 2617b is detected, an error correction instruction signal is sent from reproduction devices 2617a and 2617b, and thus the data in the corresponding macroblock is replaced with the image data substantially reproduced from the data in the hatched macroblock by the information interpolation device 3006. Such data is output via the switch 3007.

The compression ratio in this example is approximately 2/3 of the compression ratio in the conventional apparatus (1:C), namely, 1:(2/3)C because the information content in each hatched macroblock in the image data Ha and Hb is approximately half of the information content in each white macroblock.

In the twentieth example according to the present invention, the input image data I is converted into two image data Ha and Hb in the state of being partially overlapped before compression and recording. Thus, the compression ratio is slightly reduced to improve the quality of the image obtained by the high-rate coding. Further, by using the overlapped part of the data, error correction is guaranteed more reliably.

In the twentieth example, the information reducing device 3001 reduces the data by data processing which is equivalent as multiplying the image data by a value less than "1" (bit shift processing). Other types of devices can be used as the information reducing device 3001. In one simple exemplary device, an average value of the macroblock or a value of image data at a prescribed position in the macroblock is found, and all the image data is replaced with such a value. In this case also, the information thus obtained includes only a DC component. Accordingly, the code quantity and the compression ratio (1:(C/2)) are the same in the eighteenth example. In this case, the information interpolation device 3006 can be eliminated, which simplifies the circuit configuration.

Other methods for reducing the information are also usable. For example, only an AC component in the macroblock, namely, the dynamic range is reduced. In detail, an average value in the macroblock is found, and the difference between the value of the image data in the macroblock and the average value, namely, an AC component is found. The difference is multiplied by a value less than "1" to reduce the dynamic range. The obtained dynamic range and the average value are added together, and the sum is used as the image data after the information reduction. In such a case, information interpolation is performed by finding the difference between the value of the image data in the macroblock and the average value (AC component), multiplying the difference by a reciprocal of the above-mentioned value less than "1", and then adding the obtained value to the average value. In this manner, the image data which is substantially the same as the original image data I can be obtained.

The other effects in the eighteenth and nineteenth examples can also be achieved.

EXAMPLE 21

Figure 31:
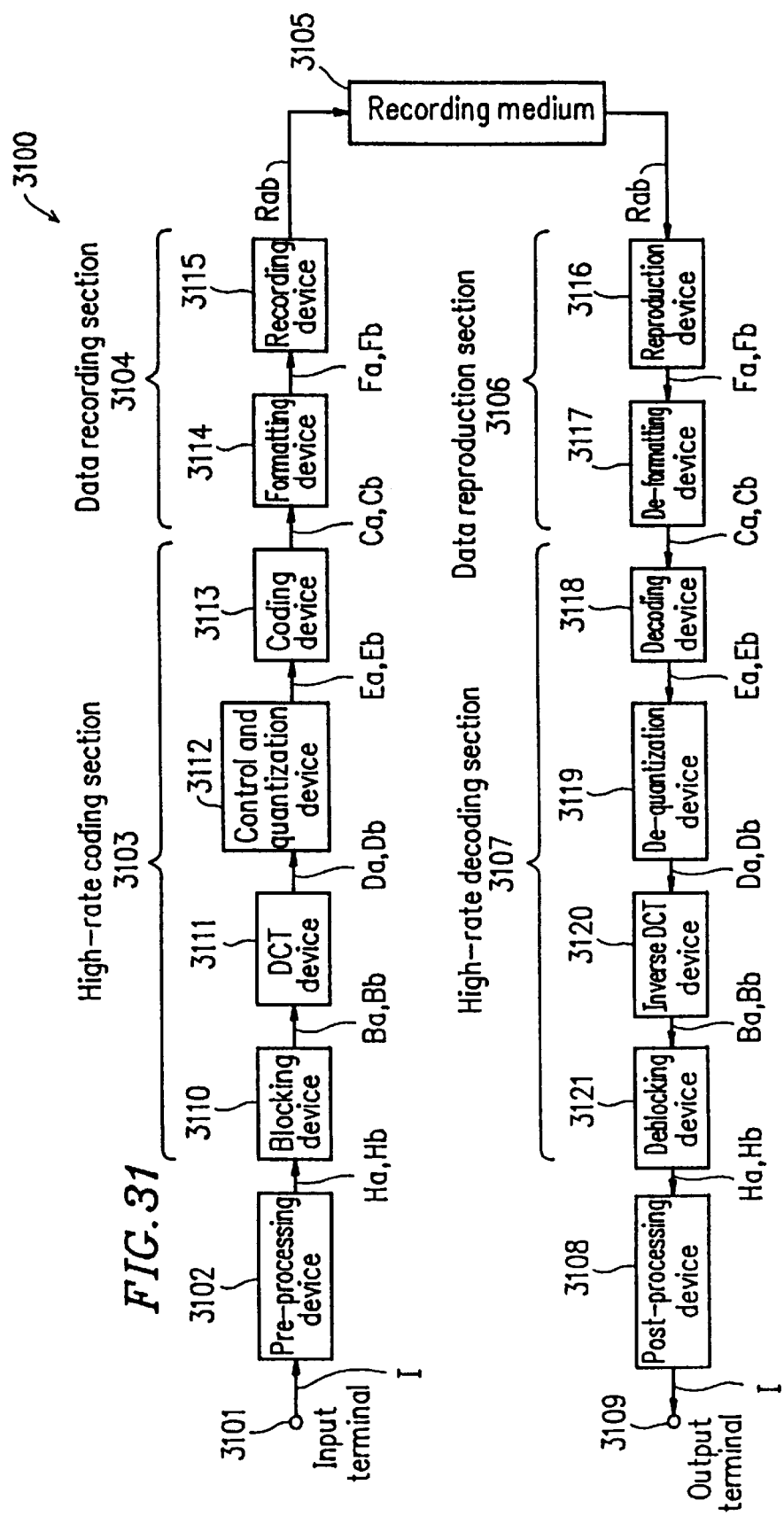
FIG. 31 is a block diagram of a video signal recording and reproduction apparatus in a twenty-first example according to the present invention.

A twenty-first example according to the present invention will be described with reference to FIGS. 31, 32A and 32B. FIG. 31 is a block diagram of a video signal recording and reproduction apparatus 3100 in the twenty-first example. The video signal recording and reproduction apparatus 3100 can operate both in a normal mode conventionally available and in a high quality mode. In the high image quality mode, a high quality image is recorded and reproduced by delay of ½ frame cycle.

The video signal recording and reproduction apparatus 3100 includes an input terminal 3101 to which image data I of a moving image is input, a pre-processing device 3102, a high-rate coding section 3103 for performing high-rate coding of the obtained data, a data recording section 3104 for recording the obtained data to a recording medium 3105, a data reproduction section 3106 for reproducing the data from the recording medium 3105, a high-rate decoding section 3107 for decoding the obtained data into the image data I, a post-processing device 3108, and an output terminal 3109 from which the reproduced image data I is sent out.

The pre-processing device 3102 simply allows transmission of the image data with no processing in the normal mode. In the high quality mode, the pre-processing device 3102 generates two image data Ha and Hb from each of the plurality of image planes of the image data I so that the image data Ha and Hb have information in a partially overlapped state. The image data Ha and Hb are generated sequentially, not simultaneously, from the image data I. The high-rate coding section 3103 performs the high-rate coding of the image data I (the normal mode) or the image data Ha and Hb (the high quality mode). The post-processing device 3108 allows the transmission of the image data I with no processing in the normal mode. In the high quality mode, the post-processing device 3108 reproduces the image data I from the image data Ha and Hb at a smaller compression ratio than in the normal mode, thus to generate a high quality image.

The high-rate coding section 3103, the data recording device 3104, the data reproduction device 3106, and the high-rate decoding device 3107 have the same configuration and operates in the same manner as in the conventional apparatus and the apparatus in the eighteenth example, and thus detailed description thereof will be omitted. The high-rate coding section 3103 includes a blocking device 3110, a DCT device 3111, a control and quantization device 3112, and a coding device 3113. The data recording section 3104 includes a formatting device 3114 and a recording device 3115. The data reproduction section 3106 includes a reproduction device 3116 and a de-formatting device 3117. The high-rate decoding section 3107 includes a decoding device 3118, a de-quantization device 3119, an inverse DCT device 3120, and a de-blocking device 3121.

Figure 32A:
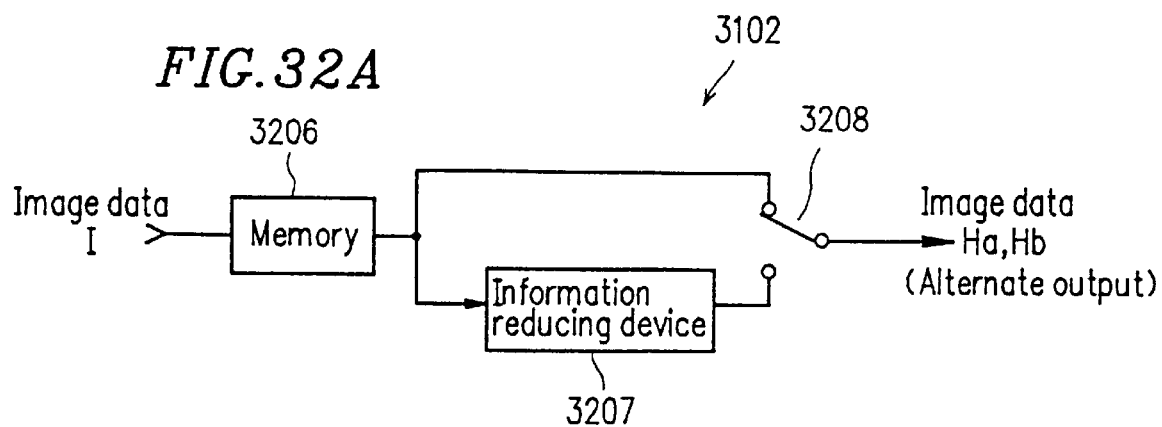
FIG. 32A is a circuit diagram of an pre-processing device in a twenty-first example.

FIG. 32A is a circuit diagram of the pre-processing device 3102. The pre-processing device 3102 includes a memory 3206 for storing the image data I, an information reducing device 3207 which is the same as shown in FIG. 30A, and a switch 3208. The switch 3208 receives the output from the memory 3206 and the output from the information reducing device 3207 as two inputs and selects one of the two inputs at a prescribed cycle. Thus, the image data Ha and Hb as shown in FIG. 28, 29A or 29B are generated alternately for each image plane.

Figure 32B:
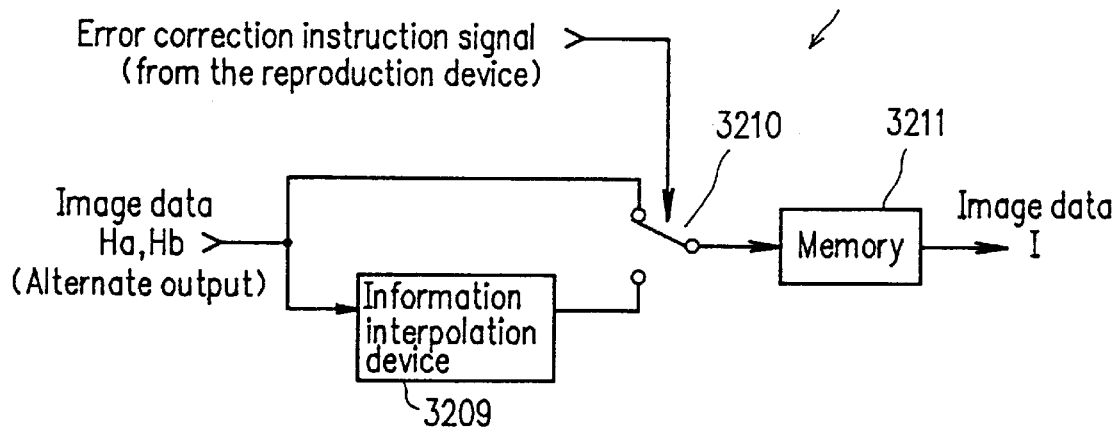
FIG. 32B is a circuit diagram of an post-processing device in the twenty-first example.

FIG. 32B is a block diagram of the post-processing device 3108. The post-processing device 3108 includes an information interpolation device 3209, a switch 3210, and a memory 3211. The information interpolation device 3209 interpolates only the image data in the macroblocks of the image data Ha and Hb which have been processed with information reduction. The switch 3210 receives the output from the de-blocking device 3121 (the image data I, Ha or Hb) and the output from the information interpolation device 3209. In the high quality -mode, only when an error correction instruction signal is sent from the reproduction device 3116, the switch 3210 selects error correcting data for correcting an error which cannot be corrected by the reproduction device 3116 (output from the information interpolation device 3116). When such a signal is not sent, the switch 3210 selects the data only in the white macroblocks in FIG. 28, 29A or 29B. In the normal mode, the switch 3210 selects the image data I sent from the de-blocking device 3121. The memory 3211 allows the transmission of the image data I with no processing in the normal mode. In the high quality mode, the memory 3211 synthesizes the image data Ha and Hb into the image data I.

The video signal recording and reproduction apparatus 3100 having the above-described configuration operates in the following manner. In the normal mode, the image data I simply transmits through the pre-processing device 3102 and the post-processing device 3108, and the recording and reproduction operation is the same as in the conventional apparatus and the apparatus in the eighteenth example. Thus, detailed description thereof will be omitted.

For recording in the high quality mode, the image data I which is input to the input terminal 3101 is divided into two in the state of being partially overlapped to generate the image Ha and Hb. The image data Ha is first generated and converted into Ca by the high-rate coding section 3103. The coded data Ca is converted into a recording signal Ra and recorded to the recording medium 3105 by the data recording section 3104. Then, the image data Hb is generated and converted into Cb by the high-rate coding section 3103. The coded data Cb is converted into a recording signal Rb and recorded to the recording medium 3105 by the data recording section 3104.

Each image plane of the image data I is divided into the image data Ha and Hb. The information is partially overlapped in the image data Ha and Hb and recorded alternately. The total information content is less than twice the information content in the image data I, but the total code quantity is twice the code quantity of each of the image data Ha and Hb. Accordingly, the image data I is processed with high-rate coding at a smaller compression ratio than in the conventional apparatus. As a result, high quality recording can be realized.

For reproducing in the high quality mode, the recording signal Ra is obtained from the recording medium 3105 and converted into the coded data Ca by the data reproduction section 3106. The coded data Ca is decoded into the image data Ha by the high-rate decoding device 3107. The image data Ha is sent to the post-processing device 3108. If there is no error in the data in the white macroblocks shown in FIG. 28, 29A or 29B, the data in the white macroblocks is written in the memory 3211 via the switch 3210. If there is an error in such data, the data is not written in the memory 3211. At this point, the data in the hatched macroblocks shown in the FIG. 28, 29A or 29B (macroblocks processed with information reduction) is reproduced into the original image data by the information interpolation device 3209 and written in the memory 3211 through the switch 3210.

Then, the recording signal Rb is obtained from the recording medium 3105 and converted into the coded data Cb by the data reproduction section 3106. The coded data Cb is decoded into the image data Hb by the high-rate decoding device 3107. The image data Hb is sent to the post-processing device 3108. If there is no error in the data in the white macroblocks shown in FIG. 28, 29A or 29B, the data in the white macroblocks is written in the memory 3211 via the switch 3210. The white macroblocks in. the image data Hb correspond to the hatched macroblocks in the image data Ha. Accordingly, by writing the image data Ha and Hb in the memory 3211, the entire image data I is obtained in the memory 3211, and thus is output from the output terminal 3209.

By such writing, the macroblocks having an error which cannot be corrected by the reproduction device 3116 is not properly reproduced as a part of the image. In the case where a white macroblock in the image data Ha has such an error, such an error is compensated for in the following manner. Data in the macroblock located at the corresponding position in the image data Hb (hatched macroblock), namely, data processed with information reduction by the information reduction device 3207 is expanded by the information interpolation device 3209. The white macroblock having an error is replaced with the data obtained by such interpolation. In the case where a white macroblock in the image data Hb has such an error, the white macroblock is replaced with data obtained by interpolating the data in the macroblock located at the corresponding position in the image data Ha (hatched macroblock).

In detail, when the image data Ha is written in the memory 3211, the data obtained by interpolation (corrected data) is also written. If there is no error in the data in each white macroblock of the image data Hb, the corrected data is updated into the data in the white macroblock. If there is an error, no writing is performed, which is equivalent to writing of the corrected data. When the image data Hb is written in the memory 3211, the data obtained by interpolation (corrected data) is also written. If there is no error in the data in each white macroblock of the image data Ha, the corrected data is updated into the data in the white macroblock. If there is an error, no writing is performed, which is equivalent to writing of the corrected data. In this manner, correction can be performed for all the macroblocks having an error caused during the transmission.

In the twenty-first example according to the present invention, in the high quality mode, the number of frames which are input per second is half of the normal operation at the maximum. The speed cannot be raised further. However, by simply adding the pre-processing device 3102 and the post-processing device 3108 to the conventional video signal recording and reproduction apparatus, the number of bits for each image plane can be increased and thus the compression ratio can be reduced, resulting in improvement in recording and reproduction quality.

In this example, the image data I is divided into two image data Ha and Hb in the state of being partially overlapped. It is easily appreciated that an high quality image can also be obtained in the case where the information is not overlapped in the image data Ha and Hb. In such a case, the error correction ability is less than in the above-described case, but the compression ratio can be lower because compression of the overlapped part of the information is not needed. Accordingly, the image quality is higher.

The high quality mode is used for, for example, a still image mode. A moving image is recorded in the normal mode, and a still image is recorded in the high quality mode. By recording one still image in the normal mode immediately before or immediately after being recorded in the high quality mode, the same single still image is recorded both in the normal mode and the high quality mode. Thus, error correction can be performed at a higher precision. Even a reproduction apparatus which does not have a high quality mode can reproduce the still image recorded in the normal mode. Thus, the video signal recording and reproduction apparatus in this example can be compatible with a reproduction apparatus having only the normal mode. In the case the recording medium is stopped each time one frame of a still image is recorded, the recording medium does not run stably immediately. In consequence, the track having data stored already is possibly dislocated in the width direction, thus causing erroneous data transmission. In the case where the same single image is recorded in the normal mode immediately after being recorded in the high quality mode, only the data recorded in the normal mode is dislocated. The data recorded in the high quality mode is not influenced by the dislocation. Even if an area of data recorded in the normal mode is switched to another area of data recorded in the high quality mode or vice verse in one recording medium, servo or image disturbances are not caused at the border between the two areas. The reason is that the recording width in the high quality mode is obtained by multiplying the recording width in the normal mode by an integer (in this example, two).

Needless to say, by raising the speed of the pre-processing device 3102, the high-rate coding section 3103, the data recording section 3104, the data reproduction device 3106, the high-rate decoding device 3107, and the post-processing device 3108 to twice as high, the video signal recording and reproduction apparatus records and reproduces a higher quality image without dropping any frame, i.e., at the normal speed.

In the eighteenth through twenty-first examples. the compression ratio is reduced to ½ of the conventional high-rate coding device. The compression ratio can be 1/N (N is an integer), and the data can be processed by the channels provided in the number of N in parallel. By raising the processing speed, the number of channels for processing can be reduced. By raising the processing speed N times, only one channel is sufficient as in this example. In such a case, a multiplexer can be eliminated.

EXAMPLE 22

A twenty-second example according to the present invention will be described with reference to FIGS. 33, 34A, 34B, 35A and 35B. In the twenty-second example, image data corresponding to an image size 2 is processed with high-rate coding for compression to image data corresponding to an image size 1 for recording and reproduction using the conventional video signal recording and reproduction apparatus.

Figure 33:
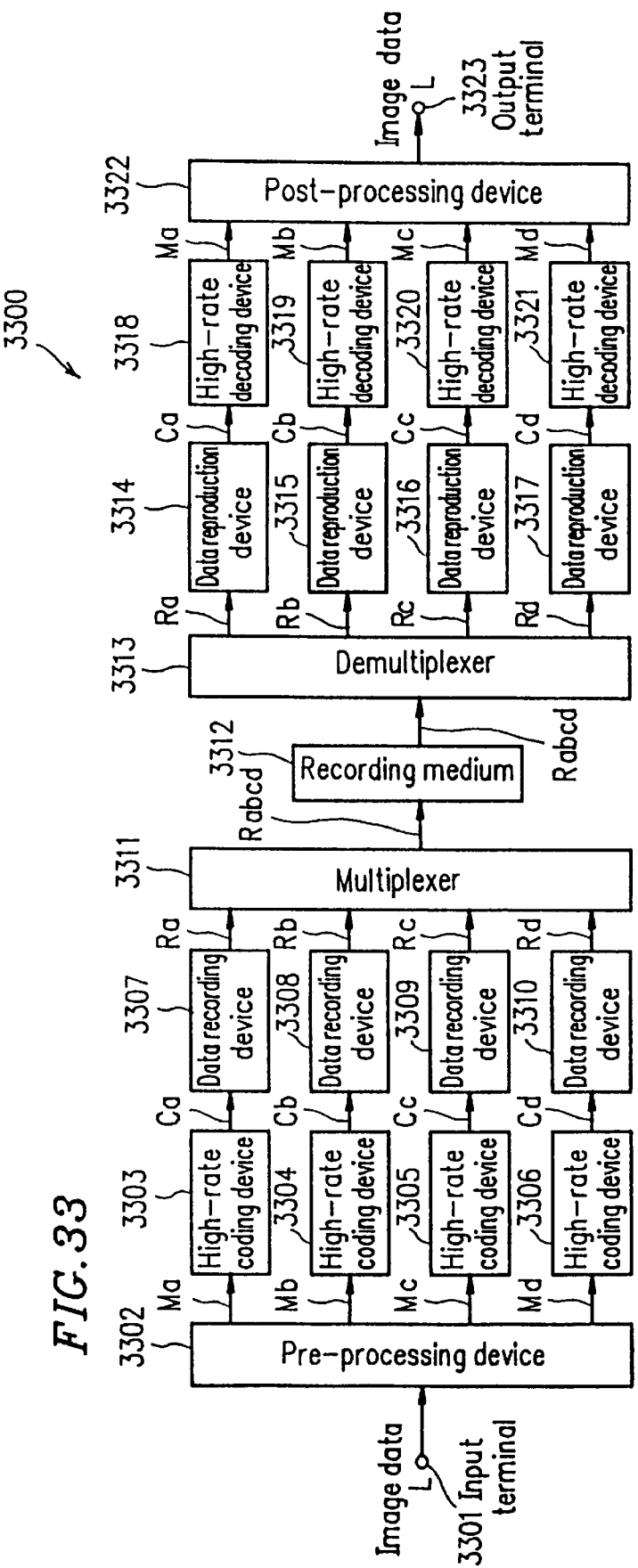
FIG. 33 is a block diagram of a video signal recording and reproduction apparatus in a twenty-second example according to the present invention.

FIG. 33 is a block diagram of a video signal recording and reproduction apparatus 3300 in the twenty-second example.

The video signal recording and reproduction apparatus 3300 includes an input terminal 3301 to which image data of a moving image having an image size 2 is input. In this example, the image size 2 is obtained by expanding an image size 1 to twice as large both horizontally and vertically. In detail, the image size 2 includes 1440 pixels (horizontal)×960 lines (vertical). A pre-processing device 3302 converts each of a plurality of image planes of an image L having the image size 2 into four image data Ma, Mb, Mc and Md, each having the image size 1 (720 horizontal)×480 (vertical) pixels which is ¼ of the image size 2. Four high-rate coding devices 3303 through 3306 respectively perform high-rate coding of the image data Ma, Mb, Mc and Md into coded data Ca, Cb, Cc and Cd. Four data recording devices 3307 through 3310 respectively arrange the coded data Ca, Cb, Cc and Cd in accordance with a recording format (transmission format) and generates recording data Ra, Rb, Rc and Rd as a result of addition of an error correction code, coding for the transmission path (modulation), and the like. A multiplexer 3311 multiplexes the recording data Ra, Rb, Rc and Rd into a recording signal Rabcd and records the recording signals Rabcd to a recording medium 3312. A de-multiplexer 3313 de-multiplexes the recording signal Rabcd from the recording medium 3312 into the recording data Ra, Rb, Rc and Rd. Four data reproduction devices 3314 through 3317 respectively reproduce the data as a result of decoding for coding for the transmission path (demodulation), decoding of the error correction code, and the like, and then take out the data Ca, Cb, Cc and Cd in accordance with the recording format. Four high-rate decoding devices 3318 through 3321 respectively decode the coded data Ca, Cb, Cc and Cd into the image data Ma, Mb, Mc and Md. A post-processing device 3322 performs processing reverse to the processing in the pre-processing device 3302 to obtain the image L.

Figure 34A:
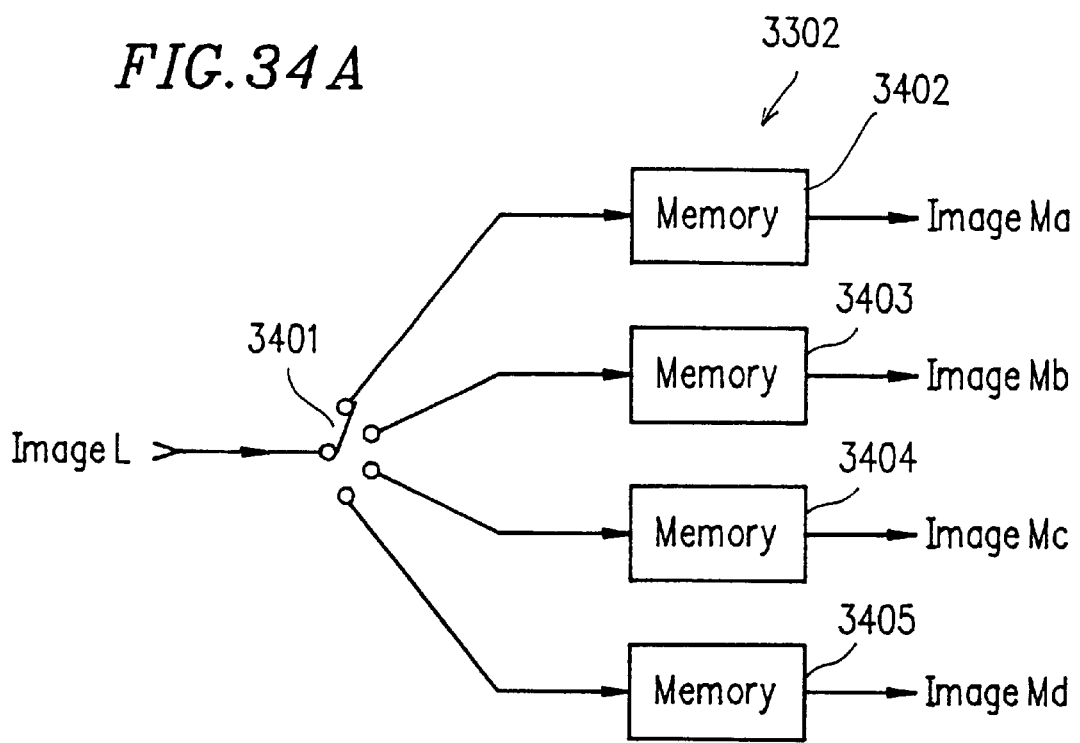
FIG. 34A is a circuit diagram of an pre-processing device in the twenty-second example.

FIG. 34A is a circuit diagram of the pre-processing device 3302. The pre-processing device 3302 includes a switch 3401 and four memories 3402 through 3405. The switch 3401 receives the image data L (L will be also used to represent the image data of the image L) and selects one of the four memories 3402 through 3405 at a prescribed cycle to output the image data L. The memories 3402 through 3405 store the data from the switch 3401 and respectively form image data Ma, Mb, Mc and Md.

Figure 34B:
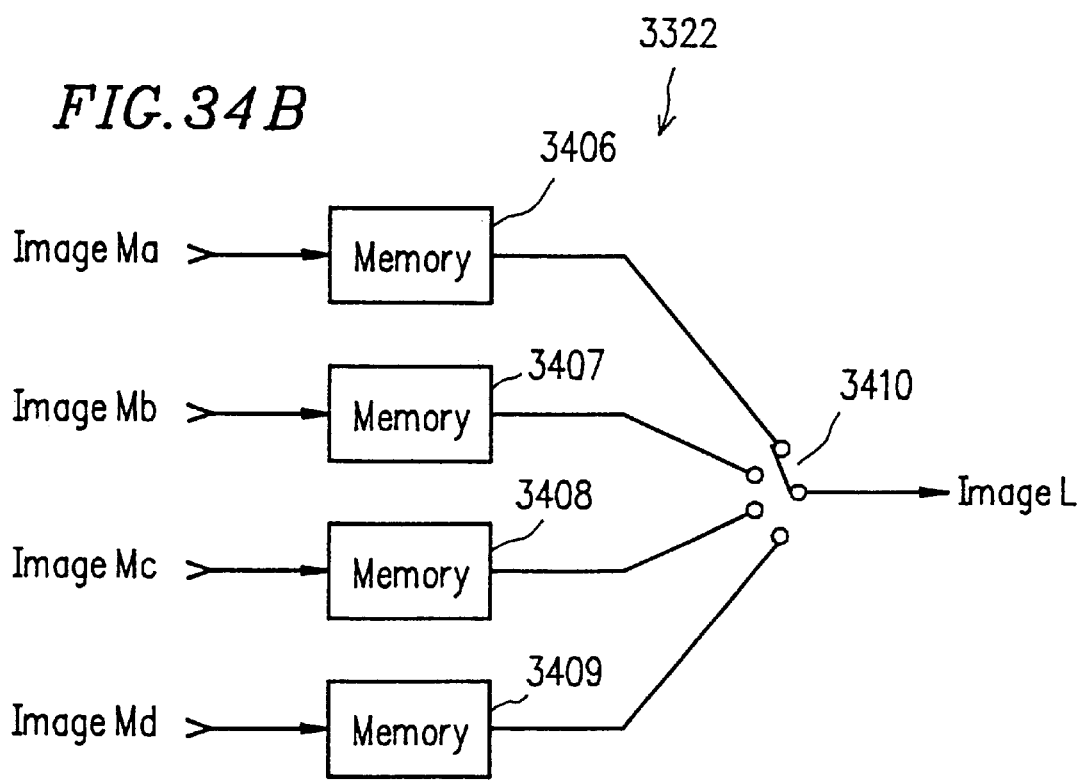
FIG. 34B is a circuit diagram of an post-processing device in the twenty-second example.

FIG. 34B is a circuit diagram of the post-processing device 3322. The post-processing device 3322 includes four memories 3406 through 3409 and a switch 3410. The memories 3406 through 3409 store the reproduced image data Ma, Mb, Mc and Md, and the switch 3401 receives the image data Ma, Mb, Mc and Md, and selects one of the inputs at a prescribed cycle to form the image data L.

The operation of the video signal recording and reproduction apparatus 3300 having the above-described configuration will be described with reference to FIGS. 33, 35A and 35B.

For recording, the image data L which is input to the input terminal 3301 is divided into four image data Ma, Mb, Mc and Md by the pre-processing device 3302. The image data Ma, Mb, Mc and Md are respectively processed with the high-rate coding by the high-rate coding devices 3303 through 3306 to coded data Ca, Cb, Cc and Cd. The coded data Ca, Cb, Cc and Cd are respectively processed by the recording devices 3307 through 3310 to recording data Ra, Rb, Rc and Rd. The recording data Ra, Rb, Rc and Rd are multiplexed by the multiplexer 3311 to a recording signal Rabcd, which is recorded to the recording medium 3312. Each image plane of the image L having the image size 2 is divided into four image data Ma, Mb, Mc and Md each having the image size 1. Such image data Ma, Mb, Mc and Md are recorded in the same manner as in the conventional apparatus, for example, at the same compression ratio and in the same image size. In other words, the recording is performed at a speed four times higher than in the conventional apparatus.

For reproduction, the recording signal Rabcd from the recording medium 3312 is de-multiplexed into the recording data Ma, Mb, Mc and Md by the de-multiplexer 3313. The recording data Ma, Mb, Mc and Md are respectively converted into the coded data Ca through Cd by the data reproduction devices 3314 through 3317, and decoded into the image data Ma through Md by the high-rate decoding devices 3318 through 3321. The image data Ma through Md are synthesized by the post-processing device 3322 into the image data L. The image data L is output from the output terminal 3323.

Figure 35A:
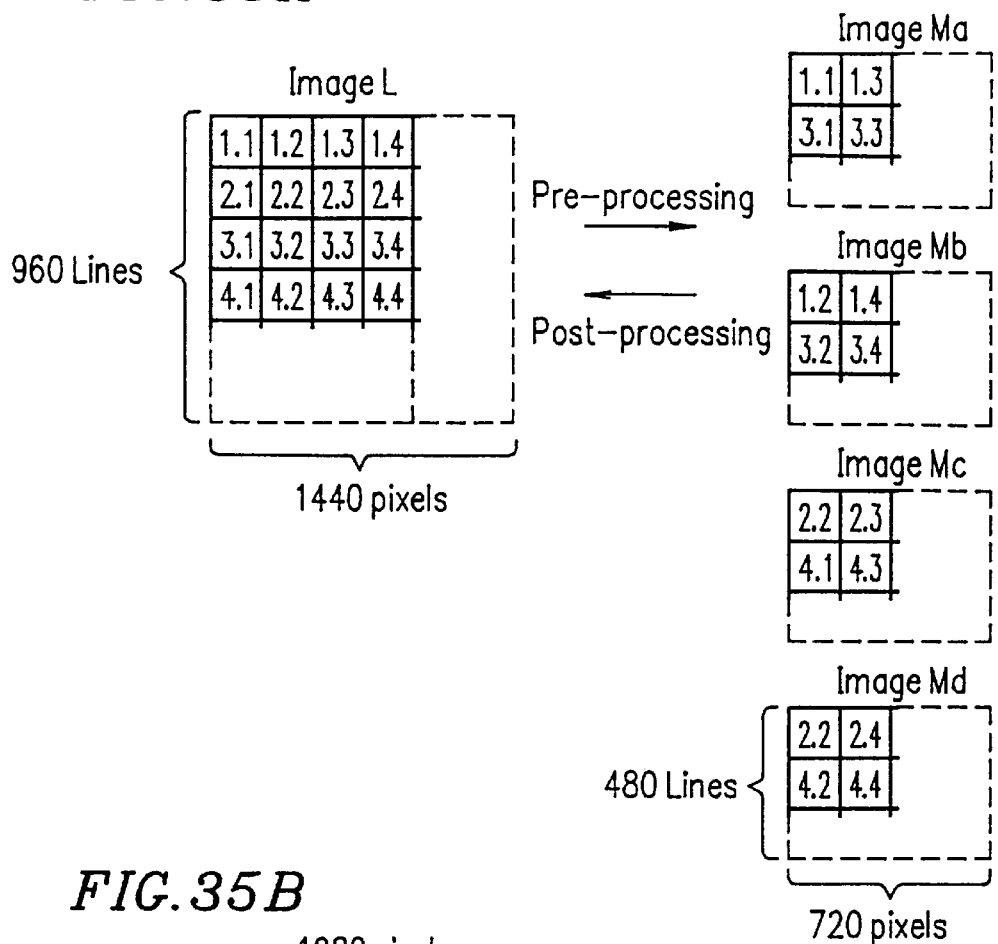
FIG. 35A is a view illustrating pre-processing operation in the twenty-second example.

FIG. 35A illustrates the pre-processing and the post-processing. White squares each indicate a macroblock of the image, and the numerical figures in the white squares each indicate the horizontal and vertical position of the corresponding macroblock. The size of all the macroblocks is the same.

By the pre-processing device 3302, the image data L is divided into four image data Ma, Mb, Mc and Md in the following manner: Every four macroblocks in the image data L are used as a conversion unit. For example, macroblocks 1,1 1,3 3,1 and 3,3 are used one conversion unit. Such conversion units are used. as macroblocks forming the image data Ma, Mb, Mc and Md. The reverse processing is performed by the post-processing device 3322.

The four macroblocks in each conversion unit are adjacent to one another, and the information content in each macroblock (for example, the information content obtained using the same quantization characteristic) is almost equal. Even if the image data Ma through Md are processed with high-rate coding independently, almost the same quantization characteristic is selected. for the image data Ma through Md. Accordingly, no quality difference occurs in the reproduced image data L.

The image data Ma, Mb, Mc and Md each maintain the positional relationship of the macroblocks in the image data L. The macroblocks located at the corresponding position in the image data Ma through Md are adjacent to one another in the image data L. In other words, the positional relationship between the macroblocks in the image data L is substantially maintained within each of the image data Ma through Md and among the image data Ma through Md. Accordingly, the correlation of the low-frequency components of the four image data Ma through Md is strong. Thus, when the image data L can be reproduced by the conventional apparatus, an image which is close to an image obtained by a DC component of each macroblock can be reproduced in a state which is equivalent to ¼-speed reproduction.

In the twenty-second example according to the present invention, the image data L is divided into four image data so that each of the four image data has the same information content as that of the image data L. Accordingly, by simply adding the pre-processing device 3302 and the post-processing device 3322 before and after the conventional video signal processing circuit, image data having a size which is four times larger than the size of the image data which is input to the conventional video signal recording and reproduction apparatus is recorded using high-rate coding in the same manner. High quality recording can be realized without causing any quality difference in the image L. Since the conventional video signal processing circuit can be utilized without any significant alteration, a compact video signal recording and reproduction apparatus which enjoys lower power consumption can be easily realized at lower cost.

In the twenty-second example, the image size 2 of the image L is twice the size of each of the image data Ma, Mb, Mc and Md (the image size 1) both horizontally and vertically. Other converting methods are also available. For example, coding is performed by a unit of a macroblock as in this example, any method can be used as long as the total number of macroblocks in the image L having the image size 2 is four times the total number of macroblocks of each of the image data Ma through Md having the image size 1. Where data corresponding to the image L includes 1440 (horizontal)×960 (vertical) pixels, the sampling frequency ratio of the luminance signal and two color difference signals is 4:1:1, and one macroblock includes four blocks for the luminance signal and two blocks respectively for the two color difference signals; the total number of macroblocks is 5400. An image L' having 12330 (horizontal)×10330 (vertical) pixels also have a total number of macroblock of 5400. Accordingly, the image L' can be converted into an image L for high-rate coding and recording. 10330 is the number of the effective vertical lines of data corresponding to an HD TV signal conforming to the standards in the United States.

Figure 35B:
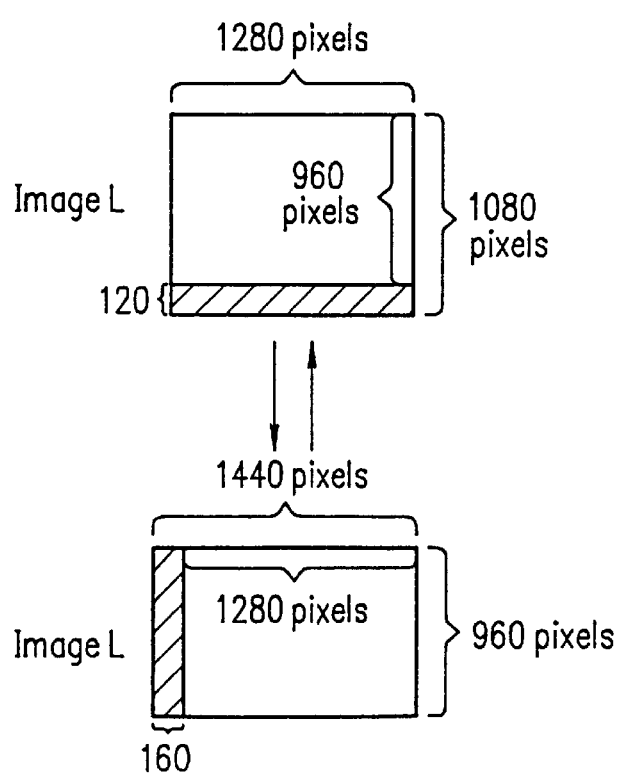
FIG. 35B is a view illustrating post-processing operation in the twenty-second example.

FIG. 35B illustrates one exemplary method for the conversion from an image L' to an image L. Image data for the image L' will also be referred to as image data L'.

120 horizontal pixels (lines) of the image L' (hatched area) are arranged macroblock by macroblock to be located in a leftmost area (hatched area). Thus, the image L' is converted into an image L. When an image L' is input to the video signal recording and reproduction apparatus 3300, the image L' is converted into an image L before being processed by the pre-processing device 3302. After being processed by the post-processing device 3322, the image L is converted into the image L'. In practice, such conversion is performed by simply changing the switching cycle of the switches 3401 and 3410. Substantial addition of a circuit is not needed. The hatched area in FIG. 35B can be rearranged in various manner in order to substantially equalize the code quantity in each macroblock after the conversion. The manner shown in FIG. 35B, in which the non-hatched area is maintained with no alteration after the conversion, has an advantage that the image can be grasped easily whether the image is obtained by the search picture mode or the normal reproduction mode.

Another manner of conversion is proposed in order to design a video signal recording and reproduction apparatus which is as close as possible to the studio standards for high vision signals in Japan and the United States using a high-rate coding device and a data recording device which are used in a video signal recording and reproduction apparatus utilizing compression for a standard-definition TV signal described in the Description of the Related Art. Such a video signal recording and reproduction apparatus includes four channels of processing devices produced for a standard-definition European TV signal. The four channels are operable in parallel. Such a video signal recording and reproduction apparatus operates at a frame frequency of 60 Hz (bit rate: 120 Mbps) instead of 50 Hz.

EXAMPLE 23

In the eighteenth through twenty-second examples, image data is divided into a plurality of image data in the pre-processing and the plurality of image. data are synthesized into the original image data in the post-processing. Pre-processing and post-processing are not limited to such operation. Pre-processing and information reduction can be performed after DCT. In a twenty-third example, the processing which is equivalent to that in the eighteenth example is performed with a different configuration.

Figure 36:
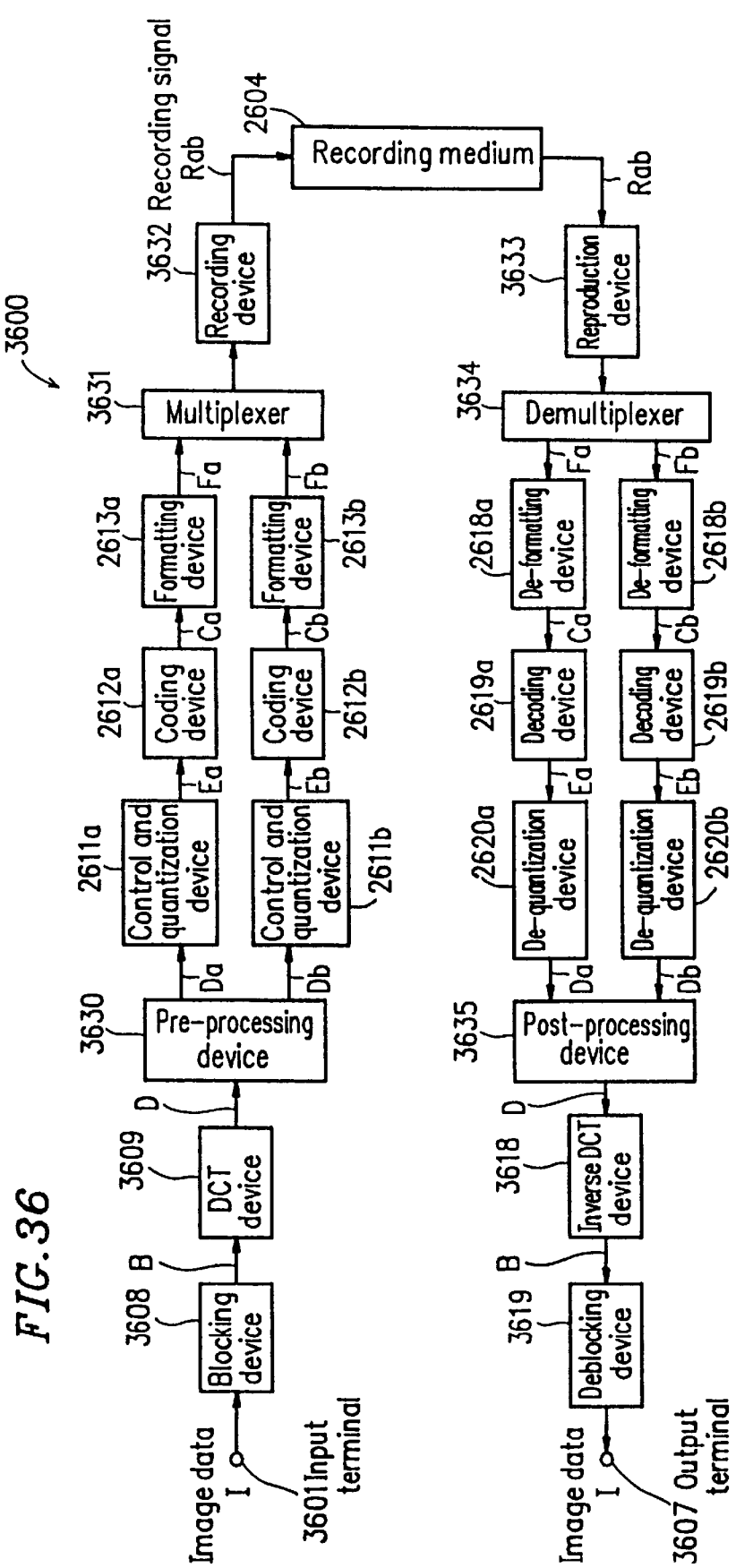
FIG. 36 is a block diagram of a video signal recording and reproduction apparatus in the twenty-third example according to the present invention.

FIG. 36 is a block diagram of a video signal recording and reproduction apparatus 3600. The identical elements with those in the eighteenth example bear the identical reference numerals therewith, and detailed description thereof will be omitted. In addition to the identical elements as in the eighteenth example, the video signal recording and reproduction apparatus 3600 includes an input terminal 3601, a blocking device 3608, a DCT device 3609, a pre-processing device 3630, a multiplexer 3631, a recording device 3632, a reproduction device 3633, a de-multiplexer 3634, a post-processing device 3635, an inverse DCT device 3618, a de-blocking device 3619, and an output terminal 3607.

The video signal recording and reproduction apparatus 3600 having the above-described configuration operates in the following manner.

For recording, image data I which is input to the input terminal 3601 is converted into blocks by the blocking device 3608, and processed with DCT by the DCT device 3609 into coded data D. The DCT data D is divided into DCT data Da and Db of the image data Ha and Hb shown in FIG. 28 by the pre-processing device 3630. In each of the white macroblocks, the DCT Da or Db is located. In each of the hatched macroblocks, DCT data having a DC component as dummy data x is located as DCT data Da or Db. The DCT data includes no AC component. By such processing, the DCT data Da and Db which correspond to the image data Ha and Hb shown in FIG. 28 (the eighteenth example) are obtained.

The DCT data Da is quantized by the control and quantization device 2611a at a quantization characteristic Ta, which is determined so that the data obtained from the DCT data Da includes the same code quantity as in the conventional apparatus, into quantized data Ea. The quantized data Ea is processed by the coding device 2612a into coded data Ca, and is formatted in accordance with a recording format by the formatting device 2613a into formatted data Fa. The DCT data Db is quantized by the control and quantization device 2611b at a quantization characteristic Tb, which is determined so that the data obtained from the DCT data Da includes the same code quantity as in the conventional apparatus, into quantized data Eb. The quantized data Eb is processed by the coding device 2612b into coded data Cb, and is formatted in accordance with a recording format by the formatting device 2613b into formatted data Fb.

The formatted data Fa and Fb are multiplexed in terms of time by the multiplexer 3631. The resultant data is processed with addition of an error correction code, coding for the transmission path, and the like by the recording device 3632 to be a recording signal Rab. The image data Ha and Hb of each image plane are recorded alternately to the recording medium 2604. The image data I is recorded in the same r recoding format as in the conventional apparatus, in other words, as two image data Ha and Hb. Since the recording bit rate is twice the bit rate in the conventional apparatus, the recording medium 2604 is transported twice as fast.

For reproduction, the recording signal Rab is obtained from the recording medium 2604, and is processed by the reproduction device 3633 with the decoding of the code for the transmission path, decoding of the error correction code, and the like. The resultant signal is de-multiplexed into the formatted data Fa and Fb by the de-multiplexer 3634. From the formatted data Fa, the coded data Ca is taken out by the de-formatting device 2618a. The coded data Ca is processed by a decoding device 2619a to the quantization data Ea, and is de-quantized by the de-quantization device 2620a into the DCT data Da. From the formatted data Fb, the coded data Cb is taken out by the de-formatting device 2618b. The coded data Cb is processed by a decoding device 2619b to the quantization data Eb, and is de-quantized by the de-quantization device 2620b into the DCT data Db. The DCT data Da and Db are sent to the post-processing device 3635.

From the DCT data Da and Db, the macroblocks including the dummy data (corresponding to hatched macroblocks in FIG. 28) are removed, and the other data (corresponding to the white macroblocks in FIG. 28) in the DCT data Da and Db are synthesized into the DCT data D. The DCT data D is processed by the inverse DCT device 3618 into the image data B for each block. The image data B is rearranged block by block by the de-blocking device 3619 to have the same arrangement as the image data I.

The pre-processing device 3630 and the post-processing device 3635 can have the-same configuration as the pre-processing device 2608 and the post-processing device 2623 shown in FIGS. 27A and 27B. The pre-processing device 3630 and the post-processing device 3635 are different from the devices in FIGS. 27A and 27B in that DCT data is input instead of image data and that the switching cycle of the switches 2701, 2702 and 2703 is possibly different.

As is described in the eighteenth example with reference to FIG. 28, one of two adjacent macroblocks in the image data I is copied to the image data Ha, and the other is copied to the image data Hb. It is highly possible that adjacent macroblocks are strongly correlated. When the correlation is strong, the information content (code quantity) is almost equal in such macroblocks. Further, the number of macroblocks in the image data I which are copied to the image data Ha and Hb is equal, and the number of macroblocks for the dummy data is also equal. Accordingly, the information content is equal in the image data Ha and Hb. The dummy data is added in order to increase the size of the image data Ha and Hb (specifically, the number of all the macroblocks) to be compatible with the data conforming to the high-rate format and the recording format used in the conventional apparatus. Due to such compatibility, conventional circuits can be used in a large part of the signal processing circuit of the video signal recording and reproduction apparatus 3600.

The macroblocks for the dummy data include only a DC component, which includes a very small information content. Half of the macroblocks in each of the image data Ha and Hb have the dummy data, and the other half of the macroblocks include effective image data.

The input image data I is substantially divided equally into two to obtain the DCT data Da and Db of the image data Ha and Hb, each having the half of the information content of the image data I. The image data Ha and Hb are each coded after quantized with a quantization characteristic, which is determined so that the data obtained from each of the image data Ha and Hb includes the same code quantity as in the conventional apparatus. As a result, the input image data I is coded into the coded data (Ca and Cb) having a code quantity (total number of bits) which is approximately twice the code quantity in the conventional apparatus. Such a code quantity is equivalent to the code quantity which is obtained by compressing the data at half of a compression ratio (1:(C/2)) in the conventional high-rate coding device. Accordingly, the image obtained in this example has a higher quality than obtained by the conventional high-rate coding device.

The input image-data I is substantially divided equally into two to obtain the image data Ha and Hb having substantially the same information content. Thus, the image data Ha and Hb are quantized with substantially the same quantization characteristic. Accordingly, there is no quality difference in the reproduced image.

In the twenty-third example according to the present invention, the pre-processing device 3630 is provided at the output of the DCT device included in the conventional high-rate coding section. By the pre-processing device 3300, the DCT data Da and Db of the image data Ha and Hb having almost half of the information content of the image data I are directly generated. Accordingly, by simply performing high-rate coding of the image data Ha and Hb independently by two high-rate coding devices of the conventional video signal recording and reproduction apparatus, the coded data (Ca and Cb) which are substantially equivalent as obtained by high-rate coding performed at half of a compression ratio of the conventional device can be generated.

In the video signal recording and reproduction apparatus 3600 in the twenty-third example, the, input image data I is substantially divided equally into two into the image data Ha and Hb. The image data Ha and Hb are processed independently in the same manner as in the conventional video signal recording apparatus and recorded. The multiplexer 3631 then performs processing which is equivalent with multiplexing by a unit of an image plane. As a result, the image data Ha and Hb are recorded alternately in the recording medium 2604 and can be reproduced by the conventional apparatus, and further the information recorded can be checked visually. Since the macroblocks in the image data I are copied into the image data Ha and Hb at the corresponding positions, the image corresponding to the image data I can be easily reproduced using the conventional reproduction apparatus. Since the conventional video signal processing circuits are used (partial use of two identical circuits) with no significant alteration, the mass-produced conventional circuits can be used. Accordingly, higher quality recording can be realized due to the reduction of the compression ratio to half while enjoying the lower cost, lower power consumption and smaller size. When compared with the video signal recording and reproduction apparatus 2600 in the eighteenth example, the size of the dividing device and the DCT device can be reduced to half.

In the twenty-third example, the pre-processing device 3630 and the post-processing device 3635 are in the middle of the video signal circuit. Such a configuration requires slight alteration of the conventional circuit but is still simpler than the configuration in the eighteenth example. In the case of the eighteenth example, since the pre-processing device and the post-processing device are provided outside the conventional video signal processing circuit, almost no internal alteration of the circuit is needed. In this example, the processing which is equivalent to high-rate coding of the image data Ha and Hb having almost the same information content is performed. Accordingly, the pre-processing device 3630 can be located at any position before control of the code quantity, namely, at any position which allows the quantization characteristic to be determined for the data of each image plane. Pre-processing can be performed even if the information is in the state of a signal such as image data or DCT data. The multiplexer 3631 can be performed at any position after the control and quantization devices 2611$a$ and 2611$b$, namely, at any position which allows the quantized DCT data to be output using the quantization characteristic which is determined for each image plane. The post-processing device 3635 can be provided at any position in the data reproduction and high-rate decoding. The de-multiplexer 3634 can be provided at any position before the post-processing device 3635. The above-described conditions for positions is applicable to all the above-described examples.

When a plurality of image data which are generated from input image data are multiplexed, such multiplexed data needs to be processed at a high speed. The optimum position for the pre-processing device, the post-processing device, the multiplexer, and the demultiplexer in the entire processing circuit depends on the processing speed of each section of the video signal recording and reproduction apparatus. The positions of these devices are not limited to the above examples.

In the nineteenth example, in order to increase the ability of correcting an error caused during transmission, the image data Ha and Hb are provided with information in a partially overlapped state by locating the information in the hatched macroblocks shown in FIG. 28. When an error occurs during transmission, the data in the overlapped state can be used to correct the error, thus to reproduce a higher quality image. For this purpose, the pre-processing device 2608' (FIG. 30A) and the post-processing device 2623' (FIG. 30B) include an information reducing device for generating the information to be overlapped and an information interpolation device for generating corrected data using the overlapped data. In the case where the image information is processed in the state of the DCT data Da and Db as in the twenty-third example, the information reducing device and the information interpolation device need to process the information in the state of DCT data instead of image data. In such a case, the function of the information reducing device is, for example, removing a prescribed DCT coefficient (for example, a prescribed DCT coefficient in a high frequency range) or multiplying a prescribed DCT coefficient by a prescribed coefficient less than "1" (if performed to all the AC coefficients, this operation is compression of a dynamic range of the block). In order to remove the DCT coefficient, the information interpolation device needs to do nothing and can be eliminated to simplify the configuration.

In dividing image data I into two image data Ha and Hb in a partially overlapped state, one of the image data can have macroblocks which are arranged differently from the image data I. In a simple example, the information is located one horizontal line of blocks, and the top line of blocks is moved to the bottom of the image plane. In other words, the image plane is shifted by one macroblock. By such operation, the data in the macroblocks located at the same position in the image plane are away from each other in the image data Ha and Hb in the width direction of the magnetic tape as the recording medium by at least one synchronization block. Thus, an error caused by a scratch in the tape in the running direction can be corrected using the information interpolation device. Since such dislocation allows the data in the macroblocks at the same position in the image plane to be recorded or reproduced by different heads, even if the head is clogged, the reproduced image can be complete with no loss of information. Such operation can be applied to the other examples.

In the case where one of the image data Ha and Hb has the macroblocks in the same manner as in the conventional video signal recording and reproduction apparatus, the image can be checked easily by only slight alteration in the circuit in the conventional apparatus. The alteration is performed, for example, so as to reproduce only the image data Ha or Hb having the same arrangement with the arrangement in the conventional apparatus. The data arrangement which is different from the arrangement in the conventional apparatus can be changed at a prescribed cycle, in which case the resolution in the image plane can be improved.

In the above-described examples, image data Ha and Hb (or Ma, Mb, Mc and Md) are recorded sequentially to the recording medium in order to use the conventional apparatus to obtain an image of the quality which is sufficient to check the overall content of the image. If such an effect is not needed, various other recording patterns (multiplexing patterns) are available.

EXAMPLE 24

In high-rate coding according to the present invention, the number of the image data (image data for conversion) is increased without changing the information content in the input image data, and thus the information content in each image data which is input to the high-rate coding device (for example, the number of blocks of dummy data) is reduced. In this manner, the compression ratio is substantially reduced. The input image data is divided into a plurality of the image data for conversion so that the information content is equal among the image data for conversion (more accurately, so that the information content is equal among the areas in which the code quantity is controlled). Accordingly, there is no quality difference in the reproduced image. The number of image data which are obtained from input image data is not necessarily an integer. In the above examples, the compression ratio for high-rate coding is 1/N where N=2, "N" is not necessarily 2 and is not necessarily an integer.

Figure 37:
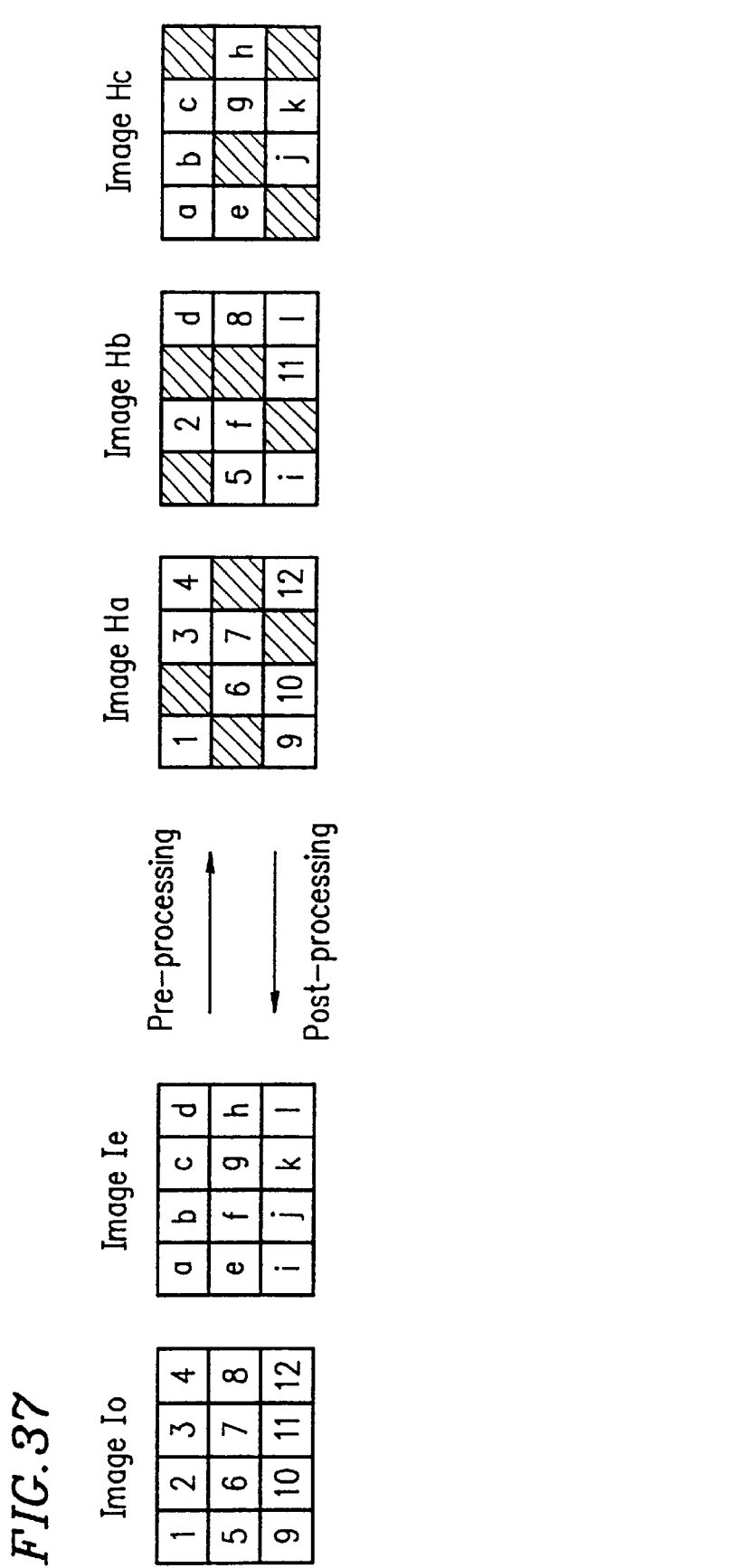
FIG. 37 is a view illustrating pre-processing operation and post-processing operation in the twenty-third example.

In a video signal recording and reproduction apparatus in a twenty-fourth example according to the present invention, the compression ratio for high-rate coding is ⅔ (N=3/2) of the compression ratio in the conventional apparatus. In such a video signal recording and reproduction apparatus in the twenty-fourth example, a conventional apparatus for recording data by compressing the data for each image plane at a compression ratio of 1:C is used as a base, but a compression ratio which is 1/N of 1:C is used in order to obtain a higher quality image. In such a the video signal recording and reproduction apparatus, data corresponding to two input images are divided into three image data having a substantially equal information content, and such three image data are processed with high-rate coding to reduce the compression ratio to ⅔. Such operation can be realized by a block configuration which is basically the same as shown in the 21st example (FIG. 31). The operation is also the same except for the processing speed, operation of the pre-processing device and the post-processing device, and the size of the memories. The operation of the pre-processing device and the post-processing device will be described with reference to FIG. 37.

A set of two input image planes Io and Ie is divided into three image data Ha, Hb and Hc. For simplicity, the image data Io and Ie each have 12 macroblocks, and the code quantity is controlled by the entire image plane. The information in the set of image planes Io and Ie is substantially divided equally into three and located in the image data Ha, Hb and Hc. The blank macroblocks having no information (hatched macroblocks in FIG. 37; the number of such macroblocks is ⅓ of the total macroblocks) are provided with dummy data. In this manner, the information content in the image data Ha, Hb and Hc can be made more uniform, and the reproduced image can be more uniform overall. In this example, the following conversion is performed by the pre-processing device in order to improve the image quality obtained by the conventional apparatus.

From the image plane Io, ⅓ of the macroblocks are taken out substantially at random in order to obtain ⅓ of the information as accurate as possible. The remaining macroblocks are used as macroblock in the image data Ha, and the macroblocks which were taken out are located in the image data Hb at the corresponding positions to those in the image plane Io. In the same manner, ⅓ of the macroblocks are taken out from the image data Ie substantially at random. The remaining macroblocks are used as macroblock in the image data Hc, and the macroblocks which were taken out are located in the image data Hb at the corresponding positions to those in the image plane Ie. The macroblocks taken out from the image data Ie are at different positions from the macroblocks taken out from the image plane Io. After such operation, ⅓ of the macroblocks in each of the image data Ha, Hb, Hc are blank. Such macroblocks are provided with dummy data.

The macroblocks in the image plane Io and Ie are located at the same positions in the image data Ha, Hb and Hc. In the case where the image plane Io and Ie are input sequentially in this order and the image data Ha, Hb and Hc are generated sequentially in this order, the conversion is performed so that the order of a part of the macroblocks is reversed in terms of time (for example, a macroblock in the image data Ie is displayed before a macroblock in the image data Io after conversion). Accordingly, the reproduced image is of higher quality than obtained by the conventional apparatus. Since ⅓ of the macroblocks in each of the image data Ha, Hb and Hc have dummy data, the compression ratio can be substantially reduced to ⅔ to obtain a high quality image. The information content (code quantity) in each image data is equal, and the correlation between the image data Io and Ie is strong. Accordingly, the reproduced image data Io and Ie have no significant quality difference from each other. In the case where the correlation between image planes Io and Ie is not sufficient and the quality difference needs to be reduced, the information in the image planes Io and Ie is substantially divided equally into the image data Ha, Hb and Hc.

In the above example, only the compression ratio or the size of the image is changed from the compression ratio in the conventional apparatus. Of course, such change can be combined. For example, in order to process an image having the size twice the size of the image in the conventional apparatus with high-rate coding at half of a compression ratio in the conventional apparatus, each image plane of the image is substantially divided equally into four image data, each having a prescribed size suitable for the conventional apparatus. In each of such four image data, approximately half of the total macroblocks are provided with dummy data. In such a case, an image of an arbitrary size can be processed with high-rate coding at an arbitrary compression ratio to be converted into an image of a prescribed size and then transmitted. By performing the conversion so that the relative positions of the macroblocks (each including a prescribed number of coding units, the number being obtained by multiplication by an integer) before conversion with respect to the entire image plane is maintained even after the conversion, the overall image can be checked even by the conventional apparatus.

Although in the twenty-second example, an image of a large size is compressed at a ratio of 1/N (N=4), the present invention is not limited to this. A smaller image can be processed with high-rate coding for recording. For example, in the case that the size of the input image is ⅔ of the size in the conventional apparatus, every three image planes of the input image is substantially divided equally into two for high-rate coding. In such a case also, by converting so that the positional relationship among the macroblocks is maintained even after the conversion to a maximum possible extent, the overall image can be checked by the conventional apparatus.

In the present invention, the expression "same image size" means, in addition to the same number of pixels horizontally and vertically, the same total number of pixels corresponding to all the signals (in the case of a color signal including a plurality of component signals). This is because the high-rate coding is performed for each coding unit such as a block and the number of the coding units is important. In other words, the number of coding units for all the signals needs to be the same as the number of coding units for high-rate coding. For example, in the case that a 4:2:2 signal (a component signal in which the sampling frequency ratio for a luminance signal and two color difference signals is 4:2:2; the ratio of the number blocks is also 4:2:2) is processed with high-rate coding, the total number of blocks in the macroblock is the same as that of a 6:1:1 signal. Accordingly, such a ratio can be converted into 1:1.

In a method of fine-tuning the number of coding units, the number of pixels is reduced by sampling or a prescribed area (for example, a high frequency range) in a frequency range for DCT is removed, so as to reduce the image data. Thus, a plurality of blocks are combined to reduce the number of blocks. In another method, dummy data is inserted to increase the number of blocks. In the case when dummy data is inserted, a part of the information to be recorded can be recorded as dummy data in a partially overlapped state with the other recording area. In this way, robustness can be improved.

In this example, the number of image planes are changed by conversion. For example, each of a plurality of image planes is recorded as a plurality of images. In order to reproduce the original image by reverse conversion, identification information which indicates the starting point of the conversion cycle or the like needs to be recorded together with the coded data. In the above examples, a method for recording the identification information is omitted. Some example of such methods will be described below.

(1) The identification information is recorded in an additional information recording area on a recording format.
(2) A plurality of values of dummy data are prepared, one of the values is used as the identification information.
(3) Information on the cycle of a prescribed number of image planes which is recorded on the recording format, such as color frame information or time code, is caused to correspond to the conversion cycle and used as identification information. For example, in the case when one image plane is divided into two image data for recording, an odd-number cycle is used for the first image data and an even-number cycle is used for the second image data.

In the above examples, the present invention is applied to a video signal recording and reproduction apparatus. The present invention is also applicable to recording and reproduction apparatus and a transmission apparatus of a signal digitalized from an analog signal such as voice data.

In the above examples, the image data to be converted is arranged by a unit of a macroblock. The image data can be arranged by a unit of a pixel. For example, the pixels are sub-sampled horizontally into two groups; odd-number pixels and even-number pixels. The two images having half of the original size horizontally are each provided with dummy data to obtain images each having the same size as the original image. The image thus obtained is used as image data Ha or Hb. In such a case, the image obtained by sub-sampling is arranged block by block. Even if a block in one of the images is lost by an error or the like, the correction can be performed by a unit of a pixel.

EXAMPLE 25

Figure 38:
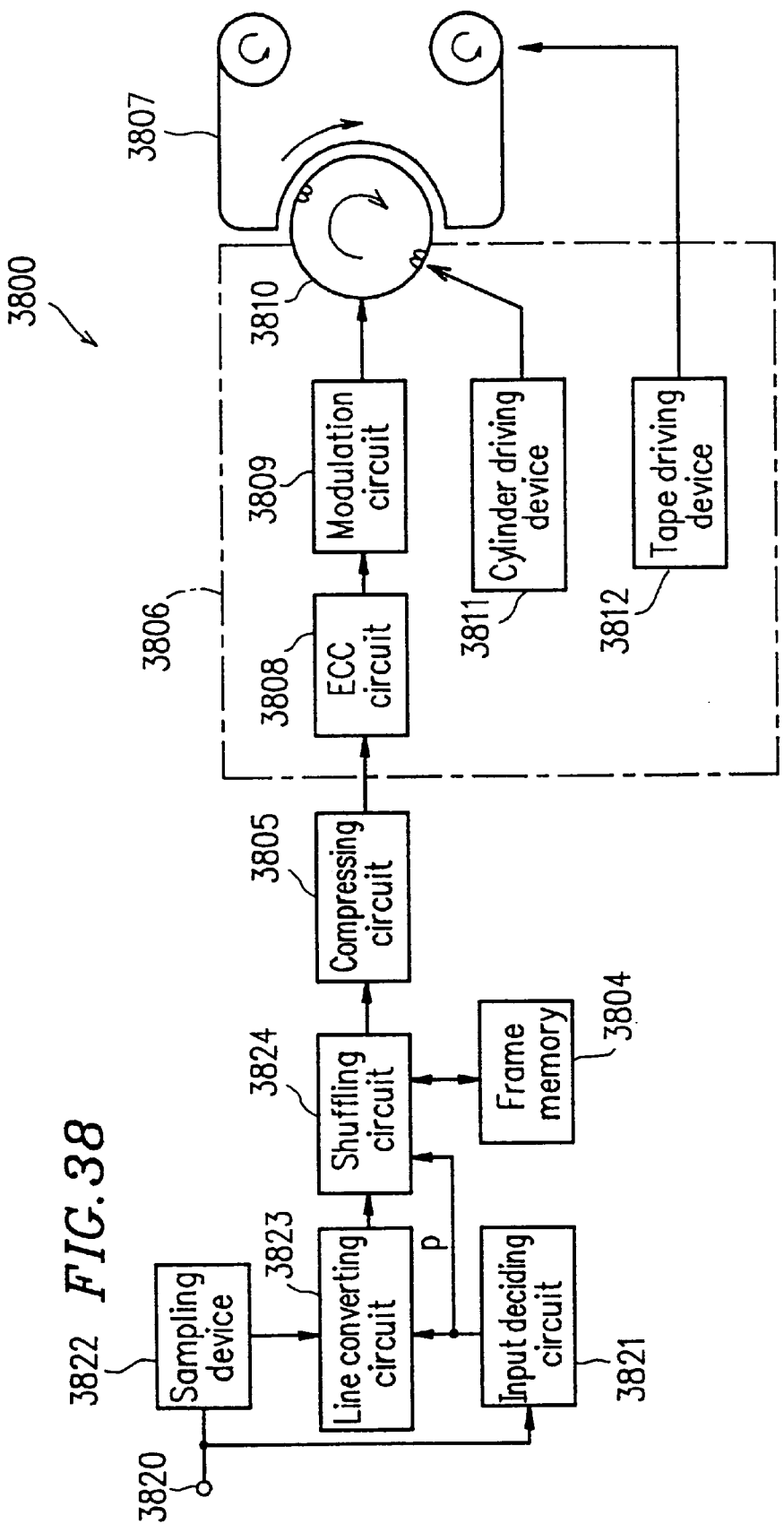
FIG. 38 is a block diagram of a video signal recording and reproduction apparatus in a twenty-fourth example according to the present invention.

A twenty-fifth example according to the present invention will be described with reference to FIGS. 38 through 41. FIG. 38 is a block diagram of a video signal recording and reproduction apparatus 3800 in the twenty-fifth example.

The video signal recording and reproduction apparatus 3800 includes an input terminal 3820 to which HD signals A, B, C or D is input. The HD signal A corresponds to 1080 frame effective lines, 1125 total frame lines, and a field frequency of 60 Hz. The HD signal B corresponds to 1035 frame effective lines, 1125 total frame lines, and a field frequency of 60 Hz. The HD signal C corresponds to 960 frame effective lines, 1050 total frame lines, and a field frequency of 60 Hz. The HD signal D corresponds to 1152 frame effective lines, 1250 total frame lines, and a field frequency of 50 Hz. An input deciding circuit 3821 decides whether the input signal is an HD signal A, B, C or D and outputs the decision as decision information p. A sampling circuit 3822 samples the HD signal at a constant sampling frequency regardless of the type of the signal. A line converting circuit 3823 only performs line conversion when the decision information p signs the input signal is HD signal A, and the line conversion which reduces the effective lines in the frame is applied only in a top part and a bottom part of the effective area of image plane of the input HD signal A. A shuffling circuit 3824 shuffles the HD signal A obtained by the line converting circuit 3823 after the number of the effective lines thereof is changed, or the HD signals B, C or D. For the HD signals A and B, writing to the frame memory 3804 is performed in different manners, and recorded in a frame memory in which the number of pixels and lines in the horizontal and vertical directions are the same as the HD signal C. Such data is read to perform shuffling. A frame memory 3804 stores data in the frame when the HD signal is shuffled by the shuffling circuit 3824. A compressing circuit 3805 processes a signal including a plurality of blocks sent by the shuffling circuit 3824 and compresses the data in a certain number of blocks into a certain amount of data by applying orthogonal transform, quantization, and variable-length coding. A recording circuit 3806 records the compressed signal into a magnetic tape 3807. The recording circuit 3806 includes an ECC circuit 3808 which processes the error correcting coding to compressed data, a modulation circuit 3809, a cylinder 3810 including a recording head, a cylinder driving device 3811 for rotating the cylinder, and a tape driving device 3812 for causing the magnetic tape 3807 to run.

The video signal recording and reproduction apparatus 3800 having the above-described configuration operate in the following manner.

An HD signal is input to the input terminal 3820. The input deciding circuit 3821 decides whether the input HD signal is an HD signal A, B, C or D and outputs the decision information p. The sampling device 3822 samples the input signal at a constant frequency regardless of the type of the input signal. Herein, the sampling circuit 3822 samples a Y signal (luminance signal) at 40.5 MHz, a C1 signal and a C2 signal (color difference signals) both at 13.5 MHz. By such sampling frequencies, the Y signals of the HD signals A through D has the following number of pixels in the effective area of one frame:

HD signal A: 1048 (horizontal) pixel×1080 lines
HD signal B: 1048 (horizontal) pixel×1035 lines
HD signal C: 1080 (horizontal) pixel×960 lines
HD signal D: 1080 (horizontal) pixel×1152 lines The field frequency is 60 Hz for the HD signals A, B and C; and 50 Hz for the HD signal D. The C1 and C2 signals each have ⅓ of the pixels of the Y signal horizontally, and ½ of the lines of the Y signal vertically. Such a number of lines is obtained as a result of line progressive scanning. Each line corresponds to either the C1 signal or the C2 signal.

The number of pixels in the effective area of the frame corresponding to the HD signal C and the number of such pixels corresponding to the HD signal D is 5:6, which is reciprocal to the field frequency ratio 6:5 for the HD signals C and D. Accordingly, the compression ratio used by the compressing circuit 3805 and the recording rate, the rotation speed of the cylinder, and the tape running speed in the recording device 3806 can be substantially the same for the HD signals C and D. (In practice, the field frequency of the HD signal C is 60 Hz×1/1.001≈59.94 Hz; that is, there is a difference of 0.1%.) Due to such similarities between the HD signal C and D, a transmission area of a frame corresponding to the HD signals C and D which can be recorded in the magnetic tape 3807 is caused to be the same as the effective area of the frame.

Although the field frequency of the HD signal B is the same as the field frequency of the HD signal C, the number of pixels in the effective area of the frame of the HD signal B (1,086,680 in the case of the Y signal) is larger than the number of such pixels of the HD signal C (1,036,800 in the case of the Y signal). Accordingly, adjustment is performed to the maximum possible extent permitted by the over-scan ratio of the TV monitor, so that the number of pixels in the transmission area of the frame of the HD signal B is as close as possible to that of the HD signal C. As a result, the Y signal of the HD signal B has the following number of pixels:

HD signal B: 1008 pixels (horizontal)×1024 lines

Figure 39A:
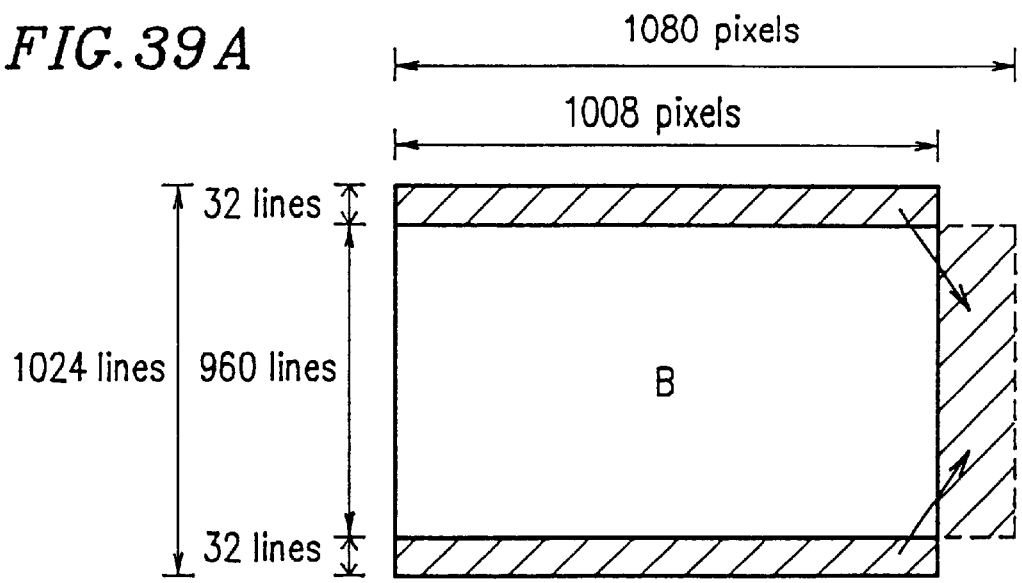
FIG. 39A is a view illustrating a frame transmission area of an HD signal B in twenty-fifth, twenty-sixth and twenty-seventh examples.
Figure 39B:
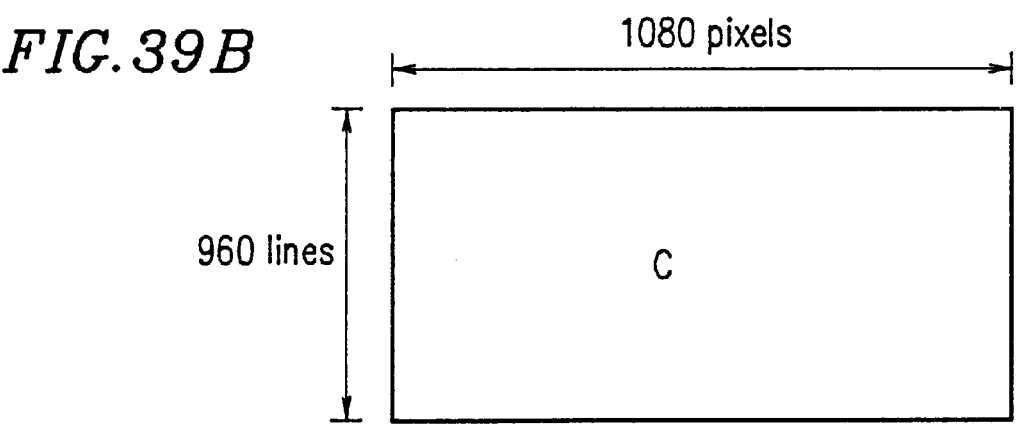
FIG. 39B is a view illustrating a frame transmission area of an HD signal C in twenty-fifth, twenty-sixth and twenty-seventh examples.
Figure 39C:
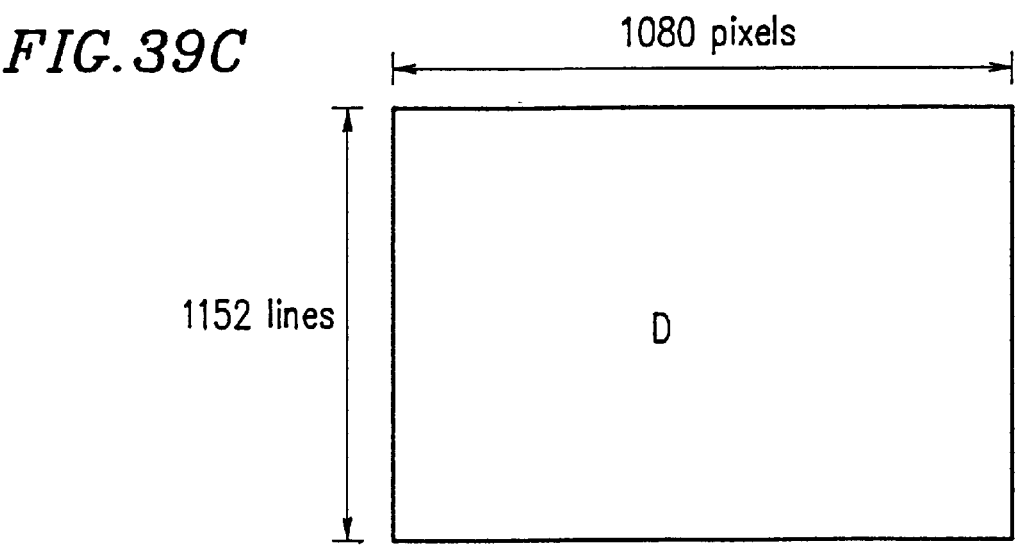
FIG. 39C is a view illustrating a frame transmission area of an HD signal D in the twenty-fifth, twenty-sixth and twenty-seventh examples.

By such adjustment, the transmission area of each frame of the Y signal of the HD signal B has 1,032,192 pixels. At this point, the over-scan ratio of the HD signal B is approximately 3.8% horizontally and approximately 1.1% vertically. The extraction of the transmission area of the frame is controlled by the shuttling circuit 3824 using the decision information p. FIGS. 39A, 39B and 39C illustrate the relationship of the transmission area of each frame of the HD signals B, C and D respectively For the HD signal B, as is shown in FIG. 39A, a top part and a bottom part of the frame are moved to a right part of the frame and the resultant frame is written in the frame memory 3804. In this way, the HD signal B can be processed in the same manner as the HD signal C.

Figure 40A:
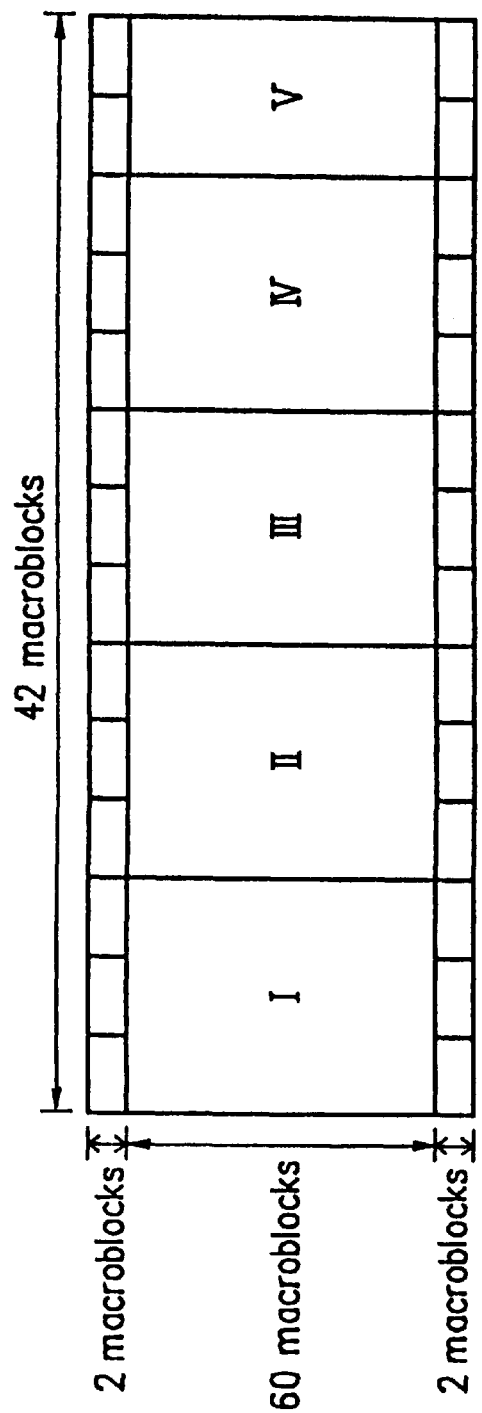
FIG. 40A and FIG. 40B are views illustrating arrangement of macroblocks of data written in a memory in the twenty-fifth, twenty-sixth and twenty-seventh examples.
Figure 40B:
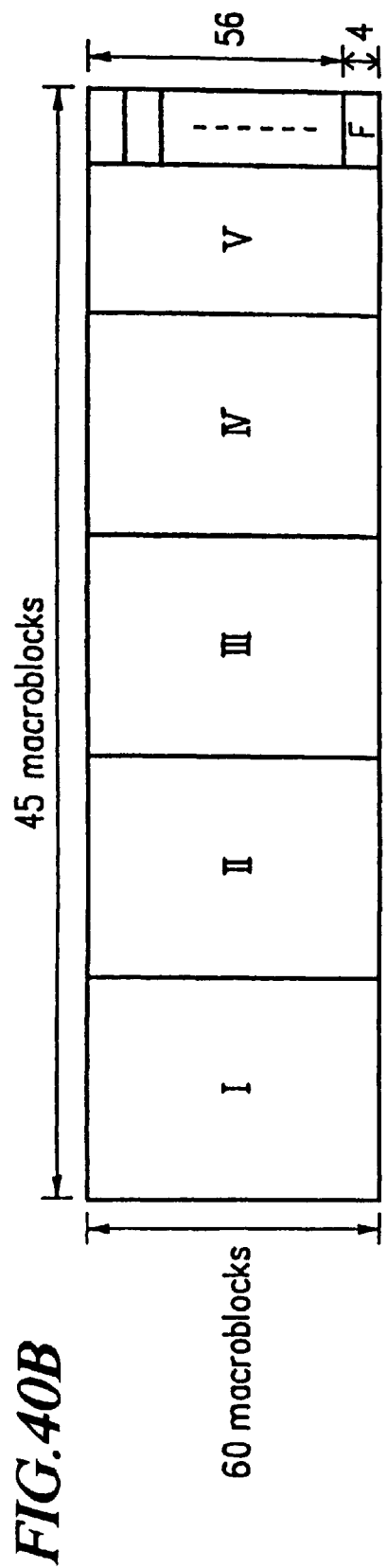

FIG. 40A and FIG. 40B illustrate the operation of the shuffling circuit 3824 when the HD signal B or A is input to the shuffling circuit 3824 after line conversion. An image plane of one frame is represented as a macroblock. Each macroblock of the Y signal has 24 (horizontal) pixels×16 (vertical) lines. Each macroblock of each of the C1 and C2 signals has 8 (horizontal) pixels×8 (vertical) lines. FIG. 40A illustrates the arrangement of macroblocks for the HD signal B, and FIG. 40B illustrates the arrangement of macroblocks of the signal written in the memory 3804 after controlling the Hd signal. Areas I through V in FIG. 40A are written in the memory 3804 in the state of being reduced vertically by two macroblocks at the top and by another two macroblock at the bottom as is shown in FIG. 40B. The two macroblocks at the too and the two macroblock at the bottom are written to a part right of areas I through V. Area F including 3 (horizonal)×4 (vertical) macroblocks including no data is provided with dummy data. Such area conversion is performed so as to guarantee Continuity of the data on the screen of the monitor when the data is reproduced by high-speed search. In the HD signal B obtained by area conversion, the continuity between a central area and a right area is lost. The influence on the visual characteristics caused by such loss is restricted to a top area and a bottom area of the monitor. The frame memory 3804 has a sufficient capacity to store an HD signal D having the largest transmission area of each frame among the four types of the HD signals.

The HD signal A has the same size as the HD signal B including information during a blanking period such as a synchronization signal, but the HD signal A has a larger effective area of each frame than the HD signal B. Accordingly, by adjusting the transmission area of each frame of the HD signal A to be equal to the transmission area of each frame of the HD signal B, the over-scan ratio becomes approximately 3.8% horizontally and approximately 5.2% vertically. Since the over-scan ratio in the vertical direction is increased although slightly, information other than the video signal is displayed at a top area and a bottom area of a certain type of TV monitors.

Figures 41A, 41B:
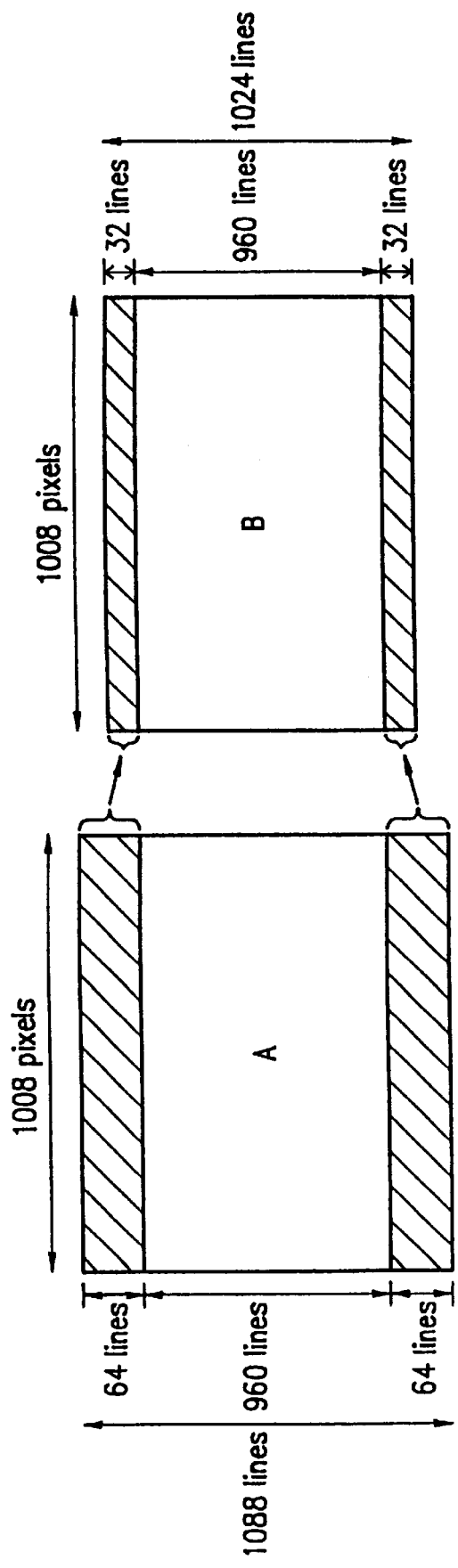
FIG. 41A and FIG. 41B are views illustrating a frame effective area in the twenty-fifth, twenty-sixth and twenty-seventh examples.

In order to avoid such an inconvenience, when an HD signal A is input, the number of lines is changed at a top area and a bottom area of the image plane by the line converting circuit 3823 as is shown in FIG. 41A and FIG. 41B. In FIG. 41A, the HD signal A has 1088 lines including 1080 lines for the effective area and eight ineffective lines. Top 64 lines and bottom 64 lines are converted to be reduced to ½. As a result, a pseudo-HD signal B shown in FIG. 41B is obtained. By such line conversion, lines in a central area of the image plane which have a great influenced in terms of visual characteristic are not converted to maintain the original video information, and only the lines in the top and bottom areas are converted. In the case of the HD signal B, an area which is influenced by line conversion for the search picture mode can be restricted to the top and bottom areas of the image plane. In this example, the line conversion reduces the number of lines to ½. Accordingly, the configuration of the line converting circuit 3823 can be very simple even if a vertical line filter is used.

As is described above, the video signal recording and reproduction apparatus 3800 in this example, lines in the top and bottom areas of the effective area of each frame of the HD signal are converted. Accordingly, display of data other than the video information can be prevented by only reducing the vertical resolution only in an area which is least influenced in terms of visual characteristic and the over-scan of the monitor. Further, the HD signal A can be compressed and recorded after shuttling in the same manner as the HD signal B.

EXAMPLE 26

Figure 42:
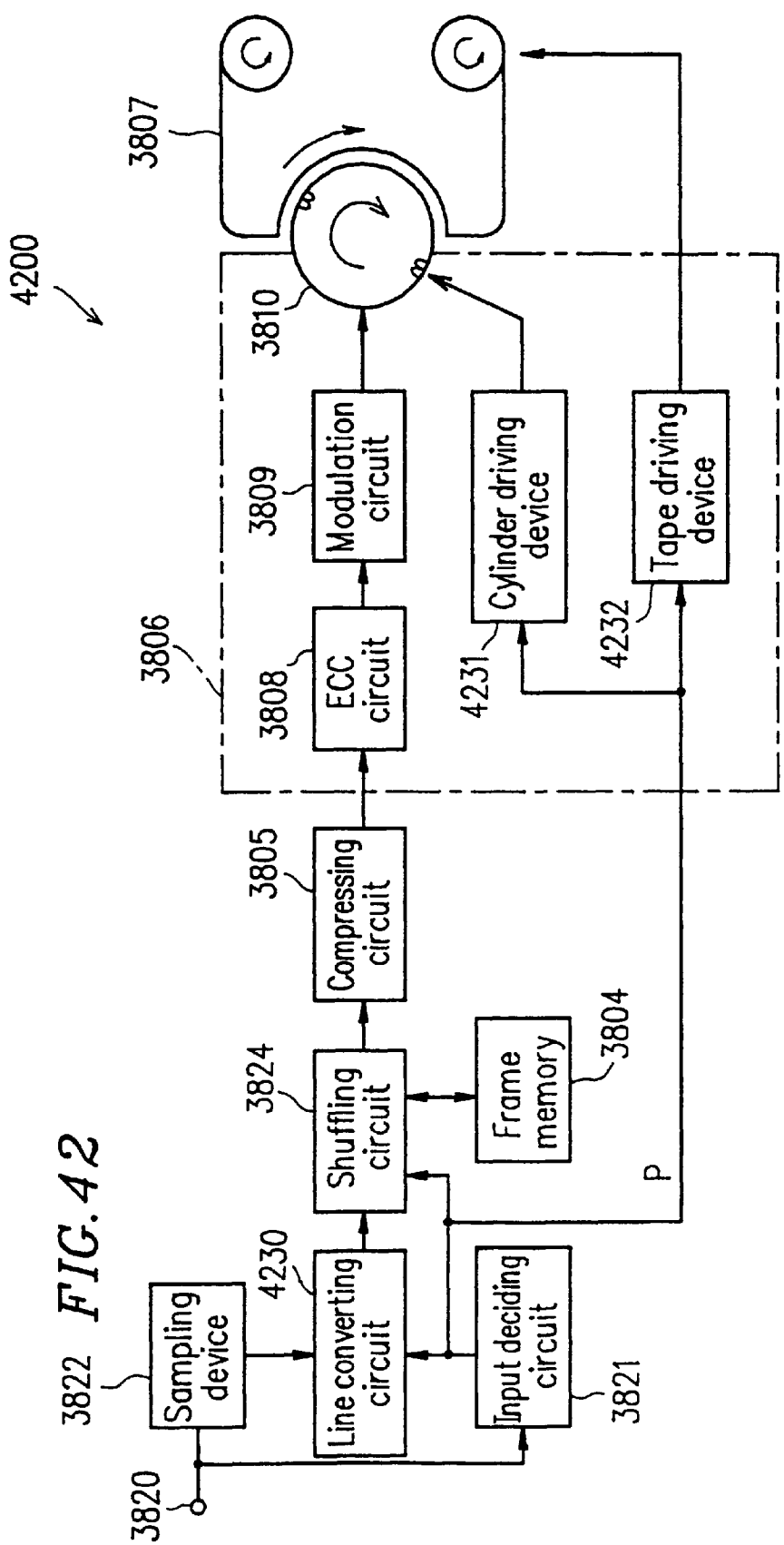
FIG. 42 is a block diagram of a video signal recording and reproduction apparatus in the twenty-sixth example according to the present invention.

A twenty-sixth example according to the present invention will be described with reference to FIG. 42. FIG. 42 is a block diagram of a video signal recording and reproduction apparatus 4200.

The video signal recording and reproduction apparatus 4200 includes an input terminal 3820 to which HD signals A, B, C or D is input. An input deciding circuit 3821 decides whether the input signal is an HD signal A, B, C or D and outputs the decision as decision information p. A sampling circuit 3822 samples the HD signal. A signal converting circuit 4230 adds an effective pixel to the HD signal A so that the HD signal A has the same effective area for each frame with the HD signal D. When a signal, decided to be an HD signal A by the decision information p, is input to the recording circuit 3806, a cylinder driving device 4231 raises the rotation speed of the cylinder to 6/5 times the speed used for the HD signal D, and a tape driving device 4232 raises the tape transportation speed to 6/5 the speed used for the HD signal D. Other elements are identical with those in the twenty-fifth example, and thus detailed description there of will be omitted.

The video signal recording and reproduction apparatus 4200 having the above-described configuration operate in the following manner.

The sampling device 3822 samples the HD signals A, B, C and D at the same sampling frequency of 40.5 MHz (Y signal) and 13.5 MHz (each of two color different signals). Accordingly, the frame effective area of each HD signal is the same as in the twenty-fifth example. When an HD signal A is input, the signal conversion circuit 4230 adds an ineffective pixel to the frame effective area both horizontally and vertically so that the frame effective area has 1080 (horizontal)×1152 (vertical) lines, which is the same as the HD signal D shown in FIG. 39C. In the HD signal D, the frame effective area is the same as the frame transmission area. In this example, the HD signals B, C and 3 are processed in the same manner as in the twenty-fifth example. The shuffling circuit 3824 performs the same shuffling operation whether the HD signal A or the HD signal D is input. Since the capacity of a frame memory 3804 is sufficient to store the frame transmission area of the HD signal D, addition of another memory is not needed. The compressing circuit 3805 performs the same processing for the HD signals A and D.

The field frequency of the HD signal A is 60 Hz, and the field frequency of the HD signal D is 50 Hz. Accordingly, if the HD signals A and D are compressed at the same compression ratio, the data rate for the HD signal A is 6/5 times the data rate for the HD signal D. In order to avoid such inconvenience, when the input signal is decided to be an HD signal A, the cylinder driving device 4231 raises the rotation speed of the cylinder to 6/5 of the rotation speed used for the HD signal D. In this manner, all the data obtained by compression can be recorded in a magnetic tape 3807. Further, in the case where the tape driving device 4232 raises the tape transportation speed to 6/5 of the speed used for the HD signal D to equalize the track pitch in the magnetic tape 3807 for the HD signals A and D, the same recording head in the cylinder 3810 can be used for the HD signals A and D.

The ineffective pixel which is added by the signal converting circuit 4230 is located in a top, bottom, right or left end of the frame effective area of the HD signal A in consideration with the search picture mode. Any one of such locations is usable. Addition of such an ineffective pixel is appropriate because the pixel value in the state of no signal does not provide unnecessary information by compression performed by the compressing circuit 3805. Alternatively, a part of the HD signal A can be overlapped to be used to correct an error caused during signal processing for reproduction.

In the video signal recording and reproduction apparatus 4200 in the twenty-sixth example, all the pixels in the frame effective area of the HD signal A can be recorded in the magnetic tape 3807 by the same video signal processing as for the HD signal D. The tape pattern of the magnetic tape 3807 can be the same.

EXAMPLE 27

Figure 43:
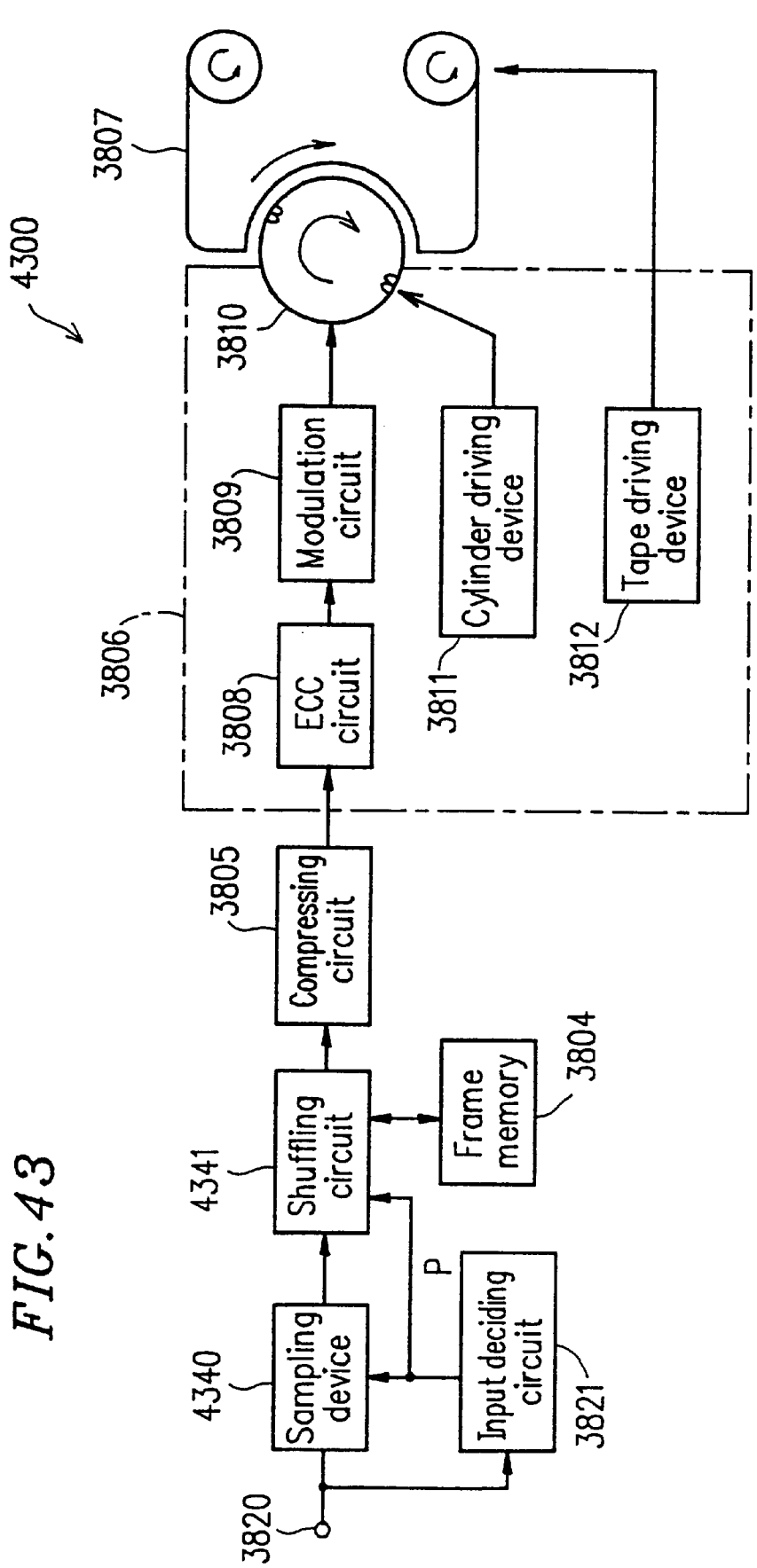
FIG. 43 is a block diagram of a video signal recording and reproduction apparatus in the twenty-seventh example according to the present invention.

A twenty-seventh example according to the present invention will be described with reference to FIG. 43. FIG. 43 is a block diagram of a video signal recording and reproduction apparatus 4300 in the modification. The same elements as those in FIG. 42 bear the same reference numerals therewith, and detailed description thereof will be omitted.

When a signal is input to the input terminal 3820, the input deciding circuit 3821 decides whether the input signal is an HD signal A, B, C or D and outputs the decision result as decision information p. The sampling device 4340 samples the HD signal which is input and outputs the sampled data to a shuffling circuit 4341 operable for each HD signal.

Figure 44A:
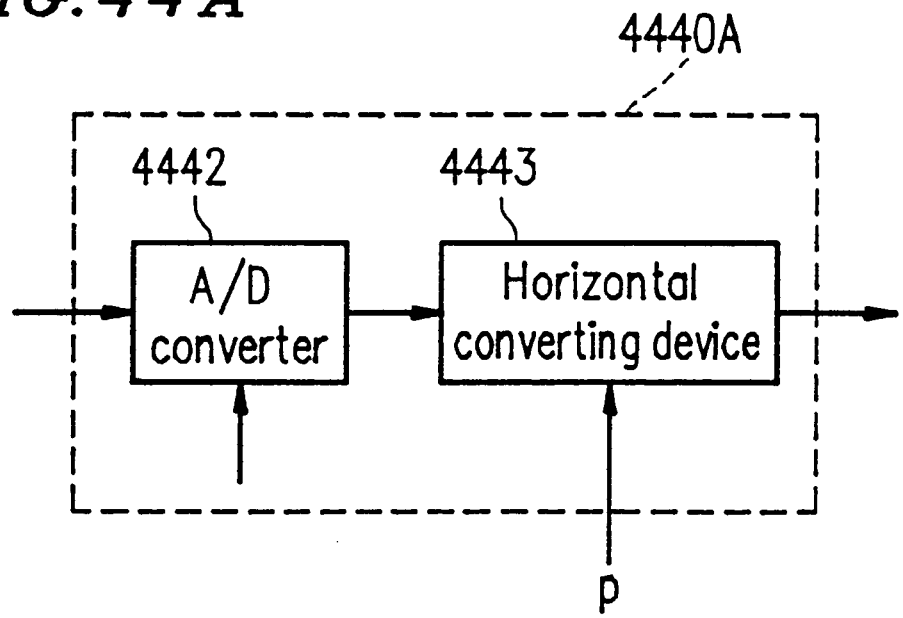
FIG. 44A is a block diagram of a sampling device of the video signal recording and reproduction apparatus in the twenty-sixth example.
Figure 44B:
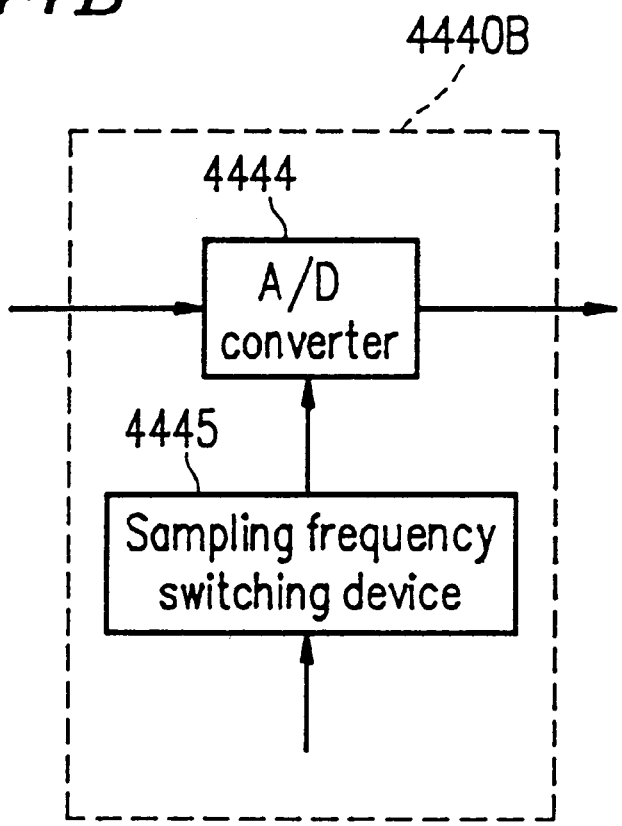
FIG. 44B is a block diagram of a sampling device of the video signal recording and reproduction apparatus in the twenty-seventh example.
Figure 45:
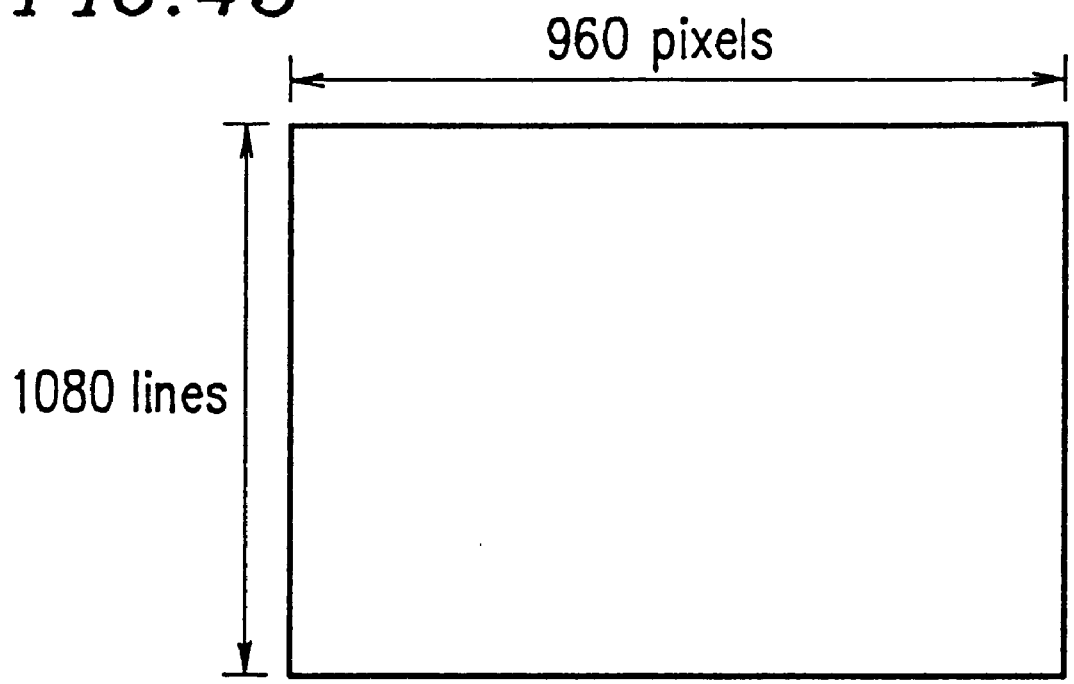
FIG. 45 is a view illustrating a frame effective area in the twenty-seventh example.

FIGS. 44A and 44B illustrate the configuration of the sampling device 4340. As is shown in FIG. 44A, a sampling device 4440A as an example of the sampling device 4340 includes an A/D converter 4442 for sampling an HD signal at a frequency of 40.5 MHz (Y signal) and 13.5 MHz (each of two color difference signals) and a horizontal converting device 4443 for reducing the number of pixels in the frame effective area in the horizontal direction of the HD signal A to 960 pixels. In the examples shown in FIGS. 38 and 42, the sampling device includes only the A/D converter 4442. FIG. 44B The horizontal converting device 4443 converts 1048 pixels in the horizontal direction of the HD signal A obtained by the A/D converter 4442 to 960 pixels using a bandwidth limited filter. FIG. 45 shows a frame effective area of the HD signal A obtained as a result of such conversion. Such a frame effective area has the same number of pixels as the HD signal C shown in FIG. 40B, but the number of pixels in the horizontal direction and the vertical direction are opposite to those of the HD signal C. Accordingly, when an HD signal A is input, the address control to the frame memory 3804 is performed in the state where the address in the horizontal direction and the address in the vertical direction are opposite to those for the HD signal D. By such alteration, the HD signal A can be processed in the same manner as the HD signal D for compression and thereafter.

In the video signal recording and reproduction apparatus 4300 in the twenty-seventh example, the number of pixels in the frame transmission area of the HD signal A can be the same as the HD signal C without reducing the lines in the frame effective area. Thus, the HD signal A can be processed by the signal processing circuit for the HD signal C for compression and thereafter.

In the above example, the number of pixels in the horizontal direction is changed from 1048 to 960. The number of the pixels of 1080 including ineffective pixels can be changed to 960 at a simpler conversion ratio and is very effective.

FIG. 44B shows the configuration of another example 4440B of the sampling device 4340. The sampling device 4440B includes an A/D converter 4444 for performing A/D conversion at a sampling frequency which is input and a sampling frequency switching device 4445 for switching the sampling frequency to 40.5 MHz or 37.125 MHz for the Y signal in accordance with the decision information p from the input deciding circuit 3821. For each of the two color difference signals, ⅓ of the sampling frequency for the Y signal is used. The sampling frequency of a 1125 signal conforming to the studio standards is 74.25 MHz, and the number of effective pixels in the horizontal direction thereof is 1920 pixels. The number of pixels in the horizontal direction in FIG. 45 is ½ of that of the studio standards. Accordingly, the conversion of the number of pixels in the horizontal direction is not needed if the sampling frequency is set to 37.125 MHz, which is ½ of 74.25 MHz conforming to the studio standards.

In the above-described examples, an analog signal is used as the input HD signal A and an A/D converter is used. In the case when a digital signal is input, the number of pixels in the horizontal direction is reduced to ½ as described above. Accordingly, the configuration of the converting circuit can be significantly simplified and is highly compatible with the configuration conforming to the studio standards.

As has been described so far, according to the present invention, one frame of a progressive scan TV signal is coded and recorded as one frame of an interlaced scan TV signal. Thus, the progressive scan TV signal can be recorded.

By arranging data corresponding to a progressive scan TV signal to data corresponding to one field of an interlaced scan high-definition TV signal, the progressive scan TV signal can be recorded.

A progressive scan TV signal can be recorded by simply changing the method for dividing image data into coding units performed by a conventional interlaced scan high-definition TV signal.

A progressive scan TV signal and an interlaced scan TV signal can both be recorded by adding an dividing circuit and a coding device for the progressive scan TV signal into coding units to the conventional apparatus.

In the case when an effective pixel area of a progressive scan TV signal is changed by the rate conversion, such rate conversion can be performed at the same sampling frequency as an interlaced scan high-definition TV signal.

The image quality for the search picture mode can be improved by rearranging blocks which are coded before recording.

A color difference signal of a progressive scan signal can be vertically to ⅓ so as to have the same number of pixels as a color difference signal of a 4:2:2 signal. The arrangement of coding units in a track with respect to the image plane corresponding to the progressive scan signal can have high compatibility with an interlaced scan TV signal.

Two successive frames of a progressive scan signal can be converted to appear to be obtained by interlaced scanning. Even if one of two channels of the video head is damaged, intra-frame correction can be performed.

By coding two successive frames of a progressive scan signal in combination, the correlation between the frames can be utilized, thus to raise the coding efficiency.

By switching the channels to which an input signal is to be sent at 1/n of the frame cycle, two frames at the same position can be combined in each of a plurality of channels. The coding efficiency is improved.

By adding a memory to the system for dividing the one-frame data into two and processing the data in two channels, the data in the same frame can be output from two channels simultaneously. Accordingly, the quality of the image obtained in the search picture mode is improved.

By increasing the number of effective pixels by interpolating color difference signals, ICs produced for processing an interlaced scan signal can be used even if the input signal is divided for recording at a high rate.

By adding a memory to the system for dividing the one-frame data into two and processing the data in two channels, the data in the same frame can be output from two channels simultaneously. Accordingly, the image quality obtained in the search picture mode is improved even based on an image recorded at a high rate.

By converting a non-interlaced scan signal into an interlaced scan signal while maintaining the correlation between the pixels of the video signal, high quality reproduction and high quality recording can be realized by simply adding a slight signal processing.

By converting a signal including a non-interlaced scan signal as a luminance signal into an interlaced scan signal while maintaining the correlation between the pixels of the color difference signals of the video signal, the video signal having a non-interlaces luminance signal and interlaced color difference signals can be recorded and reproduced at high quality.

By substantially dividing an input image equally into a plurality of image data to reduce the information content included in each image data. Thus, high image quality can be obtained due to a lower compression ratio.

By substantially dividing an input image equally into a plurality of image data to reduce the information content included in each image data and locating the information in a partially overlapped state, error correction can be performed at a higher precision while decoding. Thus, high image quality is obtained due to a lower compression ratio.

By using the overlapped part of the information, corrected image data of the coded data in which an error is caused during transmission. Accordingly, generation of image loss due to an error during transmission is avoided.

By a conventional high-rate coding device and a conventional data transmission device can be used with no significant change. Accordingly, different specifications can be used while enjoying various advantages of such conventional devices, such as compactness and lower cost.

By converting an input image having different specifications from an image for which the high-rate coding device is intended to convert the image suitable to the specification of the high-rate coding device. Accordingly, different specifications can be used and high quality coding can be realized while enjoying various advantages of such conventional devices, such as compactness and lower cost.

In the case when the decision device decides the type of input signal. When an HD signal A is input, line conversion is performed only top and bottom areas of the effective area of the frame to reduce the vertical resolution only in the area which is least influenced in terms of visual characteristic and the over-scan area on the TV monitor. In this manner, an HD signal A can be the same as an HD signal B. The data amount of the HD signal B can be the same that of the HD signals C and D by reducing the frame transmission area in the over-scan area. Accordingly, data other than video is not displayed on the screen, and the processing after shuffling such as compression and recording can be performed by the same circuit.

In the case where an HD signal is provided with an ineffective pixel so as to have the same number of pixels as the frame transmission area of an HD signal D, and the HD signals A through D are processed with shuffling and compression and the HD signal is recorded at a recording speed of 6/5 times the recording speed used for the HD signals B, C and D, all the effective pixels corresponding to the entire effective area of the HD signal can be recorded in a magnetic tape.

In the case where the HD signals A is sampled at a different frequency from the HD signals B through D to reduced the data amount of the sampling device for the HD signal A and the HD signal is recorded after being processed with shuffling and compression, the number of the pixels in the frame transmission are of the HD signal A can be the same as that of the HD signal D. Accordingly, the HD signal A can be processed by the same circuit as the HD signal D for compression and thereafter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A high efficiency coding device for receiving m number of images A and outputting coded data of n number of images B as coded data of the, m number of images A, comprising:

a pre-processing portion for dividing input image data of the m number of images A both horizontally and vertically into a predetermined number of macroblocks or coding blocks which are both horizontally and vertically smaller than the input image data, and generating output image data representative of the n number of images B by rearrangement of the image data of the m number of images A, where m≧1 and n≧2; and a high efficiency coding portion for receiving the image data representative of each image B, and performing high efficiency coding on the image data representative of each image B to generate coded data of each image B, the code amount of each prescribed image area of the n number of images B being controlled to be a predetermined value, wherein the image data of the m number of images A divided into the macroblocks or coding blocks is distributed throughout the prescribed image area of the n number of images B so that the divided image data of the m number of images A is disposed uniformly in each prescribed image area, and wherein any portion of the prescribed image area which lacks data of a macroblock or coding block of the m number of images A is provided with dummy coding unit data.

2. A high efficiency coding device according to claim 1, wherein the data of the dummy coding unit is the same as that of an actual macroblock or coding block or reduced data thereof.

3. A high efficiency coding device according to claim 1, wherein the dummy coding unit includes the minimum amount of the coded data thereof.

4. A high efficiency coding device according to claim 1, wherein the size of images A and B are the same, and m<n.

5. A high efficiency coding device according to claim 1, wherein said input image data is divided into macroblocks or coding blocks on a block by block basis.

6. A high efficiency coding method for receiving m number of images A and outputting coded data of n number of images B as coded data of the m number of images A, comprising the steps of:

pre-processing portion for dividing input image data of the m number of images A both horizontally and vertically into a predetermined number of macroblocks or coding blocks which are both horizontally and vertically smaller than the input image data, and generating output image data of the n number of images B by rearranging the image data of the m number of images A, where m≧1 and n≧2; and high efficiency coding for receiving the image data of each image B, and performing high efficiency coding on the image data representative of each image B to generate coded data of each image B, the code amount of each prescribed image area of the n number of images B being controlled to be a predetermined value, wherein the image data of the m number of images A divided into the macroblocks or coding blocks is distributed throughout the prescribed image area of the n number of images B so that the divided image data of the m number of images A is disposed uniformly in each prescribed image area, and wherein any portion, of the prescribed image area which lacks data of a macroblock or coding block of the m number of images A is provided with dummy coding unit data.

7. A high efficiency coding method according to claim 6, wherein the data of the dummy coding unit is the same as that of an actual macroblock or coding block or reduced data thereof.

8. A high efficiency coding method according to claim 6, wherein the dummy coding unit includes the minimum amount of the coded data thereof.

9. A high efficiency coding method according to claim 6, wherein the size of images A and B are the same, and m<n.

10. A high efficiency coding method according to claim 6, wherein said input image data is divided into macroblocks or coding blocks on a block by block basis.

11. A high efficiency coding device for receiving m number of images A and outputting coded data of n number of images B as coded data of the m number of images A, comprising:

a pre-processing portion for dividing each input image data of the m number of images A both horizontally and vertically into p×n number of dividing units consisting of a predetermined number of coding units which are both horizontally and vertically smaller than the input image data, where p≧2, m≧1 and n≧2, and generating output image data representative of the n number of images B by rearrangement; and a high efficiency coding portion for receiving the image data representative of each image B, and performing high efficiency coding on the image data representative of each image B to generate coded data of each image B, the code amount of each prescribed image area defining a rate control area of an image B being controlled so as to be a predetermined value, wherein the dividing units from the m number of images A are distributed to the n number of images B so that the information content of each rate control area of the n number of images B is substantially the same, and wherein any coding unit of a rate control area which lacks the divided input image data of the m number of images A is provided with dummy coding unit data.

12. A high efficiency coding device according to claim 11, wherein the dividing units are distributed substantially at random to the n number of images B.

13. A high efficiency coding device according to claim 11, wherein the dividing units are distributed to the n number of images B based on correlation of the information content of the dividing units.

14. A high efficiency coding device according to claim 11, wherein the data of the dummy coding unit is the same as that of an actual coding unit or reduced data thereof so as to provide substantially the same information content in each of the rate control areas of the n number of images B.

15. A high efficiency coding device according to claim 11, wherein the dummy coding unit includes the minimum amount of the coded data thereof.

16. A high efficiency coding method according to claim 11, wherein said input image data is divided into p×n number of dividing units on a block by block basis.

17. A high efficiency coding method for receiving m number of images A and outputting coded data of n number of images B as coded data of the m number of images A, comprising the steps of:

pre-processing for dividing each input image data of the m number of images A both horizontally and vertically into p×n number of dividing units consisting of a predetermined number of coding units which are both horizontally and vertically smaller than the input image data, where p≧2, m≧1 and n≧2, and generating output image data representative of the n number of images B by rearranging the image data of the m number of images A; and high efficiency coding for receiving the image data representative of each image B, and performing high efficiency coding on the image data representative of each image B to generate coded data of each image B, the code amount of each prescribed image area defining a rate control area of an image B being controlled so as to be a predetermined value, wherein the dividing units from the m number of images A are distributed to the n number of images B so that the information content of each rate control area of the n number of images B is substantially the same, and wherein any coding unit of a rate control area which lacks the divided input image data of the m number of images A is provided with dummy coding unit data.

18. A high efficiency coding method according to claim 17, wherein, in the pre-processing step the dividing units are distributed substantially at random to the n number of images B.

19. A high efficiency coding method according to claim 17, wherein, in the pre-processing step the dividing units are distributed to the n number of images B based on correlation of the information content of the dividing units.

20. A high efficiency coding method according to claim 17, wherein the data of the dummy coding unit is the same as that of an actual coding unit or reduced data thereof so as to provide substantially the same information content in each of the rate control areas of the n number of images B.

21. A high efficiency coding method according to claim 17, wherein the dummy coding unit includes the minimum amount of the coded data thereof.

* * * * *

UNITED STATES PATENT AND TRADEMARK OFFICE
CERTIFICATE OF CORRECTION

PATENT NO.    : 6,526,098 B1
DATED         : February 25, 2003
INVENTOR(S)   : Kato et al.

It is certified that error appears in the above-identified patent and that said Letters Patent is hereby corrected as shown below:

<u>Title page, Item [54] and Column 1, lines 1-3,</u>
The Title should be corrected to read as follows:
-- HIGH EFFICIENCY CODING DEVICE AND METHOD FOR UNIFORMLY DISTRIBUTING MACROBLOCKS THROUGHOUT THE IMAGE AREA --.

<u>Column 62,</u>
Line 60, "the, m number" should read -- the m number --.

Signed and Sealed this

Second Day of December, 2003

JAMES E. ROGAN
*Director of the United States Patent and Trademark Office*